US012561241B2

(12) United States Patent
Seibel et al.

(10) Patent No.: US 12,561,241 B2
(45) Date of Patent: Feb. 24, 2026

(54) TECHNIQUES FOR COMPRESSION AND MANAGEMENT OF METADATA

(71) Applicant: Dell Products L.P., Hopkinton, MA (US)

(72) Inventors: Christopher Seibel, Walpole, MA (US); Vamsi K. Vankamamidi, Hopkinton, MA (US); James Vega McCoy, Holliston, MA (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/771,053

(22) Filed: Jul. 12, 2024

(65) Prior Publication Data

US 2026/0017194 A1     Jan. 15, 2026

(51) Int. Cl.
*G06F 12/02*          (2006.01)
(52) U.S. Cl.
CPC ...... *G06F 12/0292* (2013.01); *G06F 12/0246* (2013.01); *G06F 2212/7201* (2013.01); *G06F 2212/7207* (2013.01)
(58) Field of Classification Search
None
See application file for complete search history.

(56) References Cited

U.S. PATENT DOCUMENTS 11,003,554 B2 *   5/2021   Shveidel ............. G06F 11/2064
11,237,771 B1 *   2/2022   Shveidel ................ G06F 3/065

11,347,725 B2 *   5/2022   Shveidel ............. G06F 16/2365
11,436,142 B1 *   9/2022   Vankamamidi ..... G06F 11/1076
11,487,706 B2 *   11/2022   Shveidel ............... G06F 16/128
11,797,525 B2 *   10/2023   Shveidel ............. G06F 16/2358
12,061,821 B1 *   8/2024   Shveidel ............. G06F 12/0246
12,147,679 B2 *   11/2024   Dovzhenko .......... G06F 3/0659
2020/0241793 A1 *   7/2020   Shveidel .............. G06F 3/0604
2021/0124725 A1 *   4/2021   Love ................... G06F 16/2237
2023/0044942 A1 *   2/2023   Tomlin ................. G06F 3/0652
2023/0106982 A1 *   4/2023   David .................. G06F 3/0637
                                                     707/704

(Continued)

OTHER PUBLICATIONS

U.S. Appl. No. 18/632,145, filed Apr. 10, 2024, entitled Techniques for Staging Updated Metadata Pages, Christopher Seibel, et al.

(Continued)

*Primary Examiner* — Nathan Sadler
(74) *Attorney, Agent, or Firm* — BainwoodHuang

(57)          ABSTRACT

In at least one embodiment, processing can include: updating a metadata (MD) page, including recording updates in MD log entries; and flushing the MD log entries. Flushing can include: applying the updates to a first version V1 of the MD page to generate a second version V2 of the MD page, where V1 is stored at physical address PA1; evaluating V2 to determine, in accordance with one or more criteria, whether to store V2 as a selected one of a compressed form or an uncompressed form; and storing V2 at a second physical address PA2 in the selected compressed or uncompressed form, wherein PA2 denotes a different physical address than PA1, and wherein PA2 is included in a physical large block of non-volatile storage having a type attribute that allows storing MD pages in the selected compressed or uncompressed form.

20 Claims, 27 Drawing Sheets

(56) References Cited

U.S. PATENT DOCUMENTS

| | | | | |
|---|---|---|---|---|
| 2024/0248838 A1* | 7/2024 | Litvak | ................. | G06F 12/0868 |
| 2024/0362168 A1* | 10/2024 | Stoica | ................. | G06F 12/1009 |
| 2025/0103490 A1* | 3/2025 | Seibel | ................... | G06F 12/023 |

OTHER PUBLICATIONS

U.S. Appl. No. 17/959,244, filed Oct. 3, 2022, entitled Techniques for Collecting and Utilizing Activity Metrics, Vamsi K. Vankamamidi, et al.
U.S. Appl. No. 17/971,939, filed Oct. 24, 2022, entitled Techniques for Determining and Using Temperature Classifications With Adjustable Classification Boundaries, Vamsi K. Vankamamidi, et al.
U.S. Appl. No. 18/160,705, filed Jan. 27, 2023, entitled Data Tiering System and Method, Vamsi K. Vankamamidi, et al.

\* cited by examiner

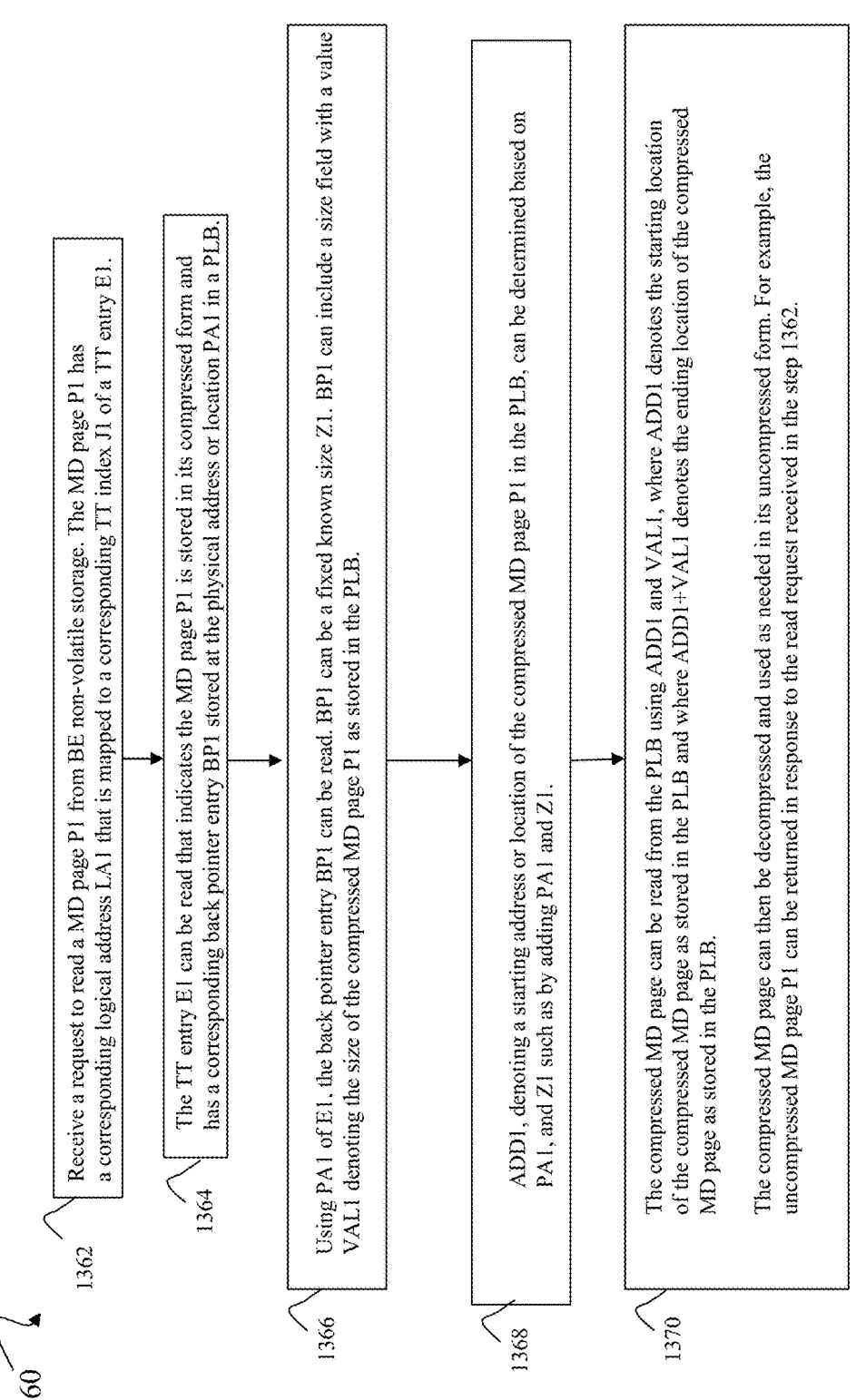

1360

1362 Receive a request to read a MD page P1 from BE non-volatile storage. The MD page P1 has a corresponding logical address LA1 that is mapped to a corresponding TT index J1 of a TT entry E1.

1364 The TT entry E1 can be read that indicates the MD page P1 is stored in its compressed form and has a corresponding back pointer entry BP1 stored at the physical address or location PA1 in a PLB.

1366 Using PA1 of E1, the back pointer entry BP1 can be read. BP1 can be a fixed known size Z1. BP1 can include a size field with a value VAL1 denoting the size of the compressed MD page P1 as stored in the PLB.

1368 ADD1, denoting a starting address or location of the compressed MD page P1 in the PLB, can be determined based on PA1, and Z1 such as by adding PA1 and Z1.

1370 The compressed MD page can be read from the PLB using ADD1 and VAL1, where ADD1 denotes the starting location of the compressed MD page as stored in the PLB and where ADD1+VAL1 denotes the ending location of the compressed MD page as stored in the PLB.

The compressed MD page can then be decompressed and used as needed in its uncompressed form. For example, the uncompressed MD page P1 can be returned in response to the read request received in the step 1362.

FIG. 13B uncompressed MD page 1602

Self ID 1602b

Page type ID 1602a

1600

1610

| Page type ID value 1610a | page type 1610b |
|---|---|
| 1 | TOP |
| 2 | MID |
| 3 | LEAF |
| 4 | VLB |
| 5 | COMPRESSED |

1610a
1610b
1610c
1610d
1610e

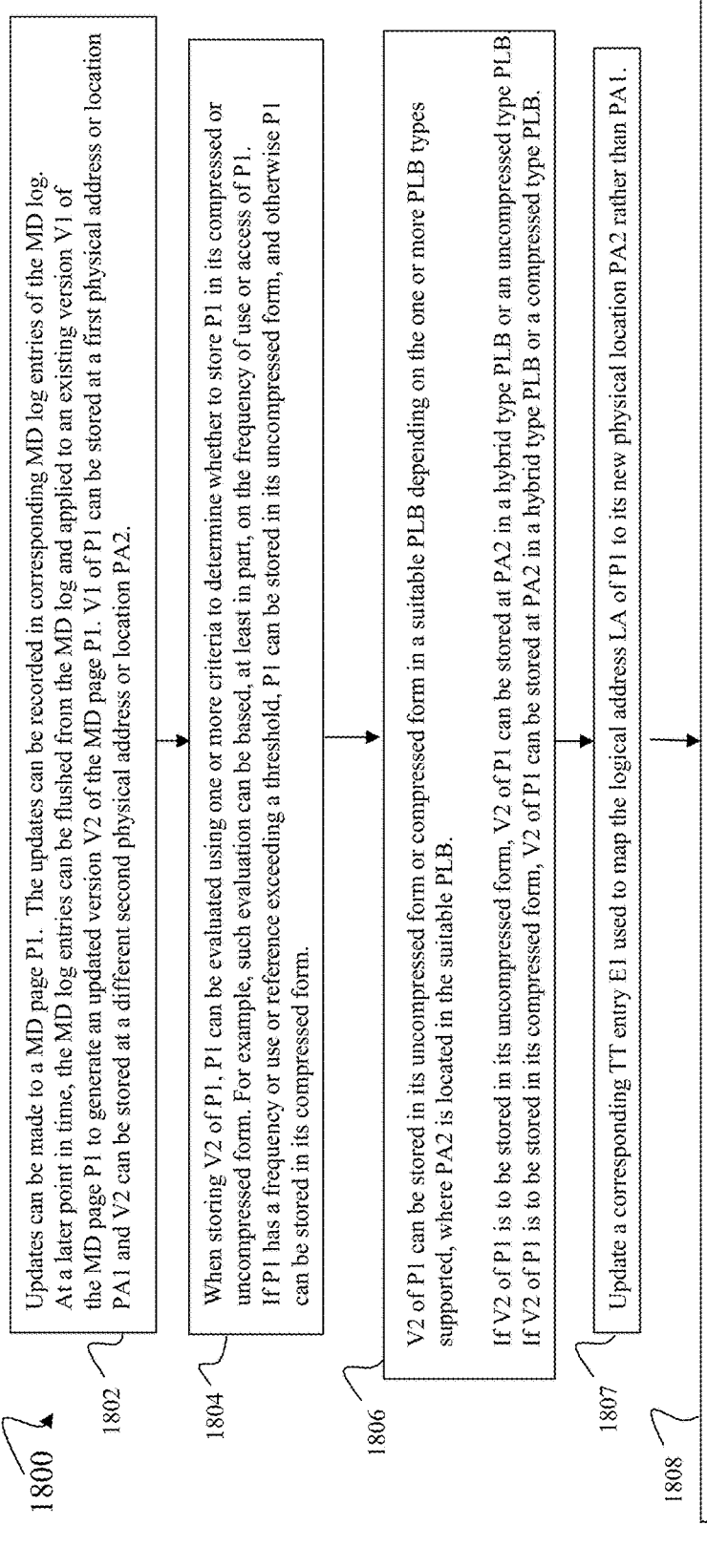

1800

1802 — Updates can be made to a MD page P1. The updates can be recorded in corresponding MD log entries of the MD log. At a later point in time, the MD log entries can be flushed from the MD log and applied to an existing version V1 of the MD page P1 to generate an updated version V2 of the MD page P1. V1 of P1 can be stored at a first physical address or location PA1 and V2 can be stored at a different second physical address or location PA2.

1804 — When storing V2 of P1, P1 can be evaluated using one or more criteria to determine whether to store P1 in its compressed or uncompressed form. For example, such evaluation can be based, at least in part, on the frequency of use or access of P1. If P1 has a frequency or use or reference exceeding a threshold, P1 can be stored in its uncompressed form, and otherwise P1 can be stored in its compressed form.

1806 — V2 of P1 can be stored in its uncompressed form or compressed form in a suitable PLB depending on the one or more PLB types supported, where PA2 is located in the suitable PLB.

If V2 of P1 is to be stored in its uncompressed form, V2 of P1 can be stored at PA2 in a hybrid type PLB or an uncompressed type PLB or a compressed type PLB. If V2 of P1 is to be stored in its compressed form, V2 of P1 can be stored at PA2 in a hybrid type PLB or a compressed type PLB.

1807 — Update a corresponding TT entry E1 used to map the logical address LA of P1 to its new physical location PA2 rather than PA1.

1808 — PA1 now references a location in a PLB that includes invalid or stale content (e.g., a stale version V1 of P1) such that PLB storage associated with PA1 can be reclaimed for reuse. PA2 references a location in a PLB that includes current valid content of the MD page P1. GC processing can be performed that includes moving or copying V2 of the MD page P1 from a source PLB location to a target PLB location.

In connection with moving or copying V2 of MD page P1 as part of GC processing, P1 can be evaluated to determine whether to store P1 in its compressed or uncompressed form. Such evaluation can be based, at least in part, on the frequency of use or access of P1. If P1 has a frequency or use or reference exceeding a threshold, P1 can be stored in its uncompressed form, and otherwise P1 can be stored in its compressed form.

GC processing can move or relocate V2 of P1 where V2 of P1 can be stored at the target PLB location in its uncompressed form or compressed form in a suitable PLB depending on the PLB types supported. If P1 is to be stored in its uncompressed form, P1 can be stored at the target PLB location in a hybrid type PLB or an uncompressed type PLB. If P1 is to be stored in its compressed form, P1 can be stored at the target PLB location in a hybrid type PLB or a compressed type PLB. TT entry E1 can be updated to now map LA of P1 to the target location.

FIG. 21

TECHNIQUES FOR COMPRESSION AND MANAGEMENT OF METADATA

BACKGROUND

Systems include different resources used by one or more host processors. The resources and the host processors in the system are interconnected by one or more communication connections, such as network connections. These resources include data storage devices such as those included in data storage systems. The data storage systems are typically coupled to one or more host processors and provide storage services to each host processor. Multiple data storage systems from one or more different vendors can be connected to provide common data storage for the one or more host processors.

A host performs a variety of data processing tasks and operations using the data storage system. For example, a host issues I/O operations, such as data read and write operations, that are subsequently received at a data storage system. The host systems store and retrieve data by issuing the I/O operations to the data storage system containing a plurality of host interface units, disk drives (or more generally storage devices), and disk interface units. The host systems access the storage devices through a plurality of channels provided therewith. The host systems provide data and access control information through the channels to a storage device of the data storage system. Data stored on the storage device is provided from the data storage system to the host systems also through the channels. The host systems do not address the storage devices of the data storage system directly, but rather, access what appears to the host systems as a plurality of files, objects, logical units, logical devices or logical volumes. Thus, the I/O operations issued by the host are directed to a particular storage entity, such as a file or logical device. The logical devices generally include physical storage provisioned from portions of one or more physical drives. Allowing multiple host systems to access the single data storage system allows the host systems to share data stored therein.

SUMMARY OF THE PRESENT DISCLOSURE

Various embodiments of the techniques herein can include a computer-implemented method, a system and a non-transitory computer readable medium. The system can include one or more processors, and a memory comprising code that, when executed, performs the method. The non-transitory computer readable medium can include code stored thereon that, when executed, performs the method. The method can comprise: updating a metadata (MD) page, wherein said updating includes recording first updates in first MD log entries of a MD log; and flushing the first MD log entries from the MD log, wherein said flushing includes: applying the first updates to a first version V1 of the MD page to generate an updated second version V2 of the MD page, where V1 of the MD page is stored at a first physical address or location PA1; evaluating V2 of the MD page to determine, in accordance with one or more criteria, whether to store V2 of the MD page in a selected one of i) a compressed form of the MD page or ii) an uncompressed form of the MD page; and storing, in accordance with said evaluating, V2 of the MD page at a second physical address or location PA2 in the selected one of the compressed form of the MD page or the uncompressed form of the MD page, wherein PA2 denotes a physical address or location that is different from PA1, and wherein PA2 is included in a first physical large block (PLB) of non-volatile storage having a first PLB type attribute that allows storing MD pages in the selected one of the compressed form of the MD page or the uncompressed form of the MD page.

In at least one embodiment, a translation table (TT) can be used in mapping logical addresses of MD pages to corresponding physical storage addresses or locations of MD pages as stored on non-volatile storage, and wherein a first TT entry of the TT can be used in mapping a first logical address LA1 of the MD page to a current physical address or location of a current version of the MD page. Prior to flushing, the first TT entry can map LA1 to PA1, and flushing can include updating the first TT entry to map LA1 to PA2 rather than PA1. Evaluating can determine that said selected one of the compressed form of the MD page or the uncompressed form of the MD page is the compressed form of the MD page, and wherein said storing can store V2 of the MD page in the compressed form at PA2 of the first PLB. The first PLB type attribute of the first PLB can be one of: i) a compressed type denoting that the first PLB includes compressed MD pages and does not include uncompressed MD pages, or ii) a hybrid type denoting that the first PLB includes both compressed MD pages and uncompressed MD pages.

In at least one embodiment, the first PLB can include a first back pointer entry for the MD page, wherein the first back pointer entry can include: i) a TT entry pointer identifying the first TT entry corresponding to the MD page, and ii) a first size denoting a size of the compressed form of the MD page as stored at PA2 in the first PLB, and wherein the first TT entry can include a first PLB pointer referencing the first back pointer entry. The first PLB type attribute of the first PLB can be the compressed type, and wherein the first PLB pointer can specify either: i) a direct location of the first back pointer entry or ii) a region pointer to a first region including the MD page as stored at PA2 in the compressed form of the MD page.

In at least one embodiment, the first PLB pointer of the first TT entry can specify the direct location of the first back pointer entry, wherein the first back pointer entry is used to read the MD page, and wherein the method can include: subsequent to said flushing, receiving a read request to read the MD page; and responsive to the read request, performing read processing including: mapping LA1 to the first back pointer entry using the first TT entry; obtaining, using the first back pointer entry, the compressed form of the MD page from PA2; decompressing the compressed form of the MD page, as obtained from PA2, to generate the uncompressed form of the MD page; and returning the uncompressed form of the MD page in response to the read request. The first PLB pointer denoting the direct location of the first back pointer entry can identify a first offset in the first PLB based on a first segment size, wherein the first segment size denotes multiple bytes, and wherein the first back pointer entry can be stored in the first PLB at the first offset, and where the first offset can be a multiple of the first segment size so that the first back pointer is storage aligned based on the first segment size.

In at least one embodiment, the first PLB pointer of the first TT entry can specify the region pointer to the first region, wherein the first back pointer entry is used to read the MD page, and wherein the method can include: subsequent to said flushing, receiving a read request to read the MD page; and responsive to the read request, performing read processing including: mapping, using the first TT entry, LA1 to a first PLB address of the first region; searching the first region for the first back pointer entry; obtaining, using the first back pointer entry, the compressed form of the MD page from PA2; decompressing the compressed form of the MD page, as obtained from PA2, to generate the uncompressed form of the MD page; and returning the uncompressed form of the MD page in response to the read request.

In at least one embodiment, the first PLB type attribute of the first PLB can be the hybrid type, and wherein the first PLB pointer can specify a direct location of the first back pointer entry. The first PLB pointer of the first TT entry can specify the direct location of the first back pointer entry, wherein the first back pointer entry can be used to read the MD page. Processing can include: subsequent to said flushing, receiving a read request to read the MD page; and responsive to receiving the read request, performing read processing including: mapping LA1 to the first back pointer entry using the first TT entry; obtaining, using the first back pointer entry, the compressed form of the MD page from PA2; decompressing the compressed form of the MD page, as obtained from PA2, to generate the uncompressed form of the MD page; and returning the uncompressed form of the MD page in response to the read request. The first PLB pointer denoting the direct location of the first back pointer entry can identify a first offset in the first PLB based on a first segment size, wherein the first segment size can denote multiple bytes, and wherein the first back pointer entry can stored in the first PLB at the first offset, and where the first offset can be a multiple of the first segment size so that the first back pointer is storage aligned based on the first segment size.

In at least one embodiment, the first PLB may only include back pointer entries for compressed MD pages of the first PLB and wherein the first PLB may not include back pointer entries for uncompressed MD page of the first PLB. A first set can include page type identifier (ID) values each identifying a different allowable page type. Each uncompressed MD page stored in the first PLB can include a page type identifier (ID) field with a page type ID value of the first set denoting a valid MD page type of said each uncompressed MD page. Each compressed MD page stored in the first PLB can include a corresponding back pointer entry that includes a first field with a first page type ID value of the first set, wherein the first page type ID value can denote a compressed page type. Each compressed MD page stored in the first PLB can be decompressed into its corresponding uncompressed form, where the corresponding uncompressed form can include the first page type ID field with a respective page type ID value corresponding to a valid MD page type of the uncompressed form of said each compressed MD page.

In at least one embodiment, the page type ID field of each uncompressed MD page of the first PLB can be located at a first position in said each uncompressed MD page, and wherein the first field of each back pointer entry can be located at the first position in said each back pointer entry. Read processing can include: reading a first portion of the first PLB, wherein the first portion has a starting address corresponding to the first PLB pointer of the first TT entry associated with the MD page; determining whether the first position of the first portion of the PLB includes the first page type ID value denoting a compressed page type; and responsive to determining that the first position of the first portion includes the first page type ID denoting a compressed page type, performing first processing including: determining that the first portion includes the first back pointer entry; using the first back pointer entry to obtain the compressed form of the MD page from the first PLB; decompressing the compressed form of the MD page to generate the uncompressed form of the MD page; and returning the uncompressed form of the MD page in response to the read request.

In at least one embodiment, processing can include: receiving a second read request to read a second MD page having a second logical address LA2; and responsive to receiving the second read request, performing second read processing including: mapping, using a second TT entry of the TT, LA2 to a third physical address PA3 of the first PLB; reading a second portion of the first PLB, wherein the second portion has a starting address corresponding to PA3 of the second TT entry; determining whether the first position of the second portion of the PLB includes the first page type ID value denoting a compressed page type; responsive to determining that the first position of the first portion does not include the first page type ID denoting a compressed page type, performing other processing including: determining that the second portion includes the uncompressed form of the second MD page; and returning the uncompressed form of the MD page, as obtained from the second portion, in response to the second read request.

In at least one embodiment, evaluating can determine that said selected one of the compressed form of the MD page or the uncompressed form of the MD page is the uncompressed form of the MD page, and wherein said storing can store V2 of the MD page in the uncompressed form at PA2 of the first PLB. The first PLB type attribute of the first PLB can be one of: i) an uncompressed type denoting that the first PLB includes uncompressed MD pages and does not include compressed MD pages, or ii) a hybrid type denoting that the first PLB includes both compressed MD pages and uncompressed MD pages. The criteria can include any one or more of: a frequency of access of the MD page, and a characterization of the MD page as either compressible or uncompressible.

BRIEF DESCRIPTION OF THE DRAWINGS

Features and advantages of the present disclosure will become more apparent from the following detailed description of exemplary embodiments thereof taken in conjunction with the accompanying drawings in which:

FIGS. 13B, 15, 20 and 21 are flowcharts of processing steps that can be performed in at least one embodiment in accordance with the techniques of the present disclosure.

DETAILED DESCRIPTION OF EMBODIMENT(S)

Figure 1:
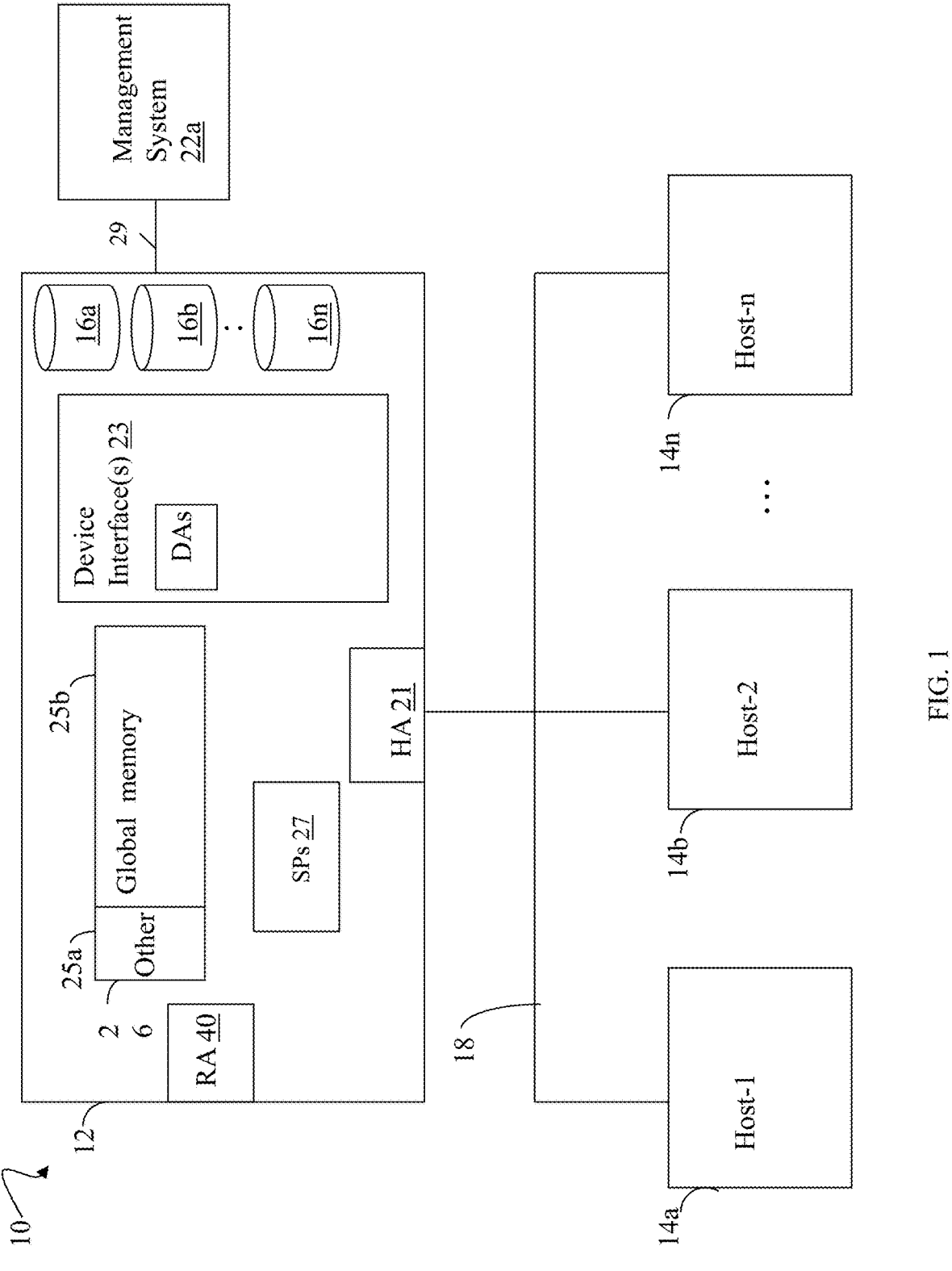
FIG. 1 is an example of components that may be included in a system in accordance with the techniques of the present disclosure.

A data storage system can use a log for recording user or client content updates, and can also use a metadata log for recording updates to metadata pages. The metadata (MD) pages can be used in connection with chains of mapping information that map logical addresses to storage locations including content stored at the logical addresses.

An entry from the log of user or client updates (sometimes referred to as the UD (user data) log) can be an update, such as a client write I/O, to a logical address (e.g., LUN or logical device and LBA or logical block address) which writes content to a UD page. Flushing the entry from the UD log can include writing the updated UD page to a backend storage location on non-volatile storage (e.g., BE (back end) PD (physical storage device) location). Additionally, flushing the entry from the UD log can include updating the corresponding MD pages which map the logical address to its corresponding BE PD location including the content stored at the logical address. In at least one embodiment, the mapping information including MD pages can thus be updated. For example, such updating of the mapping information can include updating a chain of MD pages used in connection with mapping the logical address to the BE PD location including the content stored at the logical address.

Updating the corresponding mapping information and MD pages can include loading all the MD pages into the cache if any such MD pages are not already in cache. The MD pages of the mapping information can be characterized as a chain forming an access sequence including a top MD page, a mid MD page, a leaf MD page, and a VLB (virtual or virtualized layer block) page, where each page in the foregoing sequence can be accessed serially and also in the sequential order of the sequence.

The data storage system can maintain the user data or client data, as stored persistently on non-volatile BE storage, as a log structured system (LSS) which can be characterized by typically not performing in place updates which overwrite existing content. In the LSS for user data, flushing one or more UD log entries of updates to a UD page stored at an existing physical storage location (e.g., on BE PDs) can include determining an updated version of the UD page and storing the updated version of the UD page at a new physical storage location that is different from the existing physical storage location. Thus, the physical storage location of the UD page (as stored persistently on the BE PDs) can move or change each time an updated version of the UD page is written to the BE PDs, where such updated version of the UD page can be the result of flushing one or more entries from the UD log which update the same UD page, and then persistently storing the updated version of the UD page on the BE PDs.

The MD pages used in connection with mapping information as noted above can be stored persistently using in-place updates or overwrites such that processing overwrites the existing version of a MD page as stored at a physical storage location on the BE PDs with an updated version of the MD page. The physical storage location (e.g., on BE PDs) of each MD page can thus remain static or fixed so that in-place updates overwrite the same existing persistent physical storage location of the MD page. With mapping information including a chain of MD pages that reference each other using such physical storage locations, such in-place updates or overwrites of MD pages can be desirable where each MD page remains in the same physical storage location on BE storage.

As an alternative in an embodiment in accordance with the techniques of the present disclosure, the persistent or non-volatile physical storage, such as on the BE PDs, used for storing the MD pages can be maintained as an LSS in a manner similar to the LSS storing user data or content. With an LSS for MD pages, an updated MD page can be determined as a result of applying one or more entries of the metadata log which update the MD page. A current version of the MD page (before applying the updates) can be stored at an existing physical storage location on non-volatile persistent storage (e.g., on BE PDs). The updated version of the MD page can be determined and then rewritten or stored at a new physical storage location that is different from the existing physical storage location. Thus, with an LSS for metadata, the physical storage location or address of the MD page can move or change each time an updated version of the MD page is written to the BE PDs, where such updated version of the MD page can be the result of flushing one or more entries from the metadata log which update the same MD page, and then persistently storing the updated version of the MD page at the new physical storage location on the BE PDs. Persistent physical storage for a MD page can be allocated at a physical address from the BE PDs.

In at least one embodiment in accordance with the techniques of the present disclosure providing for storing updated MD pages at new physical storage locations in an LSS rather than performing overwriting or in-place updates, logical addresses of MD pages can be used to reference the MD pages as opposed to referencing MD pages, and entries thereof, using physical storage locations or addresses. In at least one embodiment, the logical address of a MD page can be an indirect pointer or indirect address of the corresponding physical storage location or address of the persistently stored MD page. In at least one embodiment, a logical address of a MD page can be mapped to the physical address or storage location on the BE PDs where the MD page is stored. Thus, as the MD page is updated and its corresponding physical storage location changes over time, the logical address of the MD page can remain the same and the physical storage location or address on the BE PDs storing the persisted MD page can be allowed to change. When the logical address of the MD page is used to reference the MD page from the BE PDs, the logical address of the MD page can be translated or mapped to its current physical storage location on the BE PDs. Thus, designing an LSS for storing the MD pages can generally include some form of dynamic translation of logical to physical addresses or locations for the MD pages.

In at least one embodiment in accordance with the techniques of the present disclosure, a translation table (TT) can be used to map or translate a logical address of a MD page to its current physical storage location or address such as on BE PDs providing non-volatile storage. In at least one embodiment, as the physical storage location of a MD page changes from a first physical storage location or address PA1 to a second physical storage or address PA2, the TT used to map the MD page's logical address to the new physical storage location can also be updated. In at least one embodiment, the TT can be updated to reference the new physical storage location PA2 of the MD page rather than the prior physical storage location PAL. In at least one embodiment, the logical addresses of the MD pages can remain the same even though the physical addresses or storage locations of persistently stored versions of the MD pages can change as the MD pages are updated and rewritten to new physical addresses or storage locations in accordance with the LSS.

In at least one embodiment of the techniques of the present disclosure, the TT can be persistently stored on non-volatile storage such as the BE PDs. In at least one embodiment, the TT can also be stored in volatile memory included in a cache.

As MD page updates are flushed or destaged from the MD log and then applied to corresponding MD pages, updated MD pages are generated. The updated MD pages can then be persistently stored by writing out the updated MD pages to BE non-volatile storage. In at least one embodiment, rather issue a single small write for writing out each individual updated MD page to BE non-volatile storage, multiple updated MD pages to be written out to BE non-volatile storage can be grouped together and collectively written out to the BE non-volatile storage as large sequential writes to support the LSS processing for the MD. In at least one embodiment, the updated MD pages generated as a result of applying updates destaged or flushed from the MD log can be collected or accumulated in a persistent temporary staging area or buffer of a specified size. In at least one embodiment, the staging area or buffer can generally have a size that is much larger than each updated MD page. For example in at least one embodiment, the persistent buffer or staging area can have a size capable of storing 512 updated MD pages. Once the staging area or buffer is full, the buffer of multiple updated MD pages can be efficiently written out to BE non-volatile storage as a large sequential write to support the log structured processing and persistent storage of the MD. Issuing a single large write of a group of updated MD pages of the buffer can be more efficient than issuing a larger number of writes to store the same group of updated MD pages.

It should be noted that in various contexts herein, MD or metadata can be used to generally denote any type of metadata page such as top, mid, leaf and VLB pages, and in other contexts can refer to particular types of the metadata pages such as top, mid and leaf MD pages without including VLB pages.

Generally, as the size and storage capacity of storage systems continue to grow, so does the amount of MD used in connection with such storage systems. Various portions of the MD can be referenced more frequently than other MD at various points in time. As a result in at least one embodiment, portions of the MD can become cold or referenced infrequently at the various points in time. Regardless of the particular frequency of access, the MD can continue to increase in size and can continue to consume a substantial or non-trivial amount or percentage of overall BE non-volatile storage.

In at least one system the inventors have performed experimentation of compressing MD pages resulting in approximately a 2:1 compression ratio such that storing the compressed form of MD pages, rather than the uncompressed form of MD pages, results in about a 50% reduction in storage consumption. Thus storing compressed MD pages rather than uncompressed MD pages on BE non-volatile storage can result in a substantial decrease or reduction in the amount of BE non-volatile storage consumed for storing MD pages in the MD tier.

Typical non-LSS systems that store the updated MD pages in-place by overwriting the same physical storage locations with the updated MD pages each time cannot generally take advantage of compression to selectively reduce the BE non-volatile storage consumed for storing the MD pages. For example, consider that the compressed size of a MD page can vary each time the MD page is compressed and stored in its compressed form at a fixed physical address or location on BE non-volatile storage. Each compressed MD page can be stored in one arrangement of a non-LSS system at its fixed physical address to allow for the largest possible size of the compressed MD page such as where the compressed form of the MD page is the same size as the uncompressed form of the MD page. With such an arrangement in a non-LSS system where the MD pages are collectively stored in a MD tier of BE non-volatile storage, any reduction in storage consumption as a result of storing compressed MD pages can generally result in holes of unused storage between stored compressed MD pages due to the in-place updated MD pages being stored repeatedly at fixed physical addresses or locations. In this case, the holes of free storage are between the compressed MD pages stored at fixed physical addresses or locations in a non-LSS system.

In at least one embodiment in accordance with the techniques of the present disclosure as noted above, LSS MD management and storage can be performed. In at least one embodiment, use of an LSS for MD (sometimes referred to as log structured MD or LSM) can provide an opportunity to take advantage of compression of MD pages due to the log-based nature or characteristic of relocating MD pages each time they are updated and rewritten out to the MD tier of BE non-volatile storage.

Accordingly, described in the following paragraphs are techniques of the present disclosure that can be used in at least one embodiment to persistently store MD pages in their compressed form with LSM. In at least one embodiment, compressed MD pages can be stored in large chunks of storage, such as physical large blocks (PLBs) in the MD tier of BE non-volatile storage.

In at least one embodiment, the techniques of the present disclosure can be used with LSM to support storing MD pages in either a corresponding compressed form or uncompressed form such as depending on the frequency of updates made to particular MD pages. Thus in such an embodiment, MD pages can be selectively stored in either a corresponding compressed or uncompressed form.

In at least one embodiment, the techniques of the present disclosure can use a TT that maps logical addresses of MD pages to corresponding current physical addresses or locations in BE non-volatile storage.

In at least one embodiment, each PLB storing MD pages can include back pointer information that describes the corresponding locations of the MD pages as stored in the PLB as well as corresponding TT entries or indices of the TT.

In at least one embodiment, a PLB of the MD tier can include solely uncompressed MD pages (where the PLB is type uncompressed), or solely compressed MD pages (where the PLB type if compressed), along with any needed or desired corresponding descriptive information. In at least one embodiment, one or more of the PLBs of the MD tier can be a hybrid PLB type that includes both uncompressed MD pages and compressed MD pages.

In at least one embodiment, each MD page of a PLB can have corresponding back pointer information also stored or encoded in the PLB. In at least one embodiment where a PLB includes compressed MD pages, a PLB data layout or arrangement can encode or store the back pointer information for a corresponding compressed MD page immediately prior to the compressed MD page, where the back pointer information of the PLB is uncompressed. In such an embodiment, uncompressed back pointer information of corresponding compressed MD pages can be interspersed or interleaved between the corresponding compressed MD pages.

In at least one embodiment, back pointer information for MD pages can be used in connection with recovery processing and/or garbage collection processing of BE non-volatile storage.

The foregoing as well as additional features of the techniques of the present disclosure are described in more detail in the following paragraphs in connection with various non-limiting embodiments.

The foregoing and other aspects of the techniques of the present disclosure are described in more detail in the following paragraphs.

Referring to the FIG. 1, shown is an example of an embodiment of a SAN 10 that is used in connection with performing the techniques described herein. The SAN 10 includes a data storage system 12 connected to the host systems (also sometimes referred to as hosts) 14a-14n through the communication medium 18. In this embodiment of the SAN 10, the n hosts 14a-14n access the data storage system 12, for example, in performing input/output (I/O) operations or data requests. The communication medium 18 can be any one or more of a variety of networks or other type of communication connections as known to those skilled in the art. The communication medium 18 can be a network connection, bus, and/or other type of data link, such as a hardwire or other connections known in the art. For example, the communication medium 18 can be the Internet, an intranet, a network, or other wireless or other hardwired connection(s) by which the host systems 14a-14n access and communicate with the data storage system 12, and also communicate with other components included in the SAN 10.

Each of the host systems 14a-14n and the data storage system 12 included in the SAN 10 are connected to the communication medium 18 by any one of a variety of connections as provided and supported in accordance with the type of communication medium 18. The processors included in the host systems 14a-14n and data storage system 12 can be any one of a variety of proprietary or commercially available single or multi-processor system, such as an Intel-based processor, or other type of commercially available processor able to support traffic in accordance with each particular embodiment and application.

It should be noted that the particular examples of the hardware and software included in the data storage system 12 are described herein in more detail, and can vary with each particular embodiment. Each of the hosts 14a-14n and the data storage system 12 can all be located at the same physical site, or, alternatively, be located in different physical locations. The communication medium 18 used for communication between the host systems 14a-14n and the data storage system 12 of the SAN 10 can use a variety of different communication protocols such as block-based protocols (e.g., SCSI, FC, iSCSI, and/or NVMe (Non-Volatile Memory express)), file system-based protocols (e.g., NFS or network file server), and the like. Some or all of the connections by which the hosts 14a-14n and the data storage system 12 are connected to the communication medium 18 can pass through other communication devices, such as switching equipment, a phone line, a repeater, a multiplexer or even a satellite.

Each of the host systems 14a-14n can perform data operations. In the embodiment of the FIG. 1, any one of the host computers 14a-14n issues a data request to the data storage system 12 to perform a data operation. For example, an application executing on one of the host computers 14a-14n performs a read or write operation resulting in one or more data requests to the data storage system 12.

It should be noted that although the element 12 is illustrated as a single data storage system, such as a single data storage array, the element 12 also represents, for example, multiple data storage arrays alone, or in combination with, other data storage devices, systems, appliances, and/or components having suitable connectivity to the SAN 10 in an embodiment using the techniques herein. It should also be noted that an embodiment can include data storage arrays or other components from one or more vendors. In subsequent examples illustrating the techniques herein, reference is made to a single data storage array by a vendor. However, as will be appreciated by those skilled in the art, the techniques herein are applicable for use with other data storage arrays by other vendors and with other components than as described herein for purposes of example.

In at least one embodiment, the data storage system 12 is a data storage appliance or a data storage array including a plurality of data storage devices (PDs) 16a-16n. The data storage devices 16a-16n include one or more types of data storage devices such as, for example, one or more rotating disk drives and/or one or more non-volatile solid state drives (SSDs). An SSD is a data storage device that uses solid-state memory to store persistent data. SSDs refer to solid state electronics devices as distinguished from electromechanical devices, such as hard drives, having moving parts. Flash devices or flash memory-based SSDs are one type of SSD that contains no moving mechanical parts. In at least one embodiment, the flash devices can be constructed using nonvolatile semiconductor NAND flash memory. The flash devices include, for example, one or more SLC (single level cell) devices, MLC (multi level cell) devices, TLC (triple level cell) devices and/or QLC (quad level cell) devices.

In at least one embodiment, the data storage system or array includes different types of controllers, adapters or directors, such as an HA 21 (host adapter), RA 40 (remote adapter), and/or device interface(s) 23. Each of the adapters (sometimes also known as controllers, directors or interface components) can be implemented using hardware including a processor with a local memory with code stored thereon for execution in connection with performing different operations. The HAs are used to manage communications and data operations between one or more host systems and the global memory (GM). In an embodiment, the HA is a Fibre Channel Adapter (FA) or other adapter which facilitates host communication. The HA 21 can be characterized as a front end component of the data storage system which receives a request from one of the hosts 14a-n. In at least one embodiment, the data storage array or system includes one or more RAs used, for example, to facilitate communications between data storage arrays. The data storage array also includes one or more device interfaces 23 for facilitating data transfers to/from the data storage devices 16a-16n. The data storage device interfaces 23 include device interface modules, for example, one or more disk adapters (DAs) (e.g., disk controllers) for interfacing with the flash drives or other physical storage devices (e.g., PDs 16a-n). The DAs can also be characterized as back end components of the data storage system which interface with the physical data storage devices.

One or more internal logical communication paths exist between the device interfaces 23, the RAs 40, the HAs 21, and the memory 26. An embodiment, for example, uses one or more internal busses and/or communication modules. In at least one embodiment, the global memory portion 25b is used to facilitate data transfers and other communications between the device interfaces, the HAs and/or the RAs in a data storage array. In one embodiment, the device interfaces 23 performs data operations using a system cache included in the global memory 25b, for example, when communicating with other device interfaces and other components of the data storage array. The other portion 25a is that portion of the memory used in connection with other designations that can vary in accordance with each embodiment.

The particular data storage system as described in this embodiment, or a particular device thereof, such as a disk or particular aspects of a flash device, should not be construed as a limitation. Other types of commercially available data storage systems, as well as processors and hardware controlling access to these particular devices, can also be included in an embodiment.

The host systems 14a-14n provide data and access control information through channels to the storage systems 12, and the storage systems 12 also provide data to the host systems 14a-n also through the channels. The host systems 14a-n do not address the drives or devices 16a-16n of the storage systems directly, but rather access to data is provided to one or more host systems from what the host systems view as a plurality of logical devices, logical volumes (LVs) also referred to herein as logical units (e.g., LUNs). A logical unit (LUN) can be characterized as a disk array or data storage system reference to an amount of storage space that has been formatted and allocated for use to one or more hosts. A logical unit has a logical unit number that is an I/O address for the logical unit. As used herein, a LUN or LUNs refers to the different logical units of storage referenced by such logical unit numbers. The LUNs have storage provisioned from portions of one or more physical disk drives or more generally physical storage devices. For example, one or more LUNs can reside on a single physical disk drive, data of a single LUN can reside on multiple different physical devices, and the like. Data in a single data storage system, such as a single data storage array, can be accessible to multiple hosts allowing the hosts to share the data residing therein. The HAs are used in connection with communications between a data storage array and a host system. The RAs are used in facilitating communications between two data storage arrays. The DAs include one or more types of device interfaced used in connection with facilitating data transfers to/from the associated disk drive(s) and LUN (s) residing thereon. For example, such device interfaces can include a device interface used in connection with facilitating data transfers to/from the associated flash devices and LUN(s) residing thereon. It should be noted that an embodiment can use the same or a different device interface for one or more different types of devices than as described herein.

In an embodiment in accordance with the techniques herein, the data storage system as described can be characterized as having one or more logical mapping layers in which a logical device of the data storage system is exposed to the host whereby the logical device is mapped by such mapping layers of the data storage system to one or more physical devices. Additionally, the host can also have one or more additional mapping layers so that, for example, a host side logical device or volume is mapped to one or more data storage system logical devices as presented to the host.

It should be noted that although examples of the techniques herein are made with respect to a physical data storage system and its physical components (e.g., physical hardware for each HA, DA, HA port and the like), the techniques herein can be performed in a physical data storage system including one or more emulated or virtualized components (e.g., emulated or virtualized ports, emulated or virtualized DAs or HAs), and also a virtualized or emulated data storage system including virtualized or emulated components.

Also shown in the FIG. 1 is a management system 22a used to manage and monitor the data storage system 12. In one embodiment, the management system 22a is a computer system which includes data storage system management software or application that executes in a web browser. A data storage system manager can, for example, view information about a current data storage configuration such as LUNs, storage pools, and the like, on a user interface (UI) in a display device of the management system 22a. Alternatively, and more generally, the management software can execute on any suitable processor in any suitable system. For example, the data storage system management software can execute on a processor of the data storage system 12.

Information regarding the data storage system configuration is stored in any suitable data container, such as a database. The data storage system configuration information stored in the database generally describes the various physical and logical entities in the current data storage system configuration. The data storage system configuration information describes, for example, the LUNs configured in the system, properties and status information of the configured LUNs (e.g., LUN storage capacity, unused or available storage capacity of a LUN, consumed or used capacity of a LUN), configured RAID groups, properties and status information of the configured RAID groups (e.g., the RAID level of a RAID group, the particular PDs that are members of the configured RAID group), the PDs in the system, properties and status information about the PDs in the system, data storage system performance information such as regarding various storage objects and other entities in the system, and the like.

Consistent with other discussion herein, management commands issued over the control or management path include commands that query or read selected portions of the data storage system configuration, such as information regarding the properties or attributes of one or more LUNs. The management commands also include commands that write, update, or modify the data storage system configuration, such as, for example, to create or provision a new LUN (e.g., which result in modifying one or more database tables such as to add information for the new LUN), and the like.

It should be noted that each of the different controllers or adapters, such as each HA, DA, RA, and the like, can be implemented as a hardware component including, for example, one or more processors, one or more forms of memory, and the like. Code can be stored in one or more of the memories of the component for performing processing.

The device interface, such as a DA, performs I/O operations on a physical device or drive 16a-16n. In the following description, data residing on a LUN is accessed by the device interface following a data request in connection with I/O operations. For example, a host issues an I/O operation that is received by the HA 21. The I/O operation identifies a target location from which data is read from, or written to, depending on whether the I/O operation is, respectively, a read or a write operation request. In at least one embodiment using block storage services, the target location of the received I/O operation is expressed in terms of a LUN and logical address or offset location (e.g., LBA or logical block address) on the LUN. Processing is performed on the data storage system to further map the target location of the received I/O operation, expressed in terms of a LUN and logical address or offset location on the LUN, to its corresponding physical storage device (PD) and location on the PD. The DA which services the particular PD performs processing to either read data from, or write data to, the corresponding physical device location for the I/O operation.

It should be noted that an embodiment of a data storage system can include components having different names from that described herein but which perform functions similar to components as described herein. Additionally, components within a single data storage system, and also between data storage systems, can communicate using any suitable technique described herein for exemplary purposes. For example, the element 12 of the FIG. 1 in one embodiment is a data storage system, such as a data storage array, that includes multiple storage processors (SPs). Each of the SPs 27 is a CPU including one or more "cores" or processors and each have their own memory used for communication between the different front end and back end components rather than utilize a global memory accessible to all storage processors. In such embodiments, the memory 26 represents memory of each such storage processor.

Generally, the techniques herein can be used in connection with any suitable storage system, appliance, device, and the like, in which data is stored. For example, an embodiment can implement the techniques herein using a midrange data storage system as well as a higher end or enterprise data storage system.

The data path or I/O path can be characterized as the path or flow of I/O data through a system. For example, the data or I/O path can be the logical flow through hardware and software components or layers in connection with a user, such as an application executing on a host (e.g., more generally, a data storage client) issuing I/O commands (e.g., SCSI-based commands, and/or file-based commands) that read and/or write user data to a data storage system, and also receive a response (possibly including requested data) in connection such I/O commands.

The control path, also sometimes referred to as the management path, can be characterized as the path or flow of data management or control commands through a system. For example, the control or management path is the logical flow through hardware and software components or layers in connection with issuing data storage management command to and/or from a data storage system, and also receiving responses (possibly including requested data) to such control or management commands. For example, with reference to the FIG. 1, the control commands are issued from data storage management software executing on the management system 22a to the data storage system 12. Such commands, for example, establish or modify data services, provision storage, perform user account management, and the like. Consistent with other discussion herein, management commands result in processing that can include reading and/or modifying information in the database storing data storage system configuration information.

The data path and control path define two sets of different logical flow paths. In at least some of the data storage system configurations, at least part of the hardware and network connections used for each of the data path and control path differ. For example, although both control path and data path generally use a network for communications, some of the hardware and software used can differ. For example, with reference to the FIG. 1, a data storage system has a separate physical connection 29 from a management system 22a to the data storage system 12 being managed whereby control commands are issued over such a physical connection 29. However, user I/O commands are never issued over such a physical connection 29 provided solely for purposes of connecting the management system to the data storage system. In any case, the data path and control path each define two separate logical flow paths.

Figure 2A:
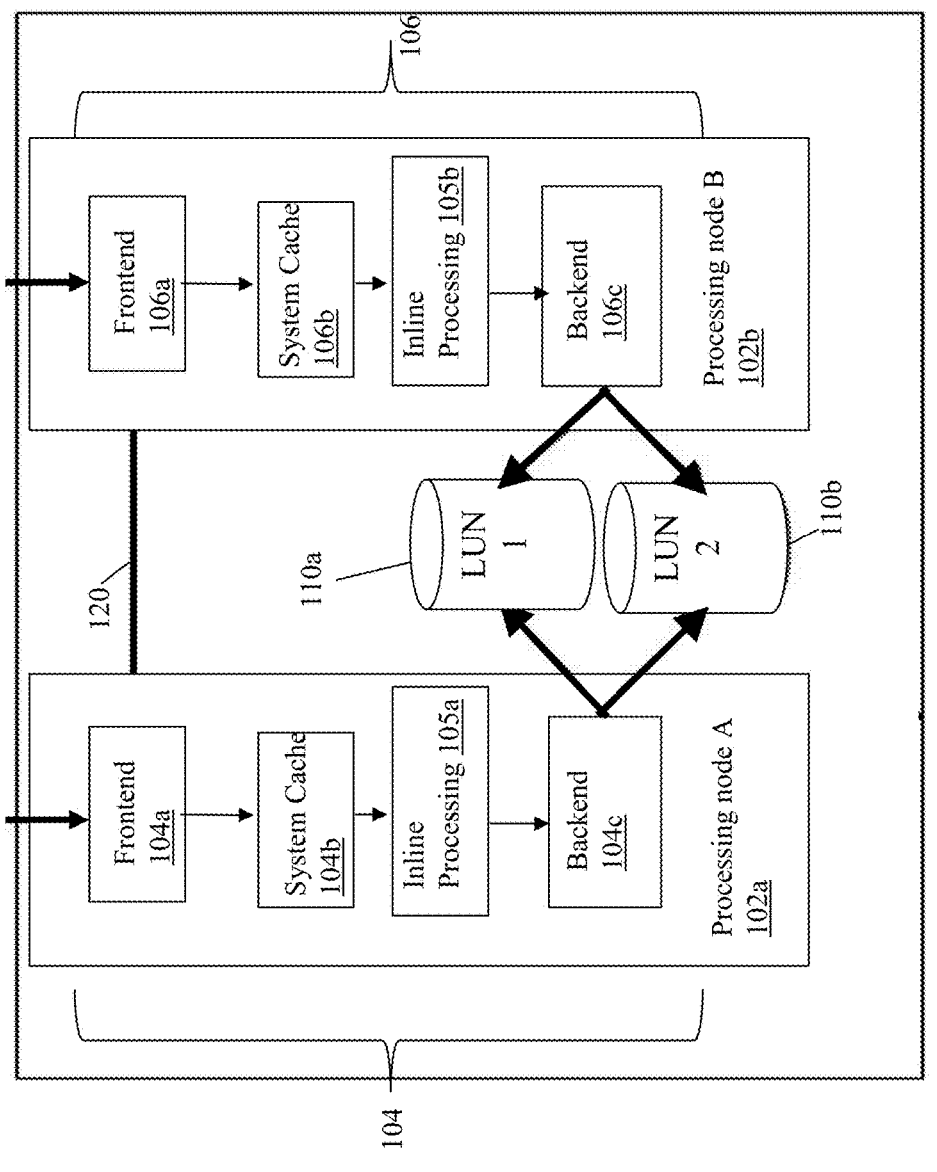
FIG. 2A is an example illustrating the I/O path or data path in connection with processing data in at least one embodiment in accordance with the techniques of the present disclosure.

With reference to the FIG. 2A, shown is an example 100 illustrating components that can be included in the data path in at least one existing data storage system in accordance with the techniques of the present disclosure. The example 100 includes two processing nodes A 102a and B 102b and the associated software stacks 104, 106 of the data path, where I/O requests can be received by either processing node 102a or 102b. In the example 200, the data path 104 of processing node A 102a includes: the frontend (FE) component 104a (e.g., an FA or front end adapter) that translates the protocol-specific request into a storage system-specific request; a system cache layer 104b where data is temporarily stored; an inline processing layer 105a; and a backend (BE) component 104c that facilitates movement of the data between the system cache and non-volatile physical storage (e.g., back end physical non-volatile storage devices or PDs accessed by BE components such as DAs as described herein). During movement of data in and out of the system cache layer 104b (e.g., such as in connection with read data from, and writing data to, physical storage 110a, 110b), inline processing can be performed by layer 105a. Such inline processing operations of 105a can be optionally performed and can include any one of more data processing operations in connection with data that is flushed from system cache layer 104b to the back-end non-volatile physical storage 110a, 110b, as well as when retrieving data from the back-end non-volatile physical storage 110a, 110b to be stored in the system cache layer 104b. In at least one embodiment, the inline processing can include, for example, performing one or more data reduction operations such as data deduplication or data compression. The inline processing can include performing any suitable or desirable data processing operations as part of the I/O or data path.

In a manner similar to that as described for data path 104, the data path 106 for processing node B 102b has its own FE component 106a, system cache layer 106b, inline processing layer 105b, and BE component 106c that are respectively similar to the components 104a, 104b, 105a and 104c. The elements 110a, 110b denote the non-volatile BE physical storage provisioned from PDs for the LUNs, whereby an I/O can be directed to a location or logical address of a LUN and where data can be read from, or written to, the logical address. The LUNs 110a, 110b are examples of storage objects representing logical storage entities included in an existing data storage system configuration. Since, in this example, writes, or more generally I/Os, directed to the LUNs 110a, 110b can be received for processing by either of the nodes 102a and 102b, the example 100 illustrates what can also be referred to as an active-active configuration.

In connection with a write operation received from a host and processed by the processing node A 102a, the write data can be written to the system cache 104b, marked as write pending (WP) denoting it needs to be written to the physical storage 110a, 110b and, at a later point in time, the write data can be destaged or flushed from the system cache to the physical storage 110a, 110b by the BE component 104c. The write request can be considered complete once the write data has been stored in the system cache whereby an acknowledgement regarding the completion can be returned to the host (e.g., by component the 104a). At various points in time, the WP data stored in the system cache is flushed or written out to the physical storage 110a, 110b.

In connection with the inline processing layer 105a, prior to storing the original data on the physical storage 110a, 110b, one or more data reduction operations can be performed. For example, the inline processing can include performing data compression processing, data deduplication processing, and the like, that can convert the original data (as stored in the system cache prior to inline processing) to a resulting representation or form which is then written to the physical storage 110a, 110b.

In connection with a read operation to read a block of data, a determination is made as to whether the requested read data block is stored in its original form (in system cache 104b or on physical storage 110a, 110b), or whether the requested read data block is stored in a different modified form or representation. If the requested read data block (which is stored in its original form) is in the system cache, the read data block is retrieved from the system cache 104b and returned to the host. Otherwise, if the requested read data block is not in the system cache 104b but is stored on the physical storage 110a, 110b in its original form, the requested data block is read by the BE component 104c from the backend storage 110a, 110b, stored in the system cache and then returned to the host.

If the requested read data block is not stored in its original form, the original form of the read data block is recreated and stored in the system cache in its original form so that it can be returned to the host. Thus, requested read data stored on physical storage 110a, 110b can be stored in a modified form where processing is performed by 105a to restore or convert the modified form of the data to its original data form prior to returning the requested read data to the host.

Also illustrated in FIG. 2A is an internal network interconnect 120 between the nodes 102a, 102b. In at least one embodiment, the interconnect 120 can be used for internode communication between the nodes 102a, 102b.

In connection with at least one embodiment in accordance with the techniques of the present disclosure, each processor or CPU can include its own private dedicated CPU cache (also sometimes referred to as processor cache) that is not shared with other processors. In at least one embodiment, the CPU cache, as in general with cache memory, can be a form of fast memory (relatively faster than main memory which can be a form of RAM). In at least one embodiment, the CPU or processor cache is on the same die or chip as the processor and typically, like cache memory in general, is far more expensive to produce than normal RAM used as main memory. The processor cache can be substantially faster than the system RAM used as main memory. The processor cache can contain information that the processor will be immediately and repeatedly accessing. The faster memory of the CPU cache can for example, run at a refresh rate that's closer to the CPU's clock speed, which minimizes wasted cycles. In at least one embodiment, there can be two or more levels (e.g., L1, L2 and L3) of cache. The CPU or processor cache can include at least an L1 level cache that is the local or private CPU cache dedicated for use only by that particular processor. The two or more levels of cache in a system can also include at least one other level of cache (LLC or lower level cache) that is shared among the different CPUs. The L1 level cache serving as the dedicated CPU cache of a processor can be the closest of all cache levels (e.g., L1-L3) to the processor which stores copies of the data from frequently used main memory locations. Thus, the system cache as described herein can include the CPU cache (e.g., the L1 level cache or dedicated private CPU/processor cache) as well as other cache levels (e.g., the LLC) as described herein. Portions of the LLC can be used, for example, to initially cache write data which is then flushed to the backend physical storage such as BE PDs providing non-volatile storage. For example, in at least one embodiment, a RAM based memory can be one of the caching layers used as to cache the write data that is then flushed to the backend physical storage. When the processor performs processing, such as in connection with the inline processing 105a, 105b as noted above, data can be loaded from the main memory and/or other lower cache levels into its CPU cache.

In at least one embodiment, the data storage system can be configured to include one or more pairs of nodes, where each pair of nodes can be generally as described and represented as the nodes 102a-b in the FIG. 2A. For example, a data storage system can be configured to include at least one pair of nodes and at most a maximum number of node pairs, such as for example, a maximum of 4 node pairs. The maximum number of node pairs can vary with embodiment. In at least one embodiment, a base enclosure can include the minimum single pair of nodes and up to a specified maximum number of PDs. In some embodiments, a single base enclosure can be scaled up to have additional BE non-volatile storage using one or more expansion enclosures, where each expansion enclosure can include a number of additional PDs. Further, in some embodiments, multiple base enclosures can be grouped together in a load-balancing cluster to provide up to the maximum number of node pairs. Consistent with other discussion herein, each node can include one or more processors and memory. In at least one embodiment, each node can include two multi-core processors with each processor of the node having a core count of between 8 and 28 cores. In at least one embodiment, the PDs can all be non-volatile SSDs, such as flash-based storage devices and storage class memory (SCM) devices. It should be noted that the two nodes configured as a pair can also sometimes be referred to as peer nodes. For example, the node A 102a is the peer node of the node B 102b, and the node B 102b is the peer node of the node A 102a.

In at least one embodiment, the data storage system can be configured to provide both block and file storage services with a system software stack that includes an operating system running directly on the processors of the nodes of the system.

In at least one embodiment, the data storage system can be configured to provide block-only storage services (e.g., no file storage services). A hypervisor can be installed on each of the nodes to provide a virtualized environment of virtual machines (VMs).

The system software stack can execute in the virtualized environment deployed on the hypervisor. The system software stack (sometimes referred to as the software stack or stack) can include an operating system running in the context of a VM of the virtualized environment. Additional software components can be included in the system software stack and can also execute in the context of a VM of the virtualized environment.

In at least one embodiment, each pair of nodes can be configured in an active-active configuration as described elsewhere herein, such as in connection with FIG. 2A, where each node of the pair has access to the same PDs providing BE storage for high availability. With the active-active configuration of each pair of nodes, both nodes of the pair process I/O operations or commands and also transfer data to and from the BE PDs attached to the pair. In at least one embodiment, BE PDs attached to one pair of nodes are not shared with other pairs of nodes. A host can access data stored on a BE PD through the node pair associated with or attached to the PD.

In at least one embodiment, each pair of nodes provides a dual node architecture where both nodes of the pair can be generally identical in terms of hardware and software for redundancy and high availability. Consistent with other discussion herein, each node of a pair can perform processing of the different components (e.g., FA, DA, and the like) in the data path or I/O path as well as the control or management path. Thus, in such an embodiment, different components, such as the FA, DA and the like of FIG. 1, can denote logical or functional components implemented by code executing on the one or more processors of each node. Each node of the pair can include its own resources such as its own local (i.e., used only by the node) resources such as local processor(s), local memory, and the like.

Consistent with other discussion herein, a cache can be used for caching write I/O data and other cached information. In one system, the cache used for caching logged writes can be implemented using multiple caching devices or PDs, such as non-volatile (NV) SSDs such as NVRAM devices that are external with respect to both of the nodes or storage controllers. The caching devices or PDs used to implement the cache can be configured in a RAID group of any suitable RAID level for data protection. In at least one embodiment, the caching PDs form a shared non-volatile cache accessible to both nodes of the dual node architecture. It should be noted that in a system where the caching devices or PDs are external with respect to the two nodes, the caching devices or PDs are in addition to other non-volatile PDs accessible to both nodes. The additional PDs provide the BE non-volatile storage for the nodes where the cached data stored on the caching devices or PDs is eventually flushed to the BE PDs as discussed elsewhere herein. In at least one embodiment, a portion of each node's local volatile memory can also be used for caching information, such as blocks or pages of user data and metadata. For example, such node-local cached pages of user data and metadata can be used in connection with servicing reads for such user data and metadata.

In the following paragraphs, the one or more caching devices or PDs may be referred to as a data journal or log used in the data storage system. In such a system, the caching devices or PDs are non-volatile log devices or PDs upon which the log is persistently stored. It should be noted that as discussed elsewhere herein, both nodes can also each have local volatile memory used as a node local cache for storing data, structures and other information. In at least one embodiment, the local volatile memory local to one of the nodes is used exclusively by that one node.

In a data storage system, minimizing the latency of I/O requests is a critical performance metric. In at least one data storage system using the dual node architecture such as described in connection with FIG. 2A, for write operations, latency can be affected by the amount of time taken to store the write data in the log where the write data is visible to both nodes or controllers of the system.

Consistent with other discussion herein, the log file used to log user operations, such as write I/Os, can be used to optimize write operation latency. Generally, a write operation writing data is received by the data storage system from a host or other client. The data storage system then performs processing to persistently record the write operation in the log. Once the write operation is persistently recorded in the log, the data storage system can send an acknowledgement to the client regarding successful completion of the write operation. At some point in time subsequent to logging the write operation the log, the write operation is flushed or destaged from the log to the BE PDs. In connection with flushing the recorded write operation from the log, the data written by the write operation is stored on non-volatile physical storage of a BE PD. The space of the log used to record the write operation that has been flushed can now be reclaimed for reuse.

It should be noted that the flushing of the log can be performed in response to an occurrence of any one or more defined conditions. For example, the log can be flushed in response to determining that the amount of reclaimed log space available for use and allocation is less than a specified threshold amount or size.

In at least one embodiment, a metadata (MD) structure of mapping information can be used in accordance with the techniques herein. The mapping information can be used, for example, to map a logical address, such as a LUN and an LBA or offset, to its corresponding storage location, such as a physical storage location on BE non-volatile PDs of the system. Consistent with discussion elsewhere herein, write requests or operations stored in the log can be flushed to the BE PDs (non-volatile) providing storage locations for the written data. For example, a logged write operation that writes first data to a logical address can be flushed whereby the logged first data is written out to a physical storage location on a BE PD. The mapping information can be used to map the logical address to the physical storage location containing the content or data stored at the logical address. In at least one embodiment, the mapping information includes a MD structure that is hierarchical structure of multiple layers of MD pages or blocks.

Figure 3:
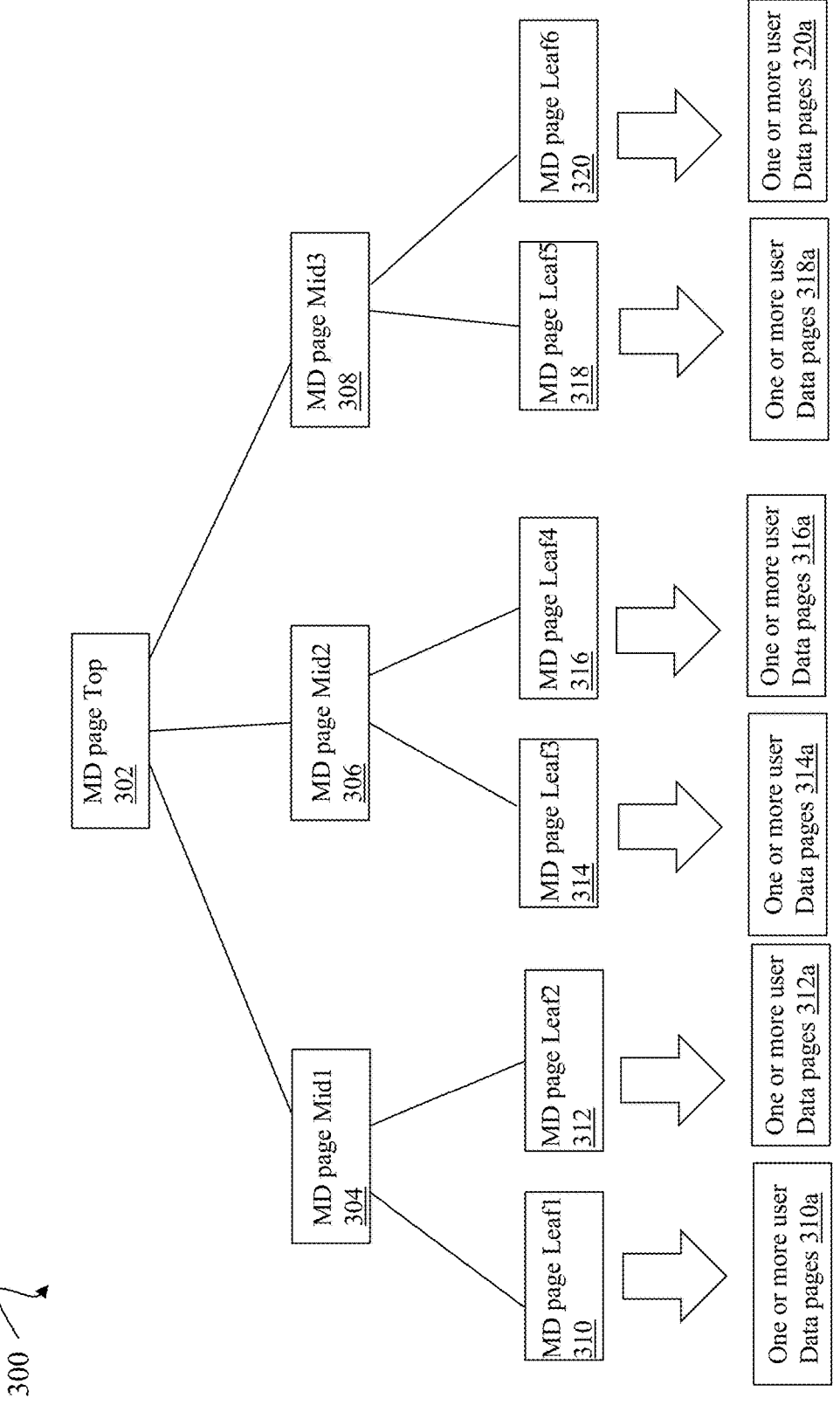
FIGS. 3, 4 and 5 are examples of mapping information in the form of a metadata structure that can be used in connection with mapping logical addresses to physical addresses or storage locations in at least one embodiment in accordance with the techniques of the present disclosure.

In at least one embodiment, the mapping information or MD structure for a LUN, such as a LUN A, can be in the form of a tree having a plurality of levels of MD pages. More generally, the mapping structure can be in the form of any ordered list or hierarchical structure. In at least one embodiment, the mapping structure for the LUN A can include LUN MD in the form of a tree having 3 levels including a single top or root node (TOP node), a single mid-level (MID node) and a bottom level of leaf nodes (LEAF nodes), where each of the MD page leaf nodes can point to, or reference (directly or indirectly) one or more pages of stored data, such as user data stored on the LUN A. Each node in the tree corresponds to a MD page including MD for the LUN A. More generally, the tree or other hierarchical structure of various MD pages of the mapping structure for the LUN A can include any suitable number of levels, such as more than 3 levels where there are multiple mid-levels. In at least one embodiment the tree of MD pages for the LUN can be a B+xtree, also sometimes referred to as an "N-ary" tree, where "N" indicates that each node in the tree structure can have up to a maximum of N child nodes. For example, in at least one embodiment, the tree of MD pages for the LUN can specify N=512 whereby each node in the tree structure can have up to a maximum of N child nodes. For simplicity of illustration, the tree structure of MD pages, corresponding to the mapping structure in at least one embodiment, is represented in FIG. 3 as including only 3 levels where each node in the tree can have at most 3 child nodes. Generally, the techniques herein can be used with any layered or hierarchical structure of MD pages.

Before describing in more detail the mapping information of MD pages that can be used in an at least one embodiment to map a logical address to a corresponding physical storage location or address, further details are described in connection with using a log for logging user or client operations, such as write I/Os.

Consistent with other discussion herein, the log can be used to optimize write operation latency. Generally, the write operation writing data is received by the data storage system from a host or other client. The data storage system then performs processing to persistently record the write operation in the log. Once the write operation is persistently recorded in the log, the data storage system can send an acknowledgement to the client regarding successful completion of the write operation. At some point in time subsequent to logging the write operation the log, the write operation is flushed or destaged from the log to the BE PDs. In connection with flushing the recorded write operation from the log, the data written by the write operation is stored on non-volatile physical storage of a BE PD. The space of the log used to record the write operation that has been flushed can now be reclaimed for reuse. The write operation can be recorded in the log in any suitable manner and can include, for example, recording a target logical address to which the write operation is directed and recording the data written to the target logical address by the write operation.

In the log, each logged operation can be recorded in the next logically sequential record of the log. For example, a logged write I/O and write data (e.g., write I/O payload) can be recorded in a next logically sequential record of the log. The log can be circular in nature in that once a write operation is recorded in the last record of the log, recording of the next write proceeds with recording in the first record of the log.

The typical I/O pattern for the log as a result of recording write I/Os and possibly other information in successive consecutive log records includes logically sequential and logically contiguous writes (e.g., logically with respect to the logical offset or ordering within the log). Data can also be read from the log as needed (e.g., depending on the particular use or application of the log) so typical I/O patterns can also include reads. The log can have a physical storage layout corresponding to the sequential and contiguous order in which the data is written to the log. Thus, the log data can be written to sequential and consecutive physical storage locations in a manner corresponding to the logical sequential and contiguous order of the data in the log. Additional detail regarding use and implementation of the log in at least one embodiment in accordance with the techniques of the present disclosure is provided below.

Figure 2B:
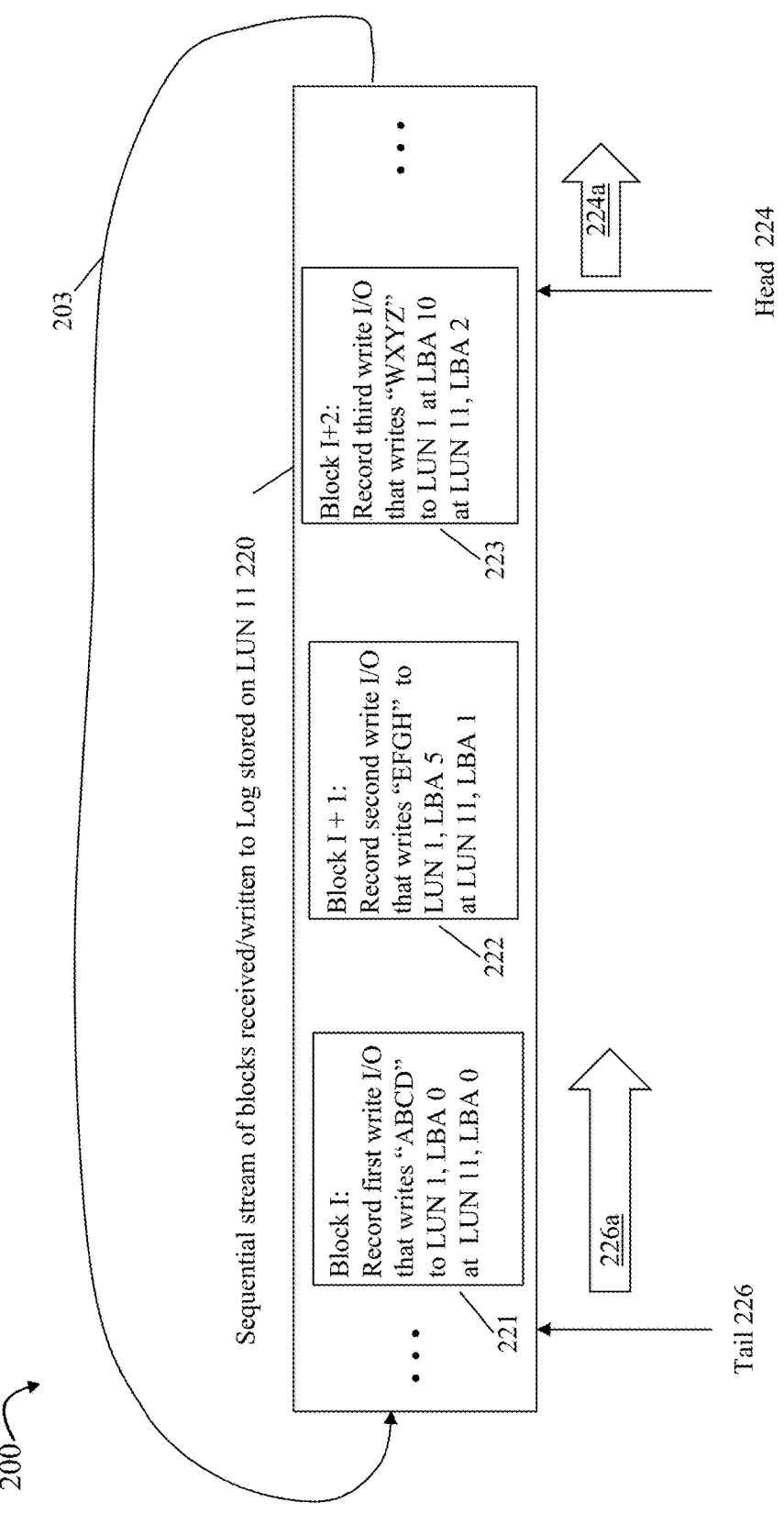
FIGS. 2B, 2C and 2D are examples illustrating use of a log or journal recording client operations in at least one embodiment in accordance with the techniques of the present disclosure.

Referring to FIG. 2B, shown is an example 200 illustrating a sequential stream 220 of operations or requests received that are written to a log in an embodiment in accordance with the techniques of the present disclosure. In this example, the log can be stored on the LUN 11 where logged operations or requests, such as write I/Os that write user data to a file, target LUN or other storage object, are recorded as records in the log. The element 220 includes information or records of the log for 3 write I/Os or updates which are recorded in the records or blocks I 221, I+1 222 and I+2 223 of the log (e.g., where I denotes an integer offset of a record or logical location in the log). The blocks I 221, I+1 222, and I+2 223 can be written sequentially in the foregoing order for processing in the data storage system. The block 221 can correspond to the record or block I of the log stored at LUN 11, LBA 0 that logs a first write I/O operation. The first write I/O operation can write "ABCD" to the target logical address LUN 1, LBA 0. The block 222 can correspond to the record or block I+1 of the log stored at LUN 11, LBA 1 that logs a second write I/O operation. The second write I/O operation can write "EFGH" to the target logical address LUN 1, LBA 5. The block 223 can correspond to the record or block I+2 of the log stored at LUN 11, LBA 2 that logs a third write I/O operation. The third write I/O operation can write "WXYZ" to the target logical address LUN 1, LBA 10. Thus, each of the foregoing 3 write I/O operations logged in 221, 222 and 223 write to 3 different logical target addresses or locations each denoted by a target LUN and logical offset on the target LUN. As illustrated in the FIG. 2B, the information recorded in each of the foregoing records or blocks 221, 222 and 223 of the log can include the target logical address to which data is written and the write data written to the target logical address.

The head pointer 224 can denote the next free record or block of the log used to record or log the next write I/O operation. The head pointer can be advanced 224a to the next record in the log as each next write I/O operation is recorded. When the head pointer 224 reaches the end of the log by writing to the last sequential block or record of the log, the head pointer can advance 203 to the first sequential block or record of the log in a circular manner and continue processing. The tail pointer 226 can denote the next record or block of a recorded write I/O operation in the log to be destaged and flushed from the log. Recorded or logged write I/Os of the log are processed and flushed whereby the recorded write I/O operation that writes to a target logical address or location (e.g., target LUN and offset) is read from the log and then executed or applied to a non-volatile BE PD location mapped to the target logical address (e.g., where the BE PD location stores the data content of the target logical address). Thus, as records are flushed from the log, the tail pointer 226 can logically advance 226a sequentially (e.g., advance to the right toward the head pointer and toward the end of the log) to a new tail position. Once a record or block of the log is flushed, the record or block is freed for reuse in recording another write I/O operation. When the tail pointer reaches the end of the log by flushing the last sequential block or record of the log, the tail pointer advances 203 to the first sequential block or record of the log in a circular manner and continue processing. Thus, the circular logical manner in which the records or blocks of the log are processed form a ring buffer in which the write I/Os are recorded.

When a write I/O operation writing user data to a target logical address is persistently recorded and stored in the non-volatile log, the write I/O operation is considered complete and can be acknowledged as complete to the host or other client originating the write I/O operation to reduce the write I/O latency and response time. The write I/O operation and write data are destaged at a later point in time during a flushing process that flushes a recorded write of the log to the BE non-volatile PDs, updates and writes any corresponding metadata for the flushed write I/O operation, and frees the record or block of the log (e.g., where the record or block logged the write I/O operation just flushed). The metadata updated as part of the flushing process for the target logical address of the write I/O operation can include mapping information as described elsewhere herein. The mapping information of the metadata for the target logical address can identify the physical address or location on provisioned physical storage on a non-volatile BE PD storing the data of the target logical address. The target logical address can be, for example, a logical address on a logical device, such as a LUN and offset or LBA on the LUN.

Figure 2C:
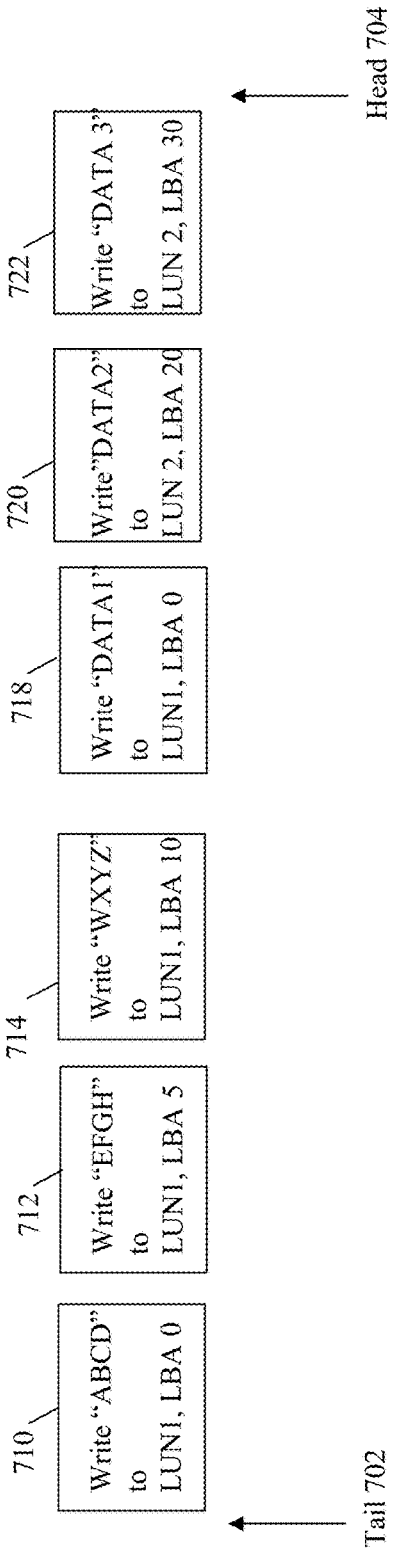

Referring to FIG. 2C, shown is an example of information that can be included in a log, such as a log of user or client write operations, in an embodiment in accordance with the techniques of the present disclosure.

The example 700 includes the head pointer 704 and the tail pointer 702. The elements 710, 712, 714, 718, 720 and 722 denote 6 records of the log for 6 write I/O operations recorded in the log. The element 710 is a log record for a write operation that writes "ABCD" to the LUN 1, LBA 0. The element 712 is a log record for a write operation that writes "EFGH" to the LUN 1, LBA 5. The element 714 is a log record for a write operation that writes "WXYZ" to the LUN 1, LBA 10. The element 718 is a log record for a write operation that writes "DATA1" to the LUN 1, LBA 0. The element 720 is a log record for a write operation that writes "DATA2" to the LUN 2, LBA 20. The element 722 is a log record for a write operation that writes "DATA3" to the LUN 2, LBA 30. As illustrated in FIG. 2C, the log records 710, 712, 714, 718, 720 and 722 can also record the write data (e.g., write I/O operation payload) written by the write operations. It should be noted that the log records 710, 712 and 714 of FIG. 2C correspond respectively to the log records 221, 222 and 223 of FIG. 2B.

The log can be flushed sequentially or in any suitable manner to maintain desired data consistency. In order to maintain data consistency when flushing the log, constraints can be placed on an order in which the records of the log are flushed or logically applied to the stored data while still allowing any desired optimizations. In some embodiments, portions of the log can be flushed in parallel in accordance with any necessary constraints needed in order to maintain data consistency. Such constraints can consider any possible data dependencies between logged writes (e.g., two logged writes that write to the same logical address) and other logged operations in order to ensure write order consistency.

Figure 2D:
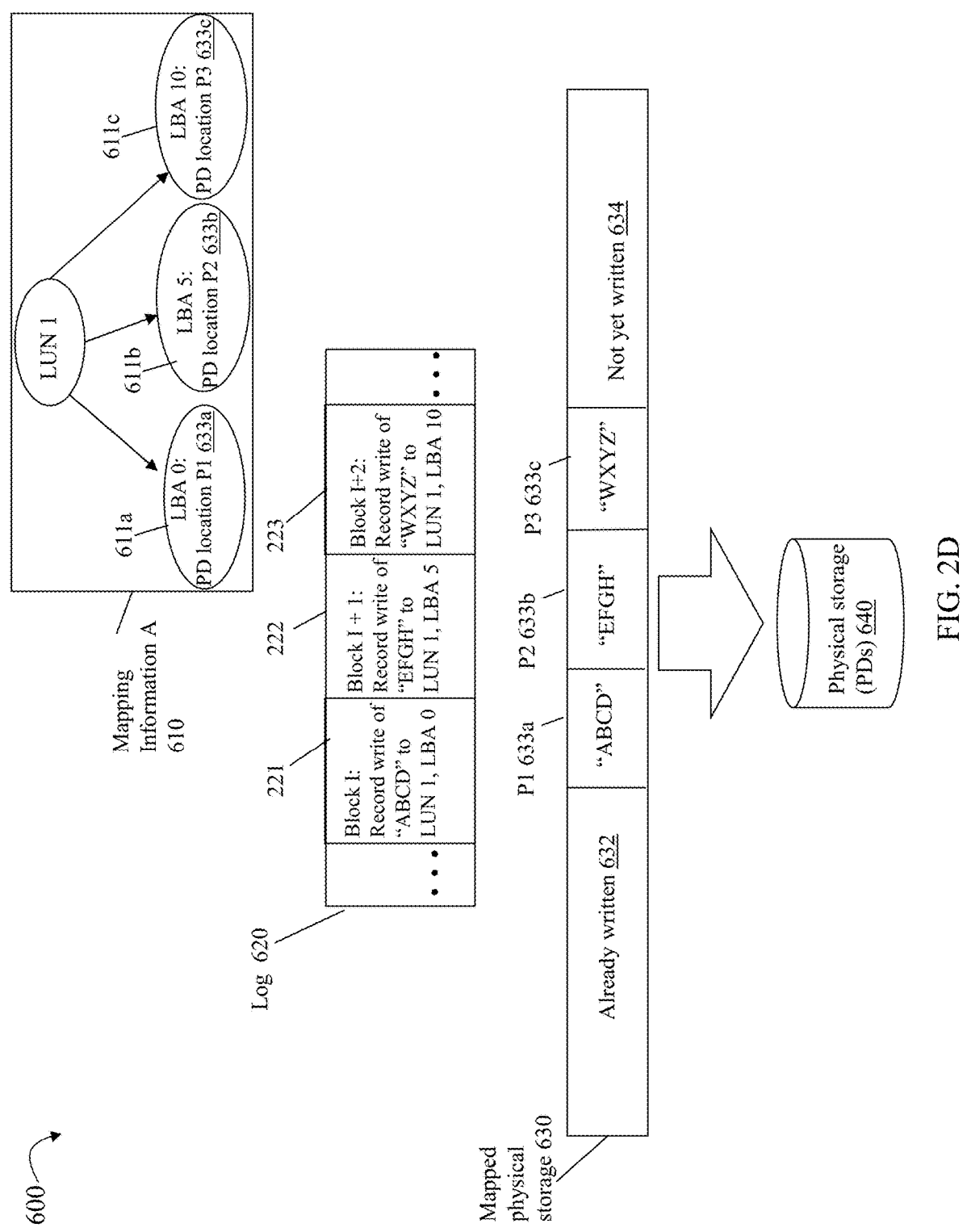

Referring to FIG. 2D, shown is an example 600 illustrating the flushing of logged writes and the physical data layout of user data on BE PDs in at least one embodiment in accordance with the techniques of the present disclosure. FIG. 2D includes the log 620, the mapping information A 610, and the physical storage (i.e., BE PDs) 640. The element 630 represents the physical layout of the user data as stored on the physical storage 640. The element 610 can represent the logical to physical storage mapping information A 610 created for 3 write I/O operations recorded in the log records or blocks 221, 222 and 223.

The mapping information A 610 includes the elements 611a-c denoting the mapping information, respectively, for the 3 target logical address of the 3 recorded write I/O operations in the log records 221, 222, and 223. The element 611a of the mapping information denotes the mapping information for the target logical address LUN1, LBA 0 of the block 221 of the log 620. In particular, the block 221 and mapping information 611a indicate that the user data "ABCD" written to LUN 1, LBA 0 is stored at the physical location (PD location) P1 633a on the physical storage 640. The element 611b of the mapping information denotes the mapping information for the target logical address LUN1, LBA 5 of the block 222 of the log 620. In particular, the block 222 and mapping information 611b indicate that the user data "EFGH" written to LUN 1, LBA 5 is stored at the physical location (PD location) P2 633b on the physical storage 640. The element 611c of the mapping information denotes the mapping information for the target logical address LUN 1, LBA 10 of the block 223 of the log 620. In particular, the block 223 and mapping information 611 indicate that the user data "WXYZ" written to LUN 1, LBA 10 is stored at the physical location (PD location) P3 633c on the physical storage 640.

The mapped physical storage 630 illustrates the sequential contiguous manner in which user data can be stored and written to the physical storage 640 as the log records or blocks are flushed. In this example, the records of the log 620 can be flushed and processing sequentially (e.g., such as described in connection with FIG. 2B) and the user data of the logged writes can be sequentially written to the mapped physical storage 630 as the records of the log are sequentially processed. As the user data pages of the logged writes to the target logical addresses are written out to sequential physical locations on the mapped physical storage 630, corresponding mapping information for the target logical addresses can be updated. The user data of the logged writes can be written to mapped physical storage sequentially as follows: 632, 633a, 633b, 633c and 634. The element 632 denotes the physical locations of the user data written and stored on the BE PDs for the log records processed prior to the block or record 221. The element 633a denotes the PD location P1 of the user data "ABCD" stored at LUN 1, LBA 1. The element 633b denotes the PD location P2 of the user data "EFGH" stored at LUN 1, LBA 5. The element 633c denotes the PD location P3 of the user data "WXYZ" stored at LUN 1, LBA 10. The element 634 denotes the physical locations of the user data written and stored on the BE PDs for the log records processed after the block or record 223.

In one aspect, the data layout (e.g., format or structure) of the log-based data of the log 620 as stored on non-volatile storage can also be physically sequential and contiguous where the non-volatile storage used for the log can be viewed logically as one large log having data that is laid out sequentially in the order it is written to the log.

The data layout of the user data as stored on the BE PDs can also be physically sequential and contiguous. As log records of the log 620 are flushed, the user data written by each flushed log record can be stored at the next sequential physical location on the BE PDs. Thus, flushing the log can result in writing user data pages or blocks to sequential consecutive physical locations on the BE PDs. In some embodiments, multiple logged writes can be flushed in parallel as a larger chunk to the next sequential chunk or portion of the mapped physical storage 630.

Consistent with other discussion herein, the mapped physical storage 630 can correspond to the BE PDs providing BE non-volatile storage used for persistently storing user data as well as metadata, such as the mapping information. With a log-structured system as discussed herein, as recorded writes in the log are processed, the data written by the writes can be written to new physical storage locations on the BE PDs.

Referring to FIG. 3, shown is an example 300 of a tree of MD pages that can be used in an embodiment in accordance with the techniques herein. The example 300 includes a tree of MD pages denoting the mapping structure as discussed above with 3 levels—a top or root level, level 1, including a single MD TOP page; a single mid or middle level, level 2, of MD MID pages; and a bottom level, level 3, of leaf nodes of MD LEAF pages. In the example 300, the top or root level, level 1, includes MD page 302; the mid or middle level, level 2, includes MD pages 304, 306 and 308; and the bottom level, level 3, includes MD pages 310, 312, 314, 316, 318 and 320, which can also be referred to as leaf nodes. As also illustrated in the example 300, each of the leaf MD pages in level 3 of the tree points to, or references (e.g., directly or otherwise indirectly using one more additional levels of indirection of pointers not illustrated) one or more user data pages or blocks including data stored at various LBAs of a LUN such as the LUN A. For example, MD pages 310, 312, 314, 316, 318 and 320 point or reference, respectively, one or more UD pages 310a, 312a, 314a, 316a, 318a and 320a.

The links or connections between a parent node (at level M) and its one or more child nodes (at level M+1) in the tree

300 generally represent mappings between the parent node and the one or more child nodes. In at least one embodiment, the parent node can include a reference used to access (directly or indirectly) each of its one or more child nodes. For example, the root node MD page top 302 can include addresses or pointers used to access each of its child nodes 304, 306 and 308. The mid-level node MD page mid1 304 can include addresses or pointers used to access each of its child leaf nodes 310, 312. The mid-level node MD page mid 306 can include addresses or pointers used to access each of its child leaf nodes 314, 316. The mid-level node MD page mid 308 can include addresses or pointers used to access each of its child leaf nodes 318, 320.

In at least one embodiment, each of the addresses or pointers included in a MD page that references a location in another MD page or references a location in a UD page can be a physical storage location on the back-end PDs. Thus, the traversal between connected nodes of the structure 300 can correspond to traversing physical address or storage locations included in pages or nodes that are parent nodes.

In connection with accessing a particular UD page in at least one embodiment, all MD pages in a path from the root or top level of the tree to the UD page can be traversed in a consecutive serialized order in which such pages appear in the path traversal down the path from the top or root level to the UD page accessed using a particular one of the MD page leaf nodes. For example, assume UD page or block X is included in the set of UD pages 312a. In order to access UD page X of 312a, the following denotes the consecutive serialized order in which the MD pages forming a sequence are accessed: MD page top 302, MD page mid1 304, and MD page leaf2 312. Generally, in at least one embodiment, each of the MD pages can include pointers or addresses to locations of one or more child pages or nodes. Thus, the foregoing traversal of MD pages denotes the sequence of MD pages that are processed in consecutive serialized order in order to access the particular UD page, such as UD page X. In order to access the UD page X as stored on PDs where UD page X includes first data needed to service a read I/O operation in connection with a cache miss of the first data, each of the MD pages in the foregoing sequence (e.g., MD page top 302, MD page mid1 304, and MD page leaf2 312) needs to be accessed in consecutive serialized order. In at least one embodiment, the sequence of MD pages, and more generally, the path from the MD page top to the UD page X, forms a linked list of nodes of pages. In at least one embodiment, each parent node or MD page of the structure 300 can generally include multiple pointers or references to locations of its child nodes or pages. For example, MD page top 302 includes pointers to locations of its child nodes, MD pages 304, 306 and 308. MD page mid2 306 includes pointers to locations of its child nodes, MD pages 314 and 316.

The data pages 310a, 312a, 314a, 316a, 318a and 320a include UD stored on particular logical addresses of a LUN's address space, such as the LUN A's logical address space. In at least one embodiment each MD leaf can hold MD for a specified number of LBAs of a LUN. For example, in one embodiment each MD leaf can hold MD for 512 LBAs. For example, with reference to FIG. 3, the data pages 310a, 312a, 314a, 316a, 318a and 320 each include user data stored on particular logical addresses of the LUN A's logical address space. It may be, for example, that element 310a includes user data stored at a first set of LBAs 0-511; and that element 312a includes user data stored at a second set of LBAs 512-1023. Generally, the particular LBAs of the LUN mapped to each MD page can vary with embodiment.

For example, in at least one embodiment, consecutive sequential subranges of the LUN's logical address space can be mapped to the MD page leaves. Additionally, when the tree is traversed in a depth first manner, the MD page leaves can correspond to consecutive sequential subranges. For example, the element 310a denotes data pages for LBAs 0-511; the element 312a denotes data pages for the LBAs 512-1023; the element 314a denotes data pages for LBAs 1024-1535; the element 316a denotes data pages for LBAs 1536-2047, and so on.

As generally known in the art, a depth-first traversal is an algorithm for traversing or tree or graph data structures. The algorithm starts at the root node (selecting some arbitrary node as the root node in the case of a graph) and explores as far as possible along each path extending from the root to a leaf node before backtracking up the path to find a yet another unexplored path. In at least one embodiment, traversal of the tree 300 of MD pages in a depth-first manner explores all paths, in sequential order, from the left-most path to the right most path as arranged in the tree.

In at least one embodiment, when the structure 300 is traversed in a depth first manner (i.e., from the left-most path to the right most path as arranged in the tree), the MD page leaf nodes that occur in the depth first traversal correspond to consecutive sequential LBA subranges of a LUN. In at least one embodiment, when the overall tree including MD page top node 302 and all its descendant nodes are traversed in this depth first manner, the MD page leaf nodes that occur in the depth first traversal correspond to consecutive sequential LBA subranges of a LUN.

In at least one embodiment as described herein, each of the MD pages and data blocks in the example 300 can be of a predetermined size and each of the MD pages can hold a known number of entries containing pointer or address values. In such a case and in combination with the correspondence of sequential consecutive LBA ranges of each MD leaf page, an embodiment can perform a calculation to determine the MD page at a particular level that is accessed in the tree MD mapping structure 300 to determine the data block for a particular LUN and LBA. Similarly, it is a straightforward mathematical calculation to determine the index, offset of entry in a particular page or node to be accessed in connection with obtaining data blocks stored at the particular LUN and LBAs of the LUN. Each MD page in 300 can be known to include MD relevant for accessing data on a particular LUN and one or more LBAs of that LUN. For example, consistent with discussion above, the element 310a denotes the data blocks for LBAs 0-511 of a LUN. In order to access the data block for an LBA of the LUN in the LBA subrange 0-511, MD pages 302, 304 and 310 can be traversed in sequential order. In particular, the first entry or offset of the MD page top 302 can contain the address of the MD page mid 1 304; the first entry or offset of the MD page mid 1 304 can contain the address of the MD page leaf 1 310; and the first entry or offset of the MD page leaf 1 310 can contain the address of one of the data blocks of 310a.

In a similar manner, a mapping can be made regarding what MD pages of the structure 300 and entries thereof are used in connection with obtaining data blocks containing data for any particular LUN and LBA. In at least one embodiment, the particular MD pages used to access a data block including data for a particular LUN and LBA can be known based on such mappings and correspondence of LBA subranges to particular MD leaf pages.

Figure 4:
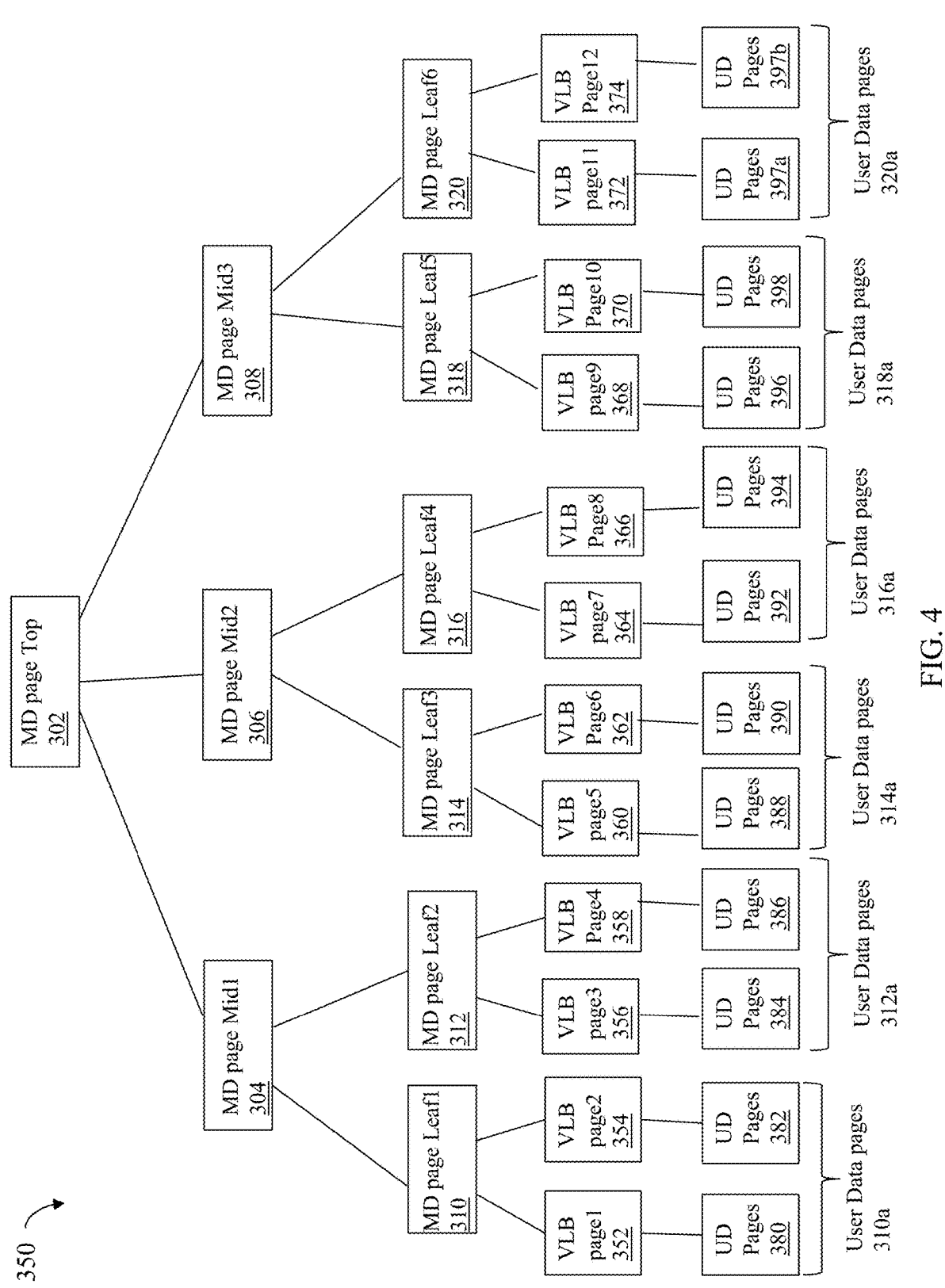

Referring to FIG. 4, shown is a more detailed version of a hierarchical structure used as the mapping structure 108 that can be used in an embodiment in accordance with the techniques of the present disclosure. The structure 350 is similar to the structure 300 as described and illustrated in FIG. 3 with the added difference that more detail is provided regarding the intervening layer of a VLB (virtualization layer block) MD pages between the MD page leaves and the UD pages. Thus, in such an embodiment, the structure 350 includes 4 levels of MD pages as opposed to the possible 3 levels as allowed in the more generalized structure 300 represented in FIG. 3. In this case, each sequence of MD pages traversed in a path from the MD page top or root to access a particular UD page includes 4 MD pages—MD page top 302, one of the MD page Mid nodes (e.g., one of 304, 306 or 308), one of the MD page leaf nodes (e.g., one of 310, 312, 314, 316, 318 and 320), and one of the VLB pages (e.g., one of 352, 354, 356, 358, 360, 362, 364, 366, 368, 370, 372 and 374).

In at least one embodiment, the use of VLBs as a layer in the hierarchy between the MD leaf nodes and the UD pages can be used to facilitate different data storage services, such as relocating UD between different physical storage location, data deduplication, and the like. An entry of the VLB associated with a particular physical storage location can be remapped without requiring remapping of a MD leaf to the UD page.

The UD pages 380 and 382 denote two portions of UD pages corresponding to UD pages 310*a* of FIG. 3 including data for LBAs 0-511. The UD pages 384 and 386 denote two portions of UD pages corresponding to UD pages 312*a* of FIG. 3 including data for LBAs 512-1023. The UD pages 388 and 390 denote two portions of UD pages corresponding to UD pages 314*a* of FIG. 3 including data for LBAs 1024-1535. The UD pages 392 and 394 denote two portions of UD pages corresponding to UD pages 316*a* of FIG. 3 including data for LBAs 1536-2047. The UD pages 396 and 398 denote two portions of UD pages corresponding to UD pages 318*a* of FIG. 3 including data for LBAs 2048-2559. The UD pages 397*a* and 397*b* denote two portions of UD pages corresponding to UD pages 320*a* of FIG. 3 including data for LBAs 2560-3072.

In furtherance of the example above regarding UD page X and now with reference to FIG. 4, assume more specifically that UD page X is located in the set of UD pages denoted by 384. In this case, the MD page sequence including the MD pages traversed in order to access UD page X 384 includes MD page 302, MD page 304, MD page 312, and VLB page3 356.

Figure 5:
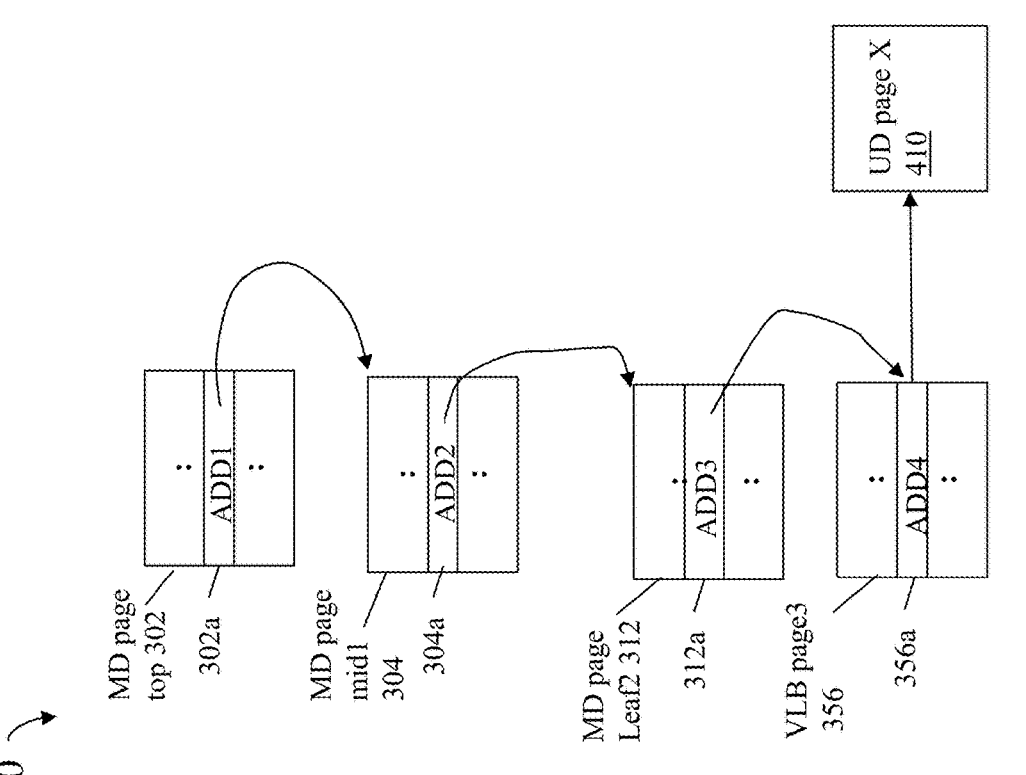

Referring to FIG. 5, shown is a more detailed representation 400 of the MD pages of the sequence traversed to access the UD page X 384 included in the set of UD pages 312*a*. As noted above, the MD page sequence includes MD page 302, MD page 304, MD page 312, and VLB page3 356. In the example 400, MD page top 302 includes an entry or address 302*a* that points to or references the MD page mid1 304. In at least one embodiment, the starting entry 302*a* in the first MD page 302 of the sequence can be determined based on the logical address including the desired UD stored in a page or block of storage (e.g., physical non-volatile storage location on the BE PDs of the system). For example, assume processing is performed to read the UD for LUN A, LBA 514 located in UD page X. In at least one embodiment, the logical address LUN A, LBA 514 can be used to determine the particular structure instance and thus the particular MD page top 302 to access. The LBA 514 of the logical address of the UD can also be used to determine an index or offset into the MD page 302 to determine the relevant entry, location or address 302*a* having a pointer, address or reference to the next MD page in the sequence to access the desired page including the UD for LUN A, LBA 514. An embodiment can generally use any suitable technique to map a corresponding logical address, such as an LBA of a particular LUN, to an entry in the top level MD page 302.

The MD page top 302 can be accessed and read from a PD to obtain the address or pointer ADD1 from location 302*a*. If the MD page 302 is already in cache, the cached copy can be used to obtain the address or pointer ADD1 from the location 302*a*. The address or pointer ADD1 of location 302*a* can then be used to identify the particular mid level MD page, such as MD page mid1 304, that is accessed next in the sequence.

Continuing with the example 400, the MD page mid1 304 can be accessed where the location 304*a* is read to obtain the address or pointer ADD2 from location 304*a*. In at least one embodiment, the particular entry or offset 304*a* of the MD mid1 page can be determined based on the logical address being mapped.

The address or pointer ADD2 can then be used to identify the particular leaf level MD page, such as MD page leaf2 312, that is next accessed in the sequence. If the MD page mid1 304 is not in cache, the on-disk copy of the MD page 304 on a PD can be accessed to read the address or pointer ADD2 from the location 304*a*. The address or pointer ADD2 identifies the MD page leaf 2 312. If the MD page 312 is not already in cache, the on-disk copy of the MD page 312 on a PD can be read to obtain the content of location 312*a*.

In at least one embodiment, the particular desired entry or offset 312*a* of the MD leaf2 page 312 can be determined based on the logical address being mapped. The location 312*a* of the MD page leaf2 312 can be accessed and read to obtain the address or pointer ADD3 from location 312*a*. The address or pointer ADD3 can then be used to identify a particular entry of a VLB page, such as the entry 356*a* of the VLB page3 356, that is next accessed in the sequence. Thus, ADD3 can denote the location or address of the entry 356*a* in the VLB page 3 356.

If the VLB page 356 is not already in cache, the on-disk copy of the VLB page 356 on a PD can be read to obtain the content of location 356*a*. The location 356*a* of the VLB page 3 356 can be accessed and read to obtain the address or pointer ADD4 from the location 356*a*. The address or pointer ADD4 can then be used to identify the particular UD page X 410 where the UD page X can next be read. If the UD page X is not in cache, the on-disk copy of the UD page X can be read in from a PD.

The example 400 of FIG. 5 includes the path or traversal of MD pages in the structure 350 from the MD page root or top 302 to the UD page X of 384 including the desired UD for the logical address LUN A, LBA 514. The path or traversal of MD pages 302, 304, 312, 356 and 384 denotes the sequence of MD pages read and accessed in order to obtain the UD page X of 384.

In at least one embodiment, each VLB can be a VLB page or node as described herein including multiple entries, such as 512 entries, where each such VLB entry can include one or more fields of information such as the address or pointer to a physical storage location of stored content or data. Additionally in at least one embodiment, each VLB entry pointing to or associated with stored content or data can also include a reference count denoting a number of references or logical addresses that store the content or data. In at least one embodiment, multiple MD leaf entries corresponding to multiple logical addresses of used data or content can all reference or point to the same VLB entry thereby denoting that such multiple logical addresses all store the same content or data associated with the VLB entry.

The reference count of a VLB entry can be updated in connection with deduplication processing and/or as used data or content stored at various logical addresses changes. For example, deduplication processing can be performed on new data written to a target logical address by a write I/O operation. Deduplication processing can determine that the new data is a duplicate of existing data stored in a data block. Rather than store another copy of the same data in another data block, deduplication processing can include alternatively having the target logical address reference the single existing copy of the data as stored in the data block. As part of deduplication processing, the reference count associated with the single existing copy of the data block can be incremented as each additional reference to the same data block is made. In a similar manner, the reference count can be decremented as content of a particular logical address is modified or deleted to no longer be considered a duplicate of the single existing copy of the data block.

For a read I/O operation received at a node of a dual node system or appliance such as in an active-active configuration, servicing the read operation can include reading one or more data blocks or storage locations as well as reading information from one or more MD pages such as, for example, of the MD or mapping structure as described in connection with FIGS. 3-5.

For a write I/O operation received at a node of a dual node system or appliance such as in an active-active configuration, servicing the write operation can include reading information from one or more MD pages. Servicing the write operation can include updating one or more data blocks or storage locations as well as updating one or more MD pages such as, for example, of the MD or mapping structure as described in connection with FIGS. 3-5.

In at least one embodiment, the MD or mapping information used in connection with stored user data can be stored on non-volatile storage, such as on the BE PDs of the appliance or data storage system. At least some of the MD pages of mapping information for all such user data can be stored in a volatile memory cache of each of the nodes of the appliance or system. Depending on the write operation, one or more logical addresses can be updated with new data or content by a write operation. Additionally, one or more MD pages used to map the one or more logical addresses to one or more physical storage locations storing the new data can also be updated, for example, to reference the one or more physical storage location including the new data or content.

With a log-structured system in at least one embodiment, as recorded writes of the log are processed and flushed or destaged to the BE PDs, the content written by the recorded writes of the log can be stored at new subsequent physical storage locations on the BE PDs. Additionally, the MD or mapping information corresponding to the logged writes being flushed can also be accordingly updated to reference the new subsequent physical storage locations on the BE PDs containing the content. In a dual node appliance or system with an active-active configuration as described herein, both nodes of the system can concurrently receive and service write I/Os, as well as other received requests and commands using shared resources such as, for example, the MD or mapping structure described in connection with the FIGS. 3-5.

In at least one embodiment, updates or modifications to the MD pages of the MD or mapping structure described in connection with the FIGS. 3-5 can also similarly be recorded in entries or records of a persistently stored metadata log and then flushed or destaged from the metadata log to persistent BE storage of the BE PDs. In at least one embodiment, the MD pages of the MD or mapping structure such as described in connection with the FIGS. 3-5 can be persistently stored in a MD page store on the BE PDs of the system. In some contexts herein, the copy of a MD page as stored in the MD page store on the BE PDs can also be referred to herein as the on-disk copy of the MD page.

In some existing implementations, when an update is made to a MD page, the entire resulting MD page with the update applied can be stored in the metadata log file. In such implementations, an excessive amount of storage can used in connection with the metadata log file in that each MD page update can include storing an entire updated MD page in the metadata log file. Additionally, excessive amounts of node-local volatile memory of the nodes can be used in connection with node-local cached copies of portions of the metadata log file.

In at least one implementation, many read and write operations performed with respect to a MD page may only need, respectively, to read or update one field or value of the MD page. For example, a MD update to a MD page can require only updating a relatively small number of bytes, such as 4 bytes or 8 bytes, of a much larger MD page, such as a 4K byte MD page. However, as noted above, existing workflows for some implementations to perform reads and writes to the MD page can include loading the entire MD page into the cache or volatile memory of a node, if the MD page is not already in the cache or volatile memory of the node.

In this manner, existing implementations and workflows such as noted above can consume an excessive of amount of system resources, such as memory and CPU or processor execution time, resulting in performance degradation.

To improve upon the foregoing in at least one embodiment, a metadata log architecture can be used which includes a metadata log where updates to MD pages are recorded using only the changes, updates or "deltas" made to the MD pages. For example, many updates to a MD page can be an update or write of a relatively small number of bytes, such as 4 bytes or 8 bytes, of a much larger MD page, such as a 4K byte MD page.

In at least one embodiment in accordance with the techniques of the present disclosure, the metadata updates, changed content, changes or "deltas" made to MD pages (rather than complete updated MD pages) can be recorded in a metadata log as stored on a log tier of non-volatile memory. Additionally, in at least one embodiment in accordance with the techniques of the present disclosure, the metadata updates, changes or deltas made to at least some of the MD pages can also be stored in local volatile memories of the nodes of the system. The node local in-memory copy of the metadata changes, updates or deltas made to MD pages as stored on each of the nodes can also sometimes be referred to herein as the in-memory log, in-memory delta log or in-memory metadata log used by each node in connection with performing processing in accordance with the techniques of the present disclosure.

In at least one embodiment, each metadata update, change or delta made to a MD page may be expressed in the form of a tuple represented as (LI, EI, T, V) where:

LI denotes the logical index of the MD page. The LI can be a unique index of the MD page that is updated. The LI can be used to uniquely identify the MD page in the MD or mapping structure such as described elsewhere herein (e.g., FIGS. 3-5). In at least one embodiment, the LI can denote or can be the logical address, offset or location of the MD page.

In at least one embodiment, the logical address, offset or location of the MD page can also be or denote the physical address, location or offset of the MD page as stored persistently on non-volatile storage, such as of the BE PDs of the data storage system.

EI denotes the entry index denoting a particular entry, offset or location in the MD page denoted by LI.

T denotes the type of metadata update. For example, in at least one embodiment there can be multiple predefined types or allowable values for T. For example, the predefined types or values for T may include one or more of: IDP denoting an update to an address or indirect pointer used to reference a data block (e.g., the indirect pointer may be point to, or be the address of, a VLB entry that further includes an address of, or pointer to, the data block containing user data); INCREF denoting an update to increment by 1 a reference count of a VLB entry associated with a data block containing content that may be stored at one or more logical addresses; DECREF denoting an update to decrement by 1 a reference count of a VLB entry associated with a data block containing content that may be stored at one or more logical addresses. Generally, an embodiment can include any suitable number of predefined types that may vary with the supported metadata updates or changes.

V denotes the updated value to be stored.

It should be noted that the particular value of T denoting a particular type can also denote the size of the data payload V or updated value V of the tuple. For example, a type for T denoting an address can indicate that the size of V is the size or number of bytes or bits of an address or pointer. As another example, a type of T denoting an integer count or counter can indicate that the size of V is the size of an integer, such as 32 or 64 bits. In some instances, the value of the type T can imply performing an operation such as increment a counter by 1, or decrement a counter by 1, as noted above. In such cases and in some embodiments, the value for V of the tuple can be implied and omitted when T indicates to perform an increment or decrement operation of a field since such an increase or decrease can be with respect to a current or existing value of the counter.

In at least one embodiment, the metadata changes, updates or deltas made to MD pages as recorded in the in-memory metadata logs of the nodes can be in the form of tuples. In at least one embodiment, the metadata changes, updates or deltas made to MD pages as recorded in the metadata log stored on NVRAM can also be in the form of tuples.

Figure 6:
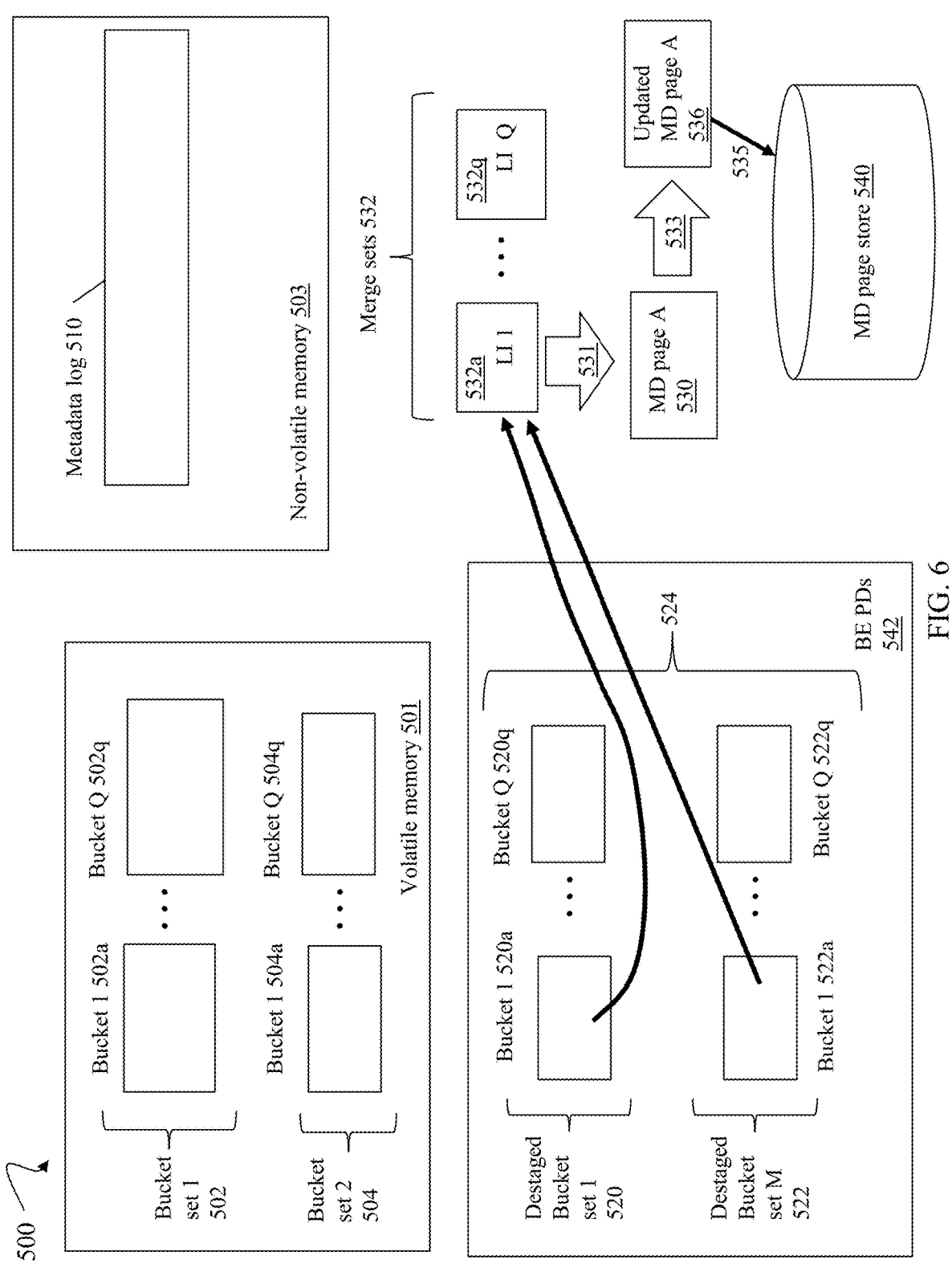
FIGS. 6, 7, 9, 10, 11A, 11B, 12, 13A, 14, 16, 17A, 17B, 18 and 19 are examples illustrating structures and data flows in at least one embodiment in accordance with the techniques of the present disclosure.

Referring to FIG. 6, shown is an example 500 illustrating structures and associated data flow in at least one embodiment in accordance with the techniques of the present disclosure.

The example 500 includes volatile memory 501, non-volatile memory 503 and non-volatile storage on the BE PDs 542. The volatile memory 501 can denote a volatile memory as included in each node of the appliance or system which includes node local in-memory structures and cached data that can be used in connection with the techniques herein. In particular, the volatile memory 501 includes bucket sets 502, 504 of logged metadata changes, updates or deltas. The non-volatile memory (e.g., NVRAM) 503 includes the metadata log 510 of metadata updates, changes or deltas. Consistent with other discussion herein, the non-volatile memory 503 can be accessible to both nodes of the system.

Collectively, the structures or bucket sets 502, 504 can denote the in-memory metadata log or in-memory delta log including the recorded metadata updates or deltas to MD pages for a particular node. Thus, each node in a dual node appliance can include an instance of the volatile memory 501 and associated structures or bucket sets 502, 504.

In at least one embodiment in accordance with the techniques herein, metadata changes, updates or "deltas" made to MD pages can be recorded and stored in a volatile memory structure in the volatile memory 501 of each node of the system. In this manner, an individual write or update to a MD page can be recorded as a single metadata update or entry in the volatile memory structure. For example, a write that updates only a 4 byte or 8 byte field of a 4K byte MD page can be recorded in the volatile memory structure as a single metadata update. Each metadata update can be represented as a tuple as discussed elsewhere herein in more detail. In at least one embodiment, each tuple can be relatively small in comparison to the size of each MD page.

The volatile memory 501 of each node can include volatile memory structures 502, 504. In at least one embodiment, the structures 502, 504 can denote two bucket sets 502, 504 where at any point in time, one of the two buckets sets 502, 504 can be designated as the active set and the remaining bucket set can be designated as the destaging, frozen, or inactive set. Each metadata update to a MD page can be added to a corresponding one of the buckets of the active bucket set that is uniquely associated with the MD page. For example at a first point in time, the bucket set 1 502 can be active and the bucket set 2 504 can be inactive, where received metadata updates are stored in the bucket set 502. As described in more detail in the following paragraphs, the roles of active and inactive or destaging can be alternated or switched between the two bucket sets 502, 504 in a continuous manner as the currently active set is deemed full or ready for destaging to the BE PDs 542.

The bucket set 1 502 includes the buckets 502a-502q, and the bucket set 2 504 includes the buckets 504a-504q, where there are "q" metadata pages. In each of the bucket sets 502, 504, each bucket can correspond uniquely to a different MD page. The metadata updates of a particular bucket are the recorded metadata updates to the MD page associated with the particular bucket of each bucket set. For example, MD page A can be uniquely associated with, and mapped to, the first buckets 502a, 504a, respectively, in each of the bucket sets 502, 504. In this manner, the bucket 1 502a includes the metadata updates made to the MD page A when the bucket set 502 is the active set; and the bucket 1 504a includes the metadata updates made to the MD page A when the bucket set 504 is the active set.

Each of the bucket sets 502, 504 in at least one embodiment can be further organized as a hash table of buckets where each MD page is mapped to a particular bucket using a hash function. The hash function can map the logical index (LI) uniquely identifying a MD page to a corresponding bucket of metadata updates for the MD page. In at least one embodiment, each of the bucket sets 502, 504 can denote a hash table of buckets implemented as an array, where the hash value HV1 of the LI of a MD page denotes the index of the array and the bucket associated with the MD page. Within each bucket associated with a MD page, the metadata updates can be sorted in a time order, from oldest to newest, based on when the metadata updates are received in the system. In at least one embodiment, each bucket (e.g., 502a) of metadata updates for a MD page can be organized in a binary tree. The metadata updates can be represented as nodes or entries in the binary tree. The metadata updates or nodes of the binary tree can be sorted, at least in part, based on the time order of when the metadata updates are received by the system. The increasing time order can indicate the order in which the metadata updates or changes are applied to the MD page associated with the bucket or binary tree.

More generally, an embodiment in accordance with the techniques herein can use any suitable volatile memory structure(s) and organization to store the metadata updates, changes or deltas to the MD pages.

In at least one embodiment, when a new metadata update U1 is made to a MD page, the metadata update U1 can be represented as a tuple. The metadata update U1 can be inserted into the active bucket set as follows. The hash function H is used to calculate a hash value HV of the LI of the MD page (e.g., H(LI)=HV). The HV can denote the bucket uniquely associated with the MD page being updated. For example, assume the bucket set 502 is the active set and assume that the MD page A is being updated with the new metadata update U1. The MD page A can have an LI that generates a hash value=1 mapping to the first bucket, bucket 1 502*a*, of the bucket set 502. The bucket 502*a* can be a binary tree including metadata updates to the MD page A. The metadata update U1 can be inserted into the sorted binary tree of 502*a* based, at least in part, on when the metadata change U1 was received.

Consistent with other discussion herein, the volatile memory 501 can include 2 sets of buckets 502, 504. At a first point in time T1, a first set of buckets, such as 502, can be designated as the active set and the second set of buckets 504 can be designated as the inactive set of buckets. Consistent with other discussion herein, each bucket in a set includes the metadata updates or changes for a particular one of the MD pages associated with the bucket. Thus, metadata changes received for a particular MD page are located in the bucket associated with the MD page. The role assignments of active and inactive can be continuously switched between the two bucket sets 502, 504 of a node at subsequent points in time as the currently designated active set becomes full. In at least one embodiment, the role assignment switching between the two sets of buckets can be performed when at least one bucket in the active set becomes full, or more generally reaches a predefined maximum size limit. In some implementations, each data container can have a predefined data limit before the data container is considered "full". For example, metadata updates to a MD page associated with each bucket can be written to the BE PDs of the system as a separate page (e.g., 4 KB). In this example, the page size can determine the predefined data limit of a bucket. In other words, once a bucket includes a page-worth of metadata changes, processing can determine that the data container is "full".

To further illustrate, at a second point in time T2 subsequent to T1, the first set of buckets 502 currently designated as the active set becomes full and, in response, the second set of buckets 504 can be assigned as the active set and the first set 502 can be assigned as the inactive set. At the second point in time, metadata updates can be destaged from the inactive first set of buckets 502 in volatile memory to the BE PDs 542 such as, for example, in the first phase of destaging as mentioned elsewhere herein. New metadata updates received subsequent to T2 while the bucket set 502 is inactive or destaged are stored in the set of buckets 504 designated as the currently active set of buckets. At a third point in time T3 subsequent to T2, the second set of buckets 504 currently designated as the active set becomes full, and in response, the first set of buckets 502 can be assigned as the active set and the second set 504 assigned as the inactive set. Metadata updates can now be destaged from the second set 504 designated as the inactive set while subsequent metadata updates are now stored in the first set 502 designated as the active set. The foregoing switching of roles of active and inactive between the two sets of buckets 502, 504 can be repeatedly performed in an ongoing manner where new metadata updates are stored in the currently designated active set and where metadata updates of the other currently designated inactive set are destaged from the volatile memory 501 to the BE PDs 542.

In at least one embodiment in accordance with the techniques herein, one or more sets of the metadata updates for the MD pages can be destaged in a first phase of MD log destaging from the volatile memory 501 to the BE PDs 542 providing non-volatile backend storage. As mentioned above, metadata updates can be destaged in the first phase of destaging from the particular one of the bucket sets 502, 504 designated as the inactive set. Over time, multiple bucket sets 524 can be destaged from the volatile memory 501 (e.g., of each of the nodes) to the BE PDs 542 in the first phase of destaging. The destaged bucket sets 524 in this example include M destaged bucket sets indicating that M sets of Q buckets have been destaged from the volatile memory 501 (e.g., as included in each of the nodes) to the BE PDs 542, where the M destaged bucket sets 524 are awaiting further processing in the subsequent second phase of destaging.

The destaged bucket sets 524 of metadata updates for the MD pages can be stored and organized on the BE PDs in any suitable structures and organization. For example, each destaged bucket set of metadata updates for MD pages can be organized into buckets of bucket pages, where each bucket can correspond or map uniquely to a single MD page. For example, the bucket 1 520*a* of the destaged bucket set 1 520 can include metadata updates for the MD page A as noted above. The bucket (e.g., 520*a*) of one or more bucket pages associated with a single MD page (e.g., MD page A) can include one or more metadata changes made to the MD page, where the metadata changes can be represented as tuples in the volatile memory structure (e.g., bucket sets 502, 504) of the volatile memory 501. The metadata changes in each bucket, such as 520*a*, of 524 can be sorted based on insertion time and therefore denote the sorted increasing time order in which the metadata changes are applied to the MD page. In at least one embodiment, the bucket pages of each bucket of 524 can be organized as a list rather than, for example, a binary tree structure as described above in connection with the organization of metadata updates in the volatile memory 501. In at least one embodiment as denoted by the element 524, there can be multiple sets of metadata updates for MD pages stored on the BE PDs 542, where each of the multiple destaged bucket sets of 524 can denote a set of metadata updates destaged from the buckets sets 502, 504 of volatile memory at a different point in time.

In a second phase of destaging, metadata changes, updates or "deltas" from the multiple destaged bucket sets 524 made to the same single MD page can be aggregated and combined into a working set (sometimes referred to as a data container working set) of metadata updates for the MD page. The second phase of destaging can aggregate and combine the metadata updates for each MD page across the multiple destaged sets (520, 522) of metadata updates as stored on the BE PDs in the first phase of destaging. Thus a working set or merge set of metadata updates for a single MD page can denote aggregated metadata updates to the MD page, where the metadata updates can be located in the multiple destaged sets of updates 524 stored on the BE PDs 542. An existing or current version of the MD page can be read from the BE PDs. The working set of metadata changes for the MD page can be applied to, or combined with, the current MD page to thereby result in an updated version of the MD page. The updated MD page can then be persistently stored on the BE PDs replacing the prior current or existing version of the MD page.

To further illustrate, consider the MD page A 530 having an associated LI=1 that maps to the first bucket (e.g., 520*a*, 522*a*) in each of the M destaged bucket sets of 524. The second phase of destaging can aggregate and combine the metadata updates for the MD page A 530 from the first buckets (e.g., 520*a*, 522*a*) across the multiple M destaged sets 524 of metadata updates as stored on the BE PDs 542 in the first phase of destaging. The element 532*a* can denote the merge set of aggregated updates from the first buckets 520*a*, 522*a* of the destaged sets 524 for the MD page A 530. Thus the merge set or working set 532*a* of metadata updates for the MD page 530 can denote aggregated metadata updates to the MD page, where the metadata updates can be located in the multiple destaged sets 524 of updates stored on the BE PDs. An existing or current version 530 of the MD page can be read from the BE PDs. The merge set or working set 532*a* of metadata changes for the MD page A can be applied to (531) the current MD page A 530 to thereby generate (533) an updated version of the MD page A 536. The updated MD page 536 can then be persistently stored (535) on the MD page store 540 of the BE PDs replacing the prior current or existing version of the MD page 530.

Generally, the element 532 denotes the merge sets of aggregated metadata updates for all the MD pages. In this example, there are Q MD pages, where each of the Q MD pages can be uniquely associated with a corresponding one of the merge sets 532*a*-*q* based on the LI of each of the Q MD pages.

In at least one embodiment in accordance with the techniques herein, the metadata changes, updates or deltas can be recorded in the metadata log 510 The metadata log 510 can be stored in the non-volatile memory 503, such as non-volatile Random Access Memory (NVRAM). In some implementations, the metadata log 510 can store metadata updates in time order (e.g., sorted oldest to newest). In some implementations, the metadata log 510 can be used to recover and reconstruct in-memory structures, such as structures of the volatile memories of the nodes of the data storage system. The metadata log 510 can be used to perform such recovery or reconstruction of the in-memory structures, for example, in response to a failure of the volatile memory of a node, or in response to a restart or reboot of a node or data storage system.

In some implementations and in response to destaging or writing the one or more metadata changes from the volatile memory 501 to the BE PDs 542 in the first phase of destaging, processing can be performed to release or free the corresponding part of the metadata log storing the destaged metadata changes. In at least one embodiment, the persisted metadata log 510 can be implemented as a ring buffer. Ring buffers are generally known in the art. A ring buffer can be represented as a logical ring of records or entries. The ring buffer can be maintained using pointers, such as a head pointer and a tail pointer, where new entries of the ring can always be allocated from the head and space reclamation can always be done from the tail. When an entry at the tail is flushed or destaged, the entry can be freed and thus reclaimed for reuse. The tail can be advanced as entries are flushed. In a similar manner, as entries are allocated, the head pointer is advanced. In at least one embodiment, entries from the metadata log 510 can be reclaimed as corresponding entries denoting the same metadata changes or deltas are destaged in the first phase of destaging from the in-memory metadata logs of the nodes (e.g., volatile memories 501 of the nodes) to the BE PDs 542. In such an embodiment, the destaging of metadata updates or changes as recorded in the in-memory metadata logs of the nodes can be synchronized with reclaiming corresponding entries from the persisted metadata log 510.

In at least one embodiment, when a single bucket set from volatile memory is destaged, corresponding entries from the persisted metadata log 510 stored in NVM 503 can also be reclaimed. In at least one embodiment, the destaging of an in-memory metadata log structure (e.g., such as a single bucket set 502) and reclaiming corresponding entries from the persisted metadata log 510 stored in NVM can be done atomically. In at least one embodiment, the metadata log 510 stored on the NVM can be a ring buffer as noted above where new metadata log 510 entries are added to the head and removed from the tail. In such an embodiment, the corresponding entries of the metadata log 510 can be reclaimed by moving the tail of the ring buffer to free the corresponding entries of the ring buffer. In such an embodiment, synchronization between the in-memory metadata logs of the nodes and the persisted metadata log 510 can be maintained so that flushing or destaging an in-memory metadata log in the first phase and reclaiming corresponding entries in the persisted metadata log 510 are done atomically. In particular in at least one embodiment, reinitializing or resetting the in-memory metadata log which has been destaged (e.g., in the first phase) can be performed atomically with movement of the tail of the metadata log 510 to reclaim corresponding entries for the destaged entries of the in-memory metadata log. It should be noted that in embodiments where a single entry of the persisted metadata log can be referenced across multiple bucket sets, the entry of the persisted metadata log cannot be reclaimed until all such references across the multiple bucket sets have been destaged or flushed in the first phase from volatile memory to the BE PDs 542.

It should be noted that destaging the in-memory metadata log can generally be performed in a single phase or other suitable manner. For example, destaging the metadata log can be performed by processing and merging bucket sets without intermediate storage on the BE PDs. Rather, destaging the metadata log can include determining the merge sets using destaged bucket sets and merge sets stored in volatile memory.

Consistent with other discussion herein in at least one embodiment, updates or modifications can be with respect to user data or stored content modified by client or host write I/Os as well as with respect to metadata, such as updates or modifications to the MD structure or mapping information described above. As noted above in at least one embodiment to increase performance, the updates to user data can be stored (e.g., persisted temporarily) in a log or journal logging client or host writes, and the updates to the MD or mapping information can be stored (e.g., persisted temporarily) in a metadata log. One characteristic of a log structured system, such as in connection with the metadata log and log of client updates or writes, is that updates or modifications (which are recorded in an associated log and then flushed to long term storage of the BE PDs) may not physically overwrite or update the same BE PD physical location storing the old data or existing content (e.g., no physical in place update). Rather, the newly written or updated data is typically written to a different physical location on the BE PDs. Thus, the BE PDs can retain the valid old data in the original physical location for some time before being reclaimed for reuse by garbage collection processing.

Garbage collection (GC) can be performed in connection with storage management of the BE PDs to reclaim and reuse free or invalidated physical storage as new data is written. In some cases, "holes" of storage storing old, unused or invalid content can be interspersed among portions of storage storing current valid content. Garbage collection can include performing processing which allows multiple holes of storage including unused or invalid data to be compacted into a single larger contiguous storage portion which can then be reused. Thus garbage collection processing can include moving first storage portions of valid data or content interspersed among holes of invalid content from a source to a target location to thereby make free or available a larger contiguous storage portion including the holes of invalid content.

Consistent with other discussion herein, an entry from the log of user or client updates (sometimes referred to as the UD (user data) log) can be an update to a logical address (e.g., LUN and LBA) which writes content to a UD page. Flushing the entry can include destaging the updated UD page to a backend storage location on non-volatile storage (e.g., BE PD location). Additionally, flushing and destaging the entry from the UD log can include updating the corresponding MD pages which map the logical address to its corresponding BE PD location including the content stored at the logical address. In at least one existing system, the mapping information including MD pages as described herein can thus be updated. For example, such updating of the mapping information can include updating MD of any of the top, mid, leaf, and VLB metadata pages used in connection with mapping the logical address to the BE PD location including the content stored at the logical address. In at least one existing implementation, updating the corresponding mapping information and MD pages can include loading all the MD pages into the cache if any such MD pages are not already in cache. The MD pages of the mapping information can be characterized as a chain forming an access sequence of top MD page, mid MD page, leaf MD page and VLB page, where each MD page in the sequence can be accessed serially and also in the strict consecutive order of the sequence since a first page of the sequence can reference a next consecutive page, or location thereof, in the sequence.

Consistent with other discussion herein, data storage systems have components whose responsibility is to map the user-visible logical address space to the internal physical address space, and implement various features such as, for example, snapshots, data compression, data deduplication, and the like. Such mapping and features may rely on different types of metadata to be implemented. This metadata can be typically stored persistently as, for example, 4K blocks of physical storage where different MD pages can reference each other by their physical block-addresses. In at least one embodiment, each MD page when allocated can be assigned a unique physical storage address, offset or location on non-volatile storage where the MD page is persisted. In a model or system using physical addresses or locations without corresponding logical addresses, there is generally no flexibility to move a MD page from an existing physical location to a new physical location since all MD pages referencing the to-be-moved MD page would have to be found and their references would need to be updated to reference the new physical location. Put another way, in at least one system not using the techniques of the present disclosure, the chain or MD pages of mapping information can include pages of metadata that reference other pages of metadata by their physical storage locations or addresses. As a result, metadata can be typically implemented as an in-place over-write system. In such a system, MD pages can remain in the same physical locations where updates to the MD pages are performed in-place and overwrite the same existing physical location. In such a system where MD pages can reference each other by their corresponding physical storage locations or addresses, if an updated version to a MD page is rewritten to a new physical location, all references to the MD page by other MD pages would also have to undesirably be updated to refer to the new physical location. Thus, the MD pages can be persistently stored at fixed physical addresses such as on non-volatile BE PDs of the storage system. The BE PDs used to store the metadata using overwrites or in-place updates can be configured as RAID-level storage of one or more RAID groups. For performance reasons, metadata may have to be stored in a mirrored RAID configuration, such as a RAID-1 configuration, which has a small write performance cost for such in-place updates in comparison to an alternative parity-based RAID configuration such as RAID-5 or RAID-6. However, although the mirrored RAID configuration for the metadata may have less write performance costs as compared to parity-based RAID configurations, the mirrored RAID configuration can generally result in excessive use of storage capacity in comparison to the RAID parity-based configurations. Additionally, because of MD pages referencing each other by physical addresses or physical storage locations, defragmentation and reclaiming of capacity allocated to metadata may become an intractable problem. Furthermore, in systems where the BE PDs or storage tier used to store the metadata are SSDs (solid state drives) such as flash-based storage, continually updating by overwriting to the same SSDs can result in exceeding a maximum number of allowed daily writes (writes per day or WPD) thereby leading to SSD wear out. The SSDs such as flash-based storage can be optimized for use in LSSs where writes to a logical storage object, such as a MD page, are written to a new physical location each time the MD page is updated. Thus, in systems where the MD pages are persistently stored on non-volatile SSDs as the BE PDs, the SSDs can implement an internal LSS where it can be further advantageous to implement an LSS of the metadata at the system level to further facilitate minimizing write amplification and reducing SSD wear.

Based on the foregoing, there exists motivation to implement the persistent metadata storage, such as on one or more storage tiers of the BE PDs, as an LSS which does not perform in place metadata updates and does not update an existing MD page stored at a physical address or location by overwriting current content of the physical storage address or location of the MD page with the new or updated content. Rather, in an LSS, updates to the metadata can be performed by writing the updated version of a MD page to a new physical location each time the MD page is updated.

However, use of an LSS metadata system where each updated version of a MD page is written to a new physical location creates new challenges. Since the MD pages can reference one another, it can be impractical and undesirable to have the MD pages reference each other by their physical storage locations since, for example, storing an updated version of a first MD page to a new physical location would require updating all other referencing MD pages to now refer to the new physical location. As a result, MD pages can reference each other using logical addresses which can then be mapped by an intervening layer or mechanism to corresponding physical addresses or physical locations. In at least one embodiment, the logical addresses of the MD pages, including top, mid, leaf and VLB metadata pages, can be indirect pointers or addresses that indirectly reference the physical storage addresses and locations of the MD pages through the intervening layer or mechanism. The intervening layer or mechanism can maintain a new type of mapping that, for MD pages, translates a logical address of a MD page to its current corresponding physical address or location. In this manner, a first MD page can reference a second MD page, or entry thereof, using a logical address of the second MD page. The new type of mapping can use a translation table, sometimes generally referred to herein as a TT, to map the logical address of the second MD page to its corresponding current physical location. When the second MD page is updated so that the updated version is stored at a new physical location, the TT can be updated to reference the new physical location of the second MD page and where the first MD page can continue to reference the second MD page using the logical address that is mapped, by the TT, to the new physical location. In at least one embodiment, each MD page can be assigned a logical address included in the TT where the logical addresses of the MD pages can remain fixed or the same for the lifetime of the MD pages, and where the physical storage locations or addresses of persistently stored copies of the MD paged can change over time as updated versions of the MD pages can be continually rewritten to new physical storage locations or addresses. The TT can translate a logical address, offset or location (LPA) of a MD page to its corresponding physical address, offset or location (PPA).

In at least one embodiment, as updated MD pages are stored in new physical addresses or storage locations over time, corresponding TT updates can be made to the TT to reflect the current physical address or storage location of MD pages at various points in time. In at least one embodiment, TT updates to the TT can also be managed and handled in accordance with an LSS where the TT itself can be characterized generally as another type of metadata.

In at least one embodiment, pages of metadata can be persistently stored in storage units denoted as PLBs (physical large blocks) in a metadata (MD) tier of non-volatile storage. Each PLB of metadata can have a corresponding PLB descriptor that generally describes content or data stored in the corresponding PLB. As a metadata page is updated and stored in a new physical address or storage location of a target PLB in accordance with an LSS, the target PLB's corresponding descriptor can also be updated to reflect the metadata page now stored in the target PLB.

Figure 7:
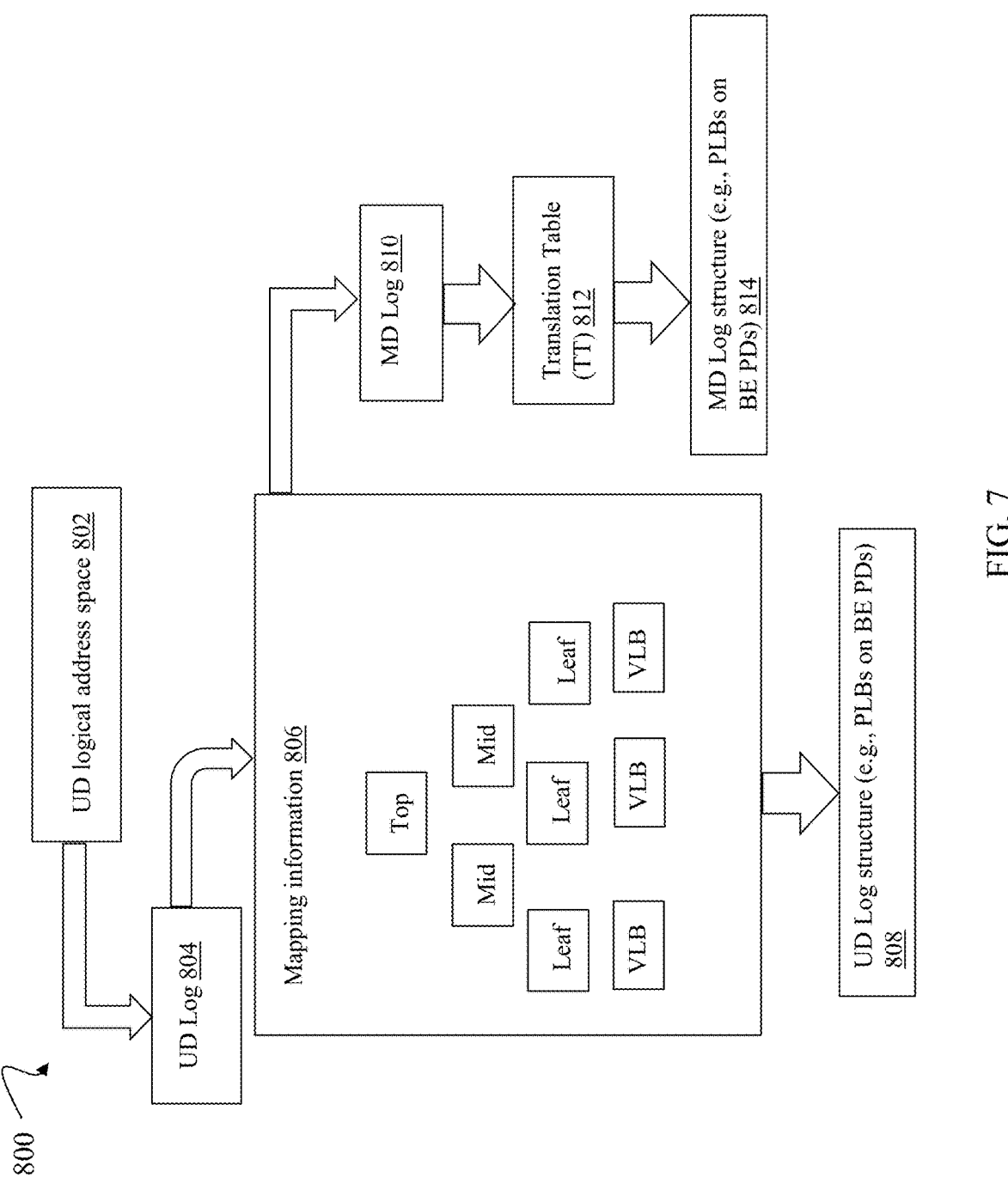

Referring to FIG. 7, shown is an example 800 illustrating components of a log structured MD architecture in at least one embodiment in accordance with the techniques of the present disclosure.

The example 800 provides a component level view of functionality regarding log structured mapping metadata can be include components in at least one embodiment in accordance with the techniques of the present disclosure. The example 800 includes UD logical address space 802, UD log 804, mapping information 806, UD log structure 808, MD log 810, translation table (TT) 812, and MD log structure 814. The UD log structure 808 can denote BE non-volatile storage, such as on BE PDs of the storage system, that persistently stores UD or content, for example, written by write operations. In at least one embodiment, the logs 804 and 810 can be persistently stored on a form of non-volatile storage such as on BE PDs. In at least one embodiment, the UD log structure 808 and the MD log structure 814 can have corresponding log structures as described elsewhere herein (e.g., such as in connection with FIGS. 2B-2D). In at least one embodiment consistent with other discussion herein, content persisted to each of the log structures 808, 814 can be written to consecutive sequential storage locations in an ongoing manner. In at least one embodiment, storage of 814 can be included a physical storage portion or tier sometimes referred to herein as the MD tier. In prior descriptions such as in connection with FIG. 6, the MD page store 540 can correspond to the MD tier.

As an example, assume a write W1 writes content C1 to a target logical address LA1 included in the UD logical address space 802. Consistent with other discussion herein in at least one embodiment, the write W1 can be recorded persistently in the UD log 804. At a later point in time, the recorded write W1 can be flushed from the UD log 804, where such flushing can include creating and/or updating one or more corresponding MD pages of the mapping information 806 used to map LA1 to a physical storage location PA1 included in a new physical storage location of a physical large block (PLB) of storage of the UD log structure 808. Updates made to a page of MD (e.g., MD top, mid, or leaf, or a VLB page) included in the mapping information 806 can be stored persistently in entries of the MD log 810. Consistent with discussion herein, such metadata updates stored in the MD log 810 can be made, for example, in connection with flushing the recorded write W1 from the UD log 804. Recorded metadata updates of the MD log 810 can also be flushed or destaged. As a result of the metadata updates to a page of MD M1 that are flushed from the MD log 810, an updated version of the metadata page M1 can be generated and stored at a new physical storage location PA2 on a PLB of the MD log structure 814. Additionally, corresponding information of the TT 812 can be updated to now map a logical address of M1 to its new storage location PA2.

As another example, assume a subsequent read R1 requests to read content C1 from the UD logical address LA1 (e.g., where LA1 can be included in the UD logical address space 802). In at least one embodiment, the existing mapping information 806 used to map LA1 to PA2 where C1 is stored can be used to service R1. Logical addresses of pages of metadata (including top, mid, leaf and VLB metadata pages of the mapping information 806) can be used and referenced. For example, a MD top page can reference MD mid pages using their corresponding logical addresses; a MD leaf page can reference addresses of VLB pages using their corresponding logical addresses; and the like. Put another way, pages of metadata of mapping information 806 can reference other pages of metadata in accordance with their logical addresses. The TT 812 can operate to translate a logical address of a MD page, such as the logical address L1 of MD page M1, to a corresponding physical address or location of the MD page, such as physical address PA1 of MD page M1, in the MD log structure 814.

In at least one embodiment, metadata pages can also be stored in volatile in-memory cache for faster access where the metadata page M1, if stored in the cache, can be accessed from the cache using M1's logical address L1. If M1 is not in cache when requested for reading such as when processing the read R1, a read cache miss results. Read cache miss processing in this example can include reading the MD page M1 from persistent storage, such as from its current physical storage location PA2 in the MD log structure 814.

To access a physical storage location of a metadata page in the MD log structure 814, the TT 812 can be used. In this manner in at least one embodiment read cache miss processing with respect to a metadata page that is not in cache, such as a volatile cache, can use the TT 812 to map the logical address L1 of the MD page M1 to its corresponding storage location PA2 in the MD log structure 814.

The element 812 can generally denote use of one or more TTs. In at least one embodiment as discussed in more detail elsewhere herein, two TTs can be represented by the element 812 including: a first TT, MD TT, used for mapping or translating top, mid, and leaf MD pages; and a second TT, VLB TT, used for mapping or translating VLB pages. Thus although examples herein for illustration purposes can include the foregoing two TTs, an embodiment can alternatively use a single TT, or more generally, any suitable number of TTs including the same information.

Figure 8:
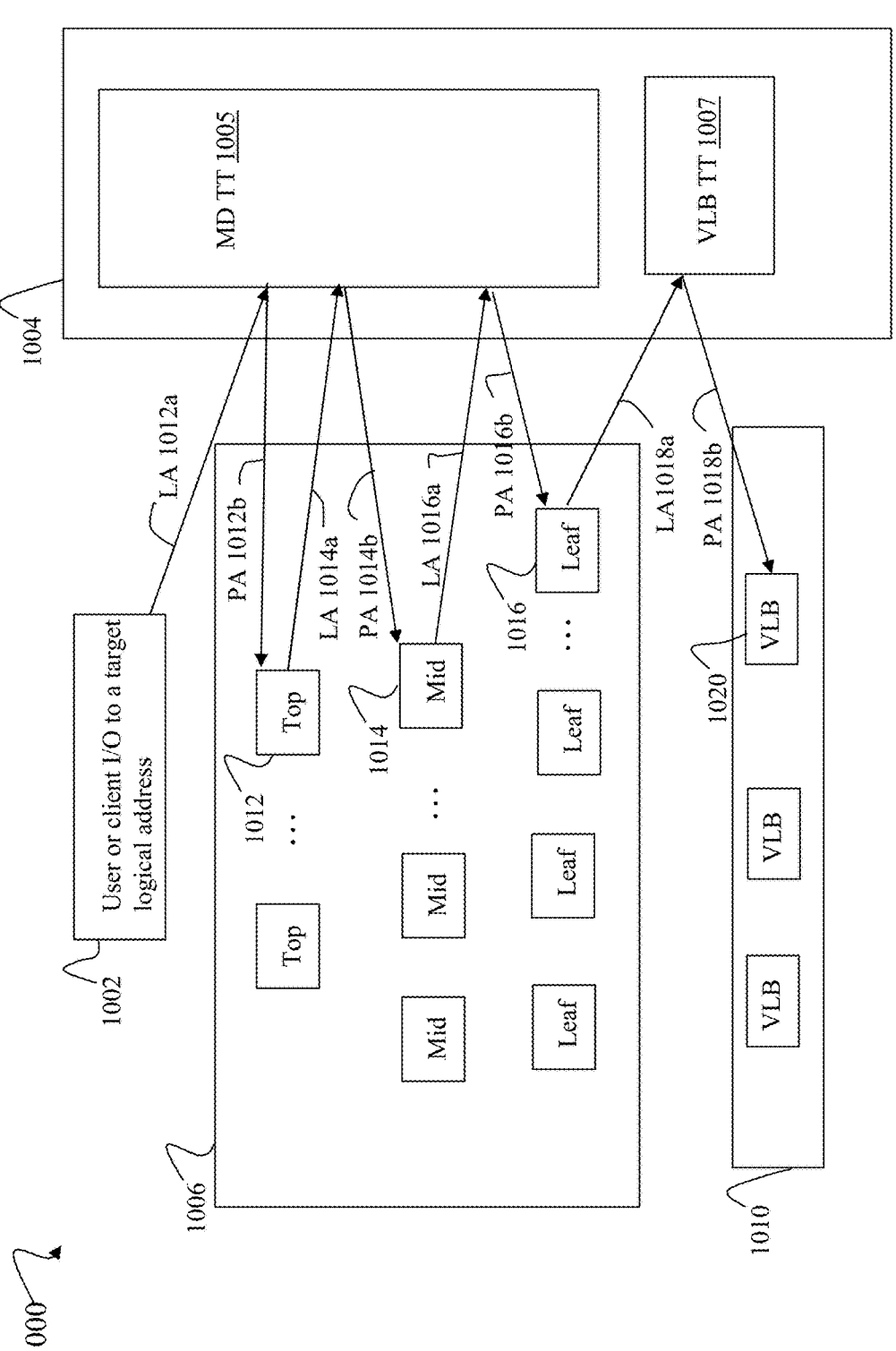
FIG. 8 is an example of illustrating logical to physical address translation of metadata pages included in a chain of mapping information.

Referring to FIG. 8, shown is an example 1000 illustrating further use of TTs in at least one embodiment in accordance with the techniques of the present disclosure.

In at least one embodiment, the elements 1004, 1006 and 1010 can denote different portions of non-volatile storage. The portion 1004 can persistently store the MD TT 1005 and the VLB TT 1007. The portion 1006 can persistently store top, mid and leaf MD pages. The portion 1010 can persistently store VLB pages. Element 1002 can denote a user or client I/O that includes a target logical address UD1 of the UD logical address space 802.

In at least one embodiment, TTs 1005, 1007 can include entries each mapping a logical address LA of a page of metadata to a corresponding physical address PA. To map an LA of a MD page to the corresponding PA where the MD page is persistently stored in the MD tier, processing can read the PA from a TT entry or element with the index LA, which can be represented as PA=TT [LA]. In at least one embodiment, the TTs 1005, 1007 can be structures maintained as set of MD pages of a new MD page type, such as a new type "TT".

In the example 1000, the element 1006 represents the non-volatile physical storage of the log structured system for persistently storing top, mid and leaf MD pages. The element 1010 represents a portion of the non-volatile storage used for persistently storing the VLB pages also considered metadata in at least one embodiment. The elements 1006 and 1010 can correspond to portions of the MD log structure 814 of example 800 and the MD page store 540 of FIG. 6 in at least one embodiment. Generally, the storage of 1004, 1006 and 1010 can be non-volatile storage, for example, of the MD tier that can include BE PDs of the storage system. The storage 1006 can be configured for storing a MD page to a new physical storage location each time the MD page is updated. The storage 1010 can be configured for storing a VLB page to a new physical storage location each time the VLB page is updated.

In at least one embodiment, the TTs 1005, 1007 can be accessed through cache (e.g., volatile memory) like other metadata pages. Consistent with discussion elsewhere herein in at least one embodiment, using the mapping information 806 of MD pages to map a user data or client target logical address to its corresponding physical location storing the content of the target logical address can require the mapping information of MD pages to be in cache. The mapping information can be characterized as forming a chain of MD pages including a top MD page, a mid MD page, a leaf MD page and a VLB page. A cached copy of a metadata page of the chain can be accessed in the cache based on its corresponding LA. If one of the MD pages of the mapping information is not stored in cache such as when servicing a read that reads the content from the target logical address, a cache miss results thereby triggering processing that loads the MD page from its current physical location on the non-volatile storage of 1006, 1010 into the cache for use in servicing the read. The TTs 1005, 1007 can be used to map a logical address or LA of a metadata page to its corresponding physical address or persistent storage location PA in connection with a cache miss of the MD page. The TTs 1005, 1007 can be cached in order to be used in connection with the foregoing mapping of LAs to corresponding PAs for metadata pages (e.g., top, mid, leaf and VLB pages) of the chain of mapping information.

For example, consider a read I/O 1002 to read data from a UD target logical address UD1. For the UD target logical address UD1, the logical address LA 1012a of the MD top page 1012 can be determined. If the MD top page 1012 is not in cache, cache miss processing can be performed where 1) the LA 1012a is then mapped by the MD TT 1005 to its corresponding physical address PA 1012b identifying the physical address or storage location of the MD top page 1012 in 1006; and then 2) the MD top page 1012 is loaded from its PA in 1006 into the cache and used to obtain the logical address LA 1014a of the next MD page, the mid MD page 1014, in the chain. Otherwise, if the MD top page 1012 is already in cache, the cached copy thereof can be used to obtain the LA 1014a of the next page, the mid MD page 1014, in the chain.

Processing can determine whether or not the mid MD page 1014 is in cache. If the mid MD page 1014 is not in cache, cache miss processing can be performed where 1) the LA 1014a is then mapped by the MD 1005 to its corresponding physical address PA 1014b identifying the physical address or storage location of the MD mid page 1014 in 1006; and then 2) the MD mid page 1014 is loaded from its PA in 1006 into the cache and used to obtain the LA 1016a of the next MD page, the MF leaf page 1016, in the chain. Otherwise if the MD mid page 1014 is already in cache, the cached copy thereof can be used to obtain the logical address LA 1016a of the MD leaf page 1016.

Processing can determine whether or not the MD leaf page 1016 is in cache. If the MD leaf page 1016 is not cache, cache miss processing can be performed where 1) the LA 1016a is then mapped by the MD TT 1005 to its corresponding physical address PA 1016b identifying the physical address or storage location of the MD leaf page 1016 in 1006; and then 2) the MD leaf page 1016 is loaded from its PA 1016b in 1006 into the cache and used to obtain the logical address LA 1018a to the VLB 1020 in the chain.

Processing can determine whether or not the VLB page 1020 is in cache. If the VLB page 1020 is not in cache, cache miss processing can be performed where 1) the LA 1018a is mapped by the VLB TT 1007 to its corresponding physical address PA 1018b identifying the physical address or storage location of the VLB page 1020; and then 2) the VLB page 1020 is loaded from its PA 1018b into cache and used to obtain the physical storage location where the requested content C1 for the target logical address UD1 is stored.

In connection with the foregoing, if a MD page of the mapping information chain is in the cache, the associated cache miss processing and thus associated TT mapping can be omitted. When a MD page, such as a top, mid or leaf MD page, is updated, the updated version of the page can be written to a new physical location, new PA, in the storage 1006. Additionally, when the MD page is updated and written to a new physical address PA, corresponding mapping information in the MD TT 1005 is also updated. In particular, the entry of the MD TT 1005 for the MD page is updated to now reference the new PA (e.g., MD TT 1005 is updated to map the MD page's fixed logical address to the new PA). When a VLB is updated, the updated version of the page can be written to a new physical location, new PA, in the storage 1010. Additionally, when the VLB page is updated and written to a new PA, corresponding mapping information in the VLB TT 1007 is also updated. In particular, the entry of the VLB TT 1007 for the VLB page is updated to now reference the new PA (e.g., the VLB TT 1007 is updated to map the VLB page's fixed logical address to the new PA).

Figure 9:
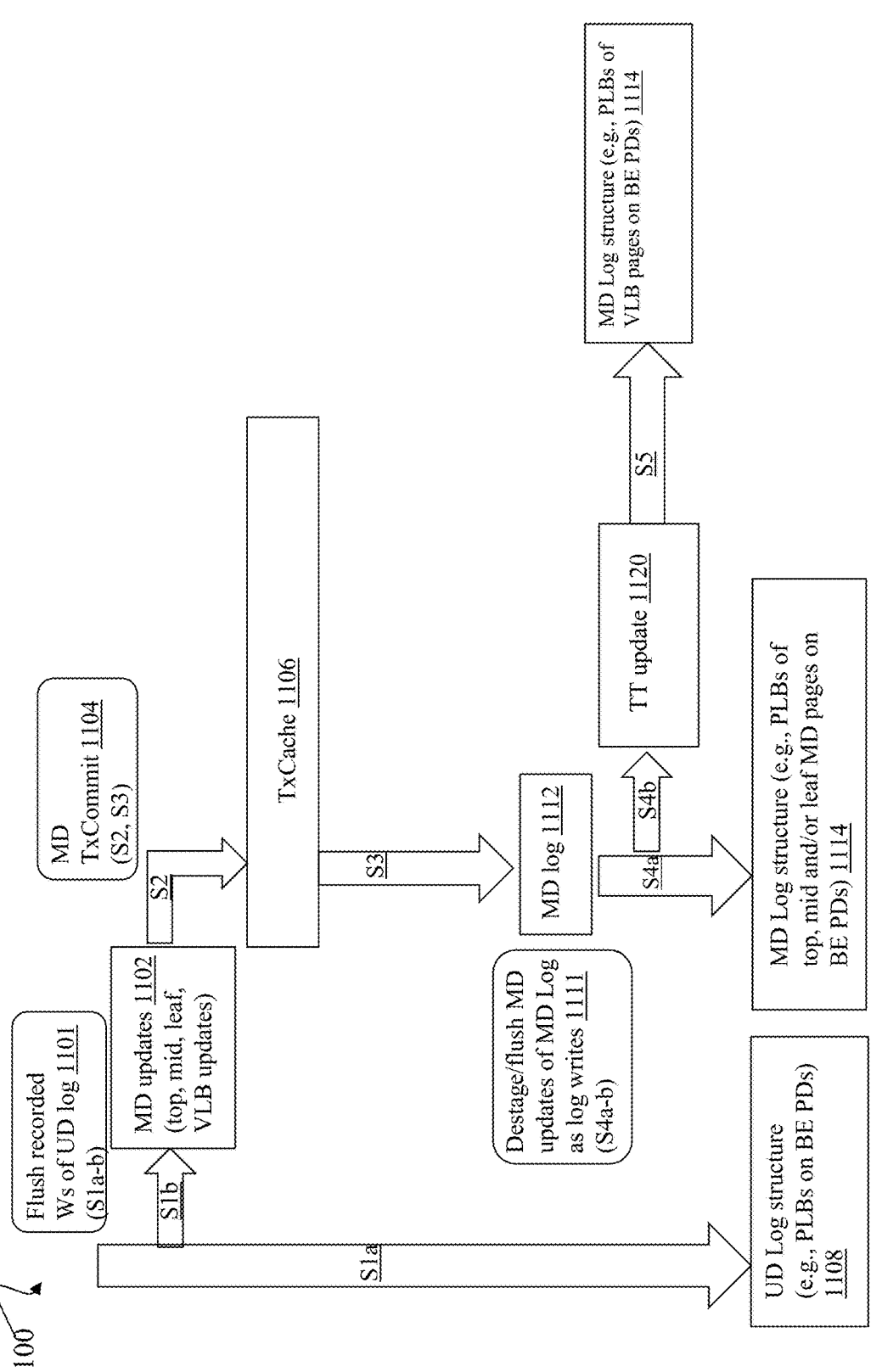

Referring to FIG. 9, shown is an example 1100 illustrating various processing or workflows in at least one embodiment in accordance with the techniques of the present disclosure.

The example 1100 includes a flush workflow or processing 1101 when flushing writes Ws as recorded in the UD log. Consistent with other discussion herein, flushing a recorded write W1 from the UD log (e.g., element 804 of the example 800), where W1 writes content C1 to UD logical address UD1, can include flows Sla-b. Sla can denote storing the written content C1 at a physical address of location PA1 in the UD log structure 1108 in a PLB of storage on the MD tier (e.g., stored on BE PDs). S1*b* can denote creating and/or updating one or more metadata pages of mapping information used to map UD1 to PA1, where PA1 currently includes the content C1 stored at UD1. Thus, S1*b* can include performing MD updates 1102 denoting top, mid, mid, leaf and/or VLB page updates. The MD updates 1102 (resulting from flushing the recorded write W1 from the UD log) can be included in a MD Tx (transaction) commit operation, workflow or processing 1104 where the MD updates 1102 to one or more pages are committed in the flow S2 to the Tx Cache 1106 and committed in the flow S3 to the MD log 1112. In at least one embodiment, the Tx Cache 1106 can denote a volatile memory cache. In at least one embodiment, the Tx Cache 1106 can include an in-memory or volatile memory copy of the MD log 1112, where the MD log 1112 can denote the persisted copy of the MD log stored on non-volatile storage.

In a manner similar to flushing entries of the UD log, recorded MD updates included in entries of the MD log 1112 (and also the in-memory copy in Tx Cache 1106) can be destaged or flushed as represented by element 1111. Destaging or flushing MD updates of the MD log as log writes 1111 can result in performing processing denoted by the flows S4*a-b*. S4*a* can denote applying one or more MD updates to a MD page to generate an updated version of the MD page, where the updated version of the MD page can be stored persistently at a new physical storage location of the MD log structure (MD LSS) 1114. S4*b* can denote a TT update 1120 that needs to be made to a TT, where the TT update 1120 is in accordance with the new physical storage location. In particular in at least one embodiment, the TT update 1120 can include updating the TT to map the existing logical address of the updated MD page to the new physical storage location. In at least one embodiment, there can be a corresponding unique entry in the TT for each top, mid, leaf and VLB page of metadata such that each MD page updated results in updating the MD page's corresponding mapping entry of the TT with the MD page's new physical storage location or address.

One or more TT updates 1120 can be included in a TT Tx Commit operation, workflow or processing, where the TT updates can be committed in the flow S5 to the persisted TT as stored in the MD log structure (MD LSS) 1114 on BE non-volatile storage. Additionally, the one or more TT updates 1120 can also be applied to an in-memory or volatile memory copy of the TT such as can be included in a cache. In at least one embodiment, the persisted TT can be stored in a first separate portion of BE non-volatile storage, the VLB pages can be stored in a second portion of BE non-volatile storage, and the top, mid and leaf MD pages can be stored in a third separate portion of BE non-volatile storage.

As described elsewhere herein, for example, such as in connection with FIGS. 3, 4, and 5, a first MD page, such as a MD MID page, can include multiple entries where each such entry can include a pointer, address, reference, offset, or index to a MD leaf page. In at least one implementation not in accordance with the techniques of the present disclosure, the foregoing pointer or address of a MD MID page entry can directly reference the MD leaf page, where the pointer or address can be the physical address or location of the MD leaf page as stored on BE non-volatile storage. Thus, if the referenced MD leaf page is stored in a new physical location such as in connection with an LSS, the entry of the MD MID page must be updated also to include the new physical location or address.

In contrast to the foregoing in at least one embodiment in accordance with the techniques of the present disclosure, the entry of the MD MID page can generally include a logical address LA of a MD leaf page that is mapped or translated by the MD TT 1105 to the physical storage location or address PA of the MD leaf page as stored in a PLB of the MD log structure of the MD tier. More generally in at least one embodiment in accordance with the techniques of the present disclosure, MD page entries can reference other MD and VLB pages by their logical addresses rather than physical addresses. For example, a MD MID page entry can reference a MD leaf page using the MD leaf page's logical address that can then be mapped or translated, such as using a MD TT, to the physical address of the MD leaf page.

When updates to a MD page are flushed from the MD log, such updates can be applied to a current version V1 of the MD page as persistently stored in the MD log structure to generate an updated version V2 of the MD page. In accordance with an LSS, the updated version V2 of the MD page can then be persistently stored as the most recent copy of the MD page of the MD log structure, where the updated version V2 of the MD page can be stored at a new physical storage location or address that is different from the existing physical storage location or address of V1 of the MD page. Thus, as a MD page is updated and then persistently stored as part of flushing or destaging the MD log, the physical storage location or address of the MD page will change and the changed physical storage location or address can be noted in the appropriate TT, such as the MD TT for top, mid and leaf MD pages and similarly in the VLB TT for VLB pages. In at least one embodiment, the logical addresses of the MD pages and the VLB pages can remain the same even though the physical storage locations or addresses of such MD pages as stored in the MD LSS can change.

In at least one embodiment, at least some of the entries of the MD TT and VLB TT can be stored in memory such as volatile cache memory. Consistent with other discussion herein, version V1 of a MD page leaf1 can be stored on the BE non-volatile storage at a physical or address or location PAL. Subsequently, flushing updates from the MD log that update MD page leaf1 from version V1 to version V2 result in storing MD page leaf1 V2 at a new current physical address or location PA3, and also trigger a corresponding update U12 to the MD TT. U12 can identify, for example, the update or change to the TT entry corresponding to MD page leaf1 to identify PA3 (rather than PA1) as the current physical storage location or address for MD page leaf1.

Figure 10:
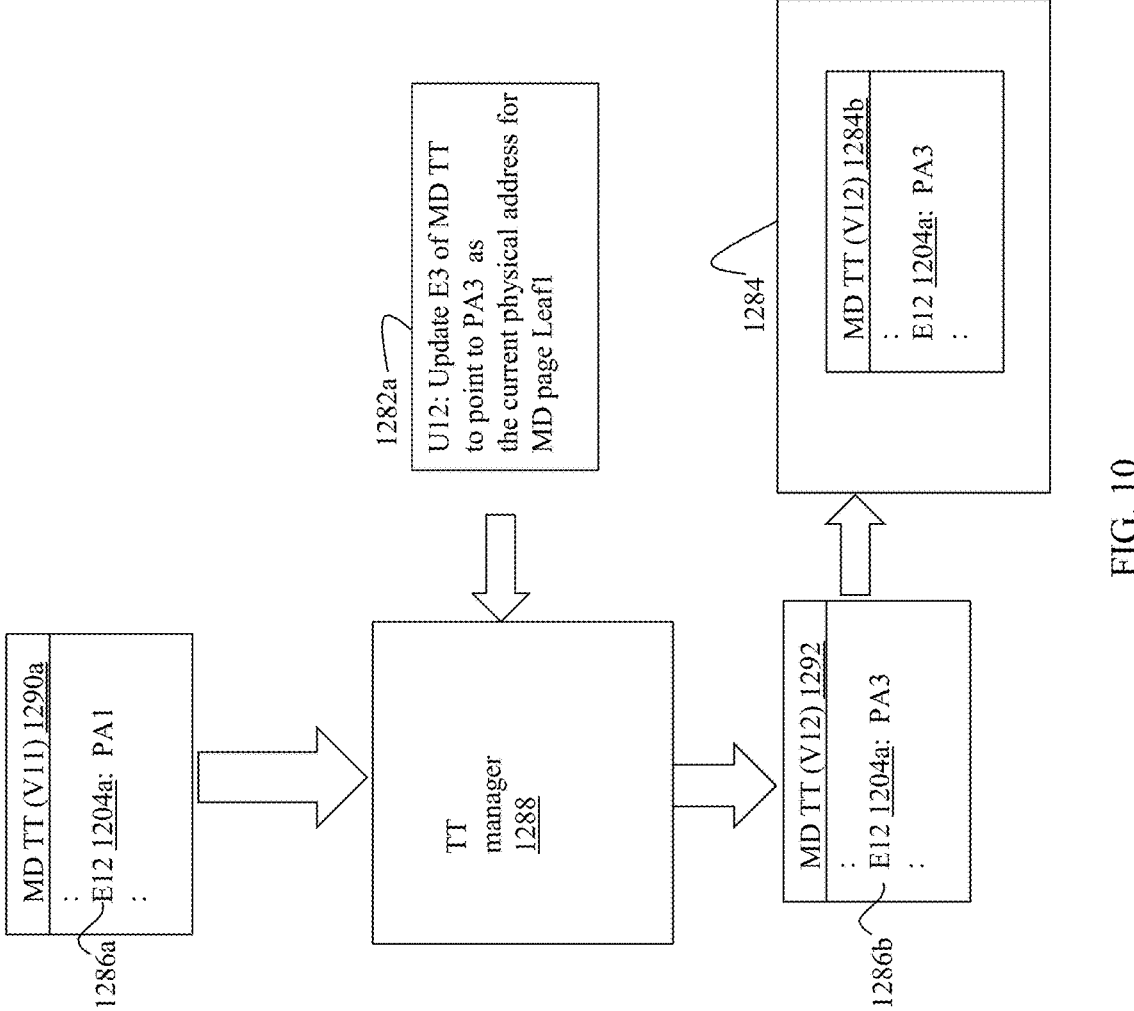

Referring to FIG. 10, shown is an example 1280 illustrating in further detail the foregoing update U12 for the MD TT in at least one embodiment.

As illustrated in the example 1280 of FIG. 10, there can be an update U12 for the entry E12 1204*a* identifying PA3 as the current physical address or location of current version of the MD page Leaf1. In at least one embodiment U12 can be applied to the persistent copy of the MD TT as well as a cached copy of the MD TT.

To further illustrate the foregoing, reference is made to the example 1280 that includes element 1290*a* representing the persistently stored copy MD TT. In at least one embodiment, management of the persisted versions of the TTs, including the VLB TT and the MD TT, can be performed by a TT manager component 1288. The TT manager 1288 can apply updates to the persisted copies of the VLB TT and MD TT to generate updated versions of the VLB TT and MD TT with updated corresponding entries thereof. The example 1280 illustrates application of MD TT updates but similar processing can be performed in connection with application of VLB TT updates.

The TT manager 1288 can receive inputs including the most recently persisted version of the MD TT, MD TT V11 1290*a*, and TT update U12 1282*a*. The TT manager can apply the update U12 1282*a* to the entry E12 1204*a* of the MD TT (V11) 1290*a* to generate an updated MD TT (V12) 1292. In this example, V11 of the entry E12 1286*a* of 1290*a* is updated to V12 of the entry E12 1286*b* of 1292. In particular, the MD TT (V12) 1292 can correspond to the in-memory or cached MD TT. The MD TT (V12) 1292 can also be persistently stored in the MD tier 1284 on BE non-volatile storage. Element 1284*b* can denote the persistently stored MD TT after also applying the updated U12 1282*a* to the persisted MD TT.

In a similar manner, updates can also be applied to cached and persisted copies of the VLB TT.

Figure 11A:
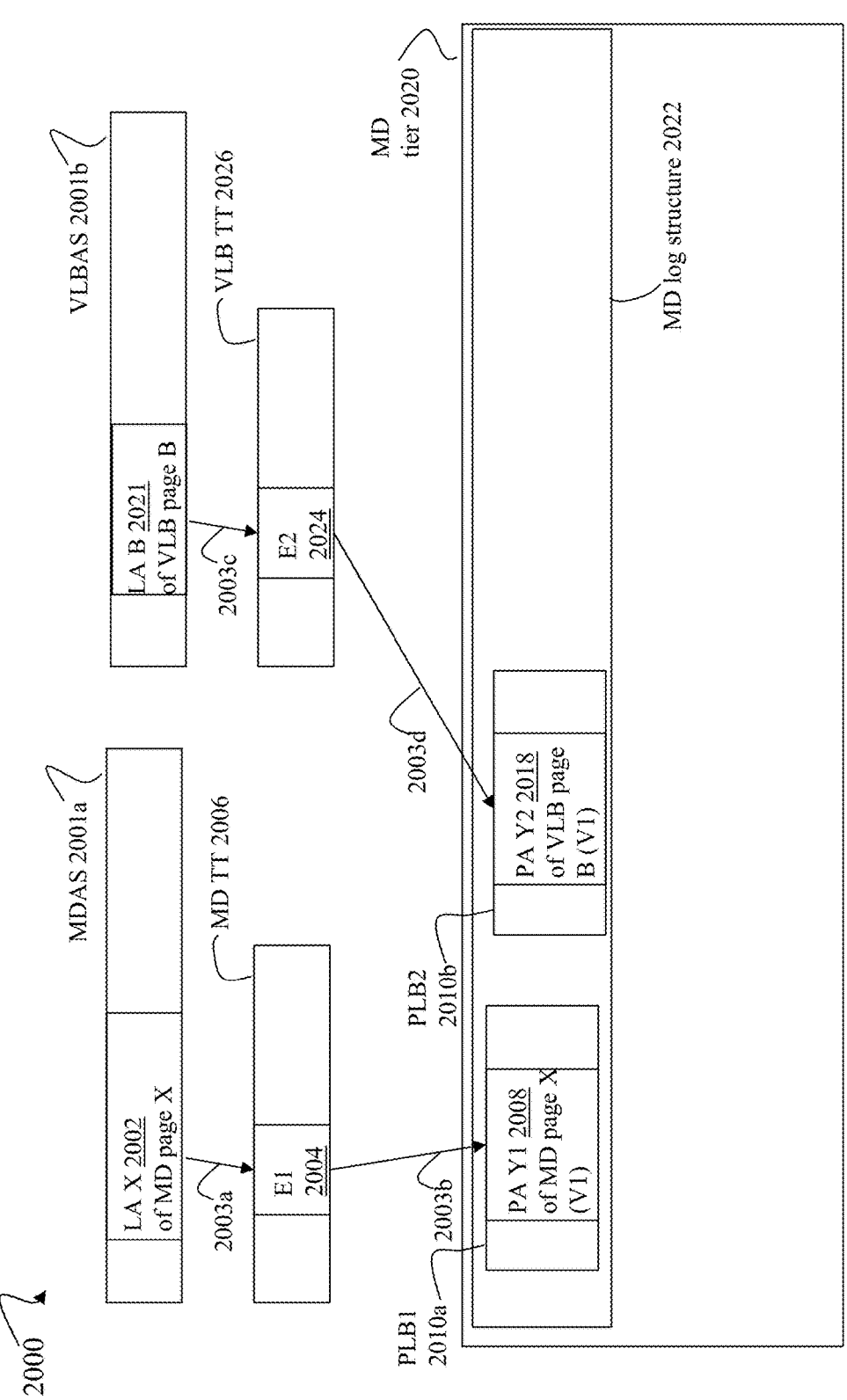
Figure 11B:
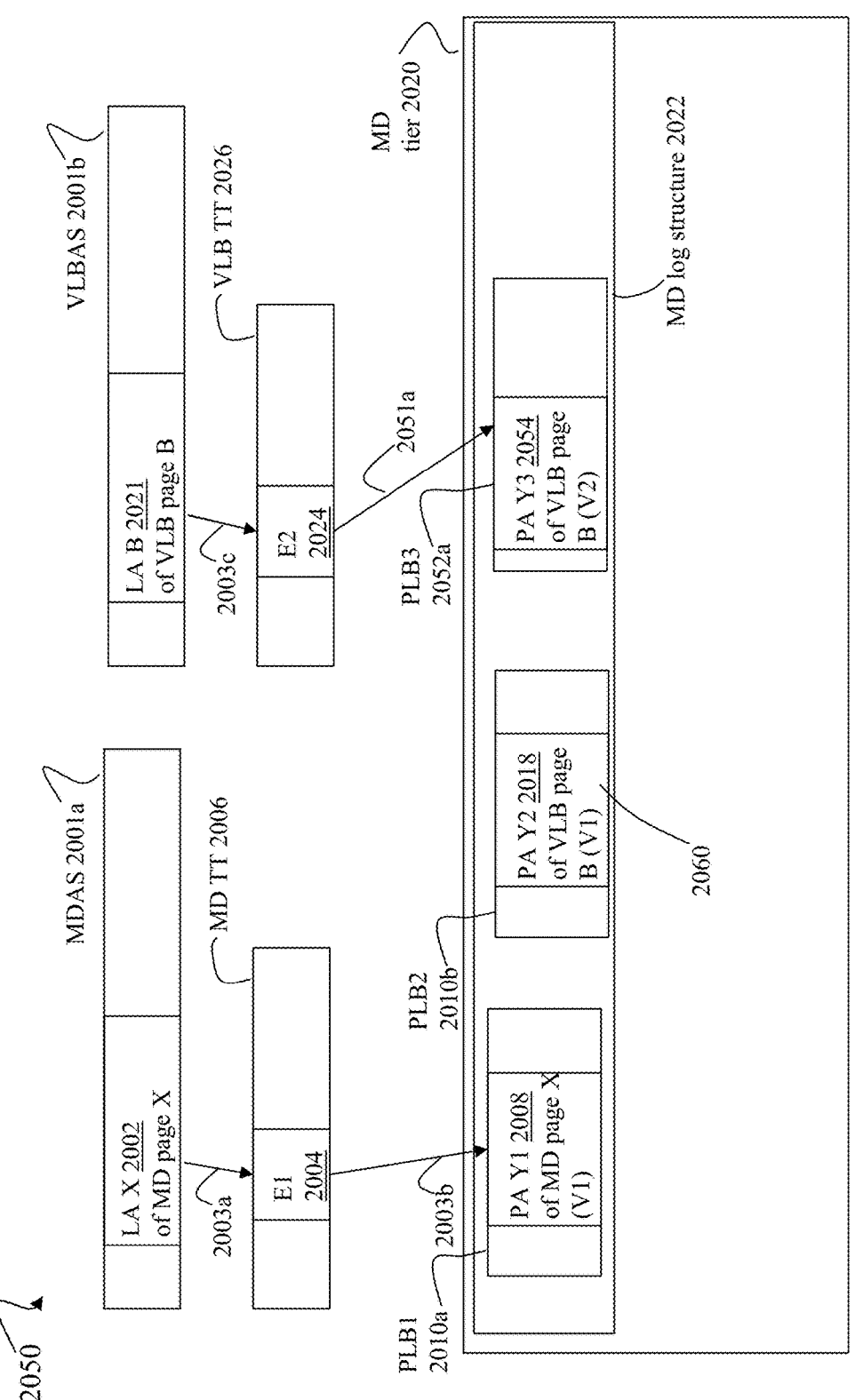

Referring to FIGS. 11A and 11B, shown are examples illustrating in more detail use of the MD TT and VLB TT in at least one embodiment in accordance with the techniques of the present disclosure.

FIG. 11A is an example 2000 that illustrates the state of structures and storage of the system at a first point in time T1; and FIG. 11B is an example 2050 that illustrates the state of the structures and storage of the system at a second point in time T2 subsequent to T1.

With reference to FIG. 11A, the example 2000 includes MDAS (MD logical address space) 2001*a*, MD TT 2006, VLBAS (VLB logical address space) 2001*b* and VLB TT 2026. Elements 2001*a-b* denote the logical address spaces that are mapped, respectively, by the TTs 2006, 2026, to corresponding physical storage addresses or locations in the MD log structures 2022 of the MD tier 2020.

Consistent with other discussion herein, the TTs 2006, 2026 can be characterized as providing a layer of indirection between logical addresses, respectively, of 2001*a-b* and corresponding physical addresses or locations stored in the MD log structure 2022 of the MD tier 2020.

In the example 2000, the MDAS 2001*a* can include logical address LAX 2002 of MD page X that is mapped (2003*a*) to a corresponding entry E1 2004 of MD TT 2006 that is further mapped (2003*b*) to a corresponding current physical address or location PA Y1 2008 currently storing V1 of MD page X. PA Y1 2008 can be included in PLB 2010*a* of the MD log structure 2022.

In the example 2000, the VLBAS 2001*b* can include logical address LA B 2021 of VLB page B that is mapped (2003*c*) to a corresponding entry E2 2024 of VLB TT 2026 that is further mapped (2003*d*) to a corresponding current physical address or location PA Y2 2018 currently storing V1 of VLB page B. PA Y2 2018 can be included in PLB 2010*b* of the MD log structure (e.g., MD LSS) 2022.

In at least one embodiment, the TTs 2006, 2026 can denote the in-memory current version of the TTs at time T1.

At the second point in time T2 subsequent to T1, updates to VLB page B can be flushed from the MD log and applied to the current persistently stored version V1 of VLB page B as stored at PA Y2 2018 of PLB 2 2010*b* to generate an updated version, VLB page B V2. As illustrated in the example 2050 of FIG. 11B, the VLB page B V2 can be stored at a new physical address or location PA Y3 2054 of the PLB3 2052*a* of the MD log structure 2022. Accordingly, the entry E2 2024 of the VLB TT 2026 can be updated to now point or reference (2051*a*) the new physical address or location PA Y3 2054 (rather than point to or reference PA Y2 2018).

Systems can include various structures stored in a cache such as a fast volatile memory, where such structures can sometimes also referred to herein as in-memory or volatile memory structures. As discussed herein, a TT or translation table can be used to perform address translations of logical to physical addresses or locations for various metadata pages in a log structured system or LSS. In this context in at least one embodiment, metadata (MD) pages can generally include top, mid and leaf MD pages as well as VLB pages discussed above. A TT can be used to translate a logical address of a MD page to a corresponding physical address or location where the MD page is stored on BE non-volatile storage. As discussed above, an embodiment can generally include one or more TTs that map metadata page logical addresses to corresponding current physical storage locations or addresses where the metadata pages are stored. In at least one embodiment, the general class of MD pages can include top, mid and leaf MD pages and VLB pages. In at least one embodiment, a first TT (e.g., VLB TT) can be used to map logical addresses of top, mid and leaf MD pages to corresponding physical addresses, and a separate second TT (e.g., MD TT) can be used to map logical addresses of VLB pages to corresponding physical addresses. As a variation, an embodiment can use a single TT for mapping logical to physical addresses of all such MD pages including top, mid and leaf MD pages and VLB pages.

To provide fast access to recently read or modified TT entries, a TT cache (sometimes referred to as a TT address cache) can be used. The TT cache can be an in-memory copy of at least some of the TT entries of the TT. The TT cache can include in-memory copies of at least some of the TT entries expected to be used again and/or recently use. The TT cache can be indexed by MD page logical addresses that are mapped to corresponding physical addresses or locations on BE non-volatile storage where the respective MD pages are stored. In at least one embodiment, each node can include a node-local TT cache that is a volatile memory cache where the TT cache includes a copy of at least some of the entries of the TT.

Updates, changes or deltas to a MD page can be stored in a MD log in at least one embodiment. The changes to a MD page can be subsequently destaged from the MD log and applied to a current version of the MD page to generate a new version of the MD page. In at least one embodiment where the metadata is managed and stored in accordance with an LSS, the current version of the MD page is stored at a first physical location or address on BE non-volatile storage, and the new version of the MD page is written to a new physical location or address different than the first physical location or address of the prior version. Thus each time updates are applied to a MD page as part of destaging the MD log such that a new version of the MD page is generated and stored at a new physical location or address, the MD page's corresponding TT entry in the TT can also be updated. In at least one embodiment, the corresponding TT entry as stored in a persisted TT on BE non-volatile storage can be updated. Also when a TT entry is updated, any cached copy of the existing TT entry in the TT cache becomes invalid or stale. If the TT cache includes an existing TT entry for the MD page, the cached existing TT entry indicates that the MD page is stored at the first physical location or address of the prior version of the MD page (e.g., before applying the update). After the new revised version of the MD page is stored at a different location, the new physical address or location, thereby invalidating the information of any cached existing TT entry for the MD page, where the existing cached TT entry incorrectly indicates the prior physical address of the MD page as the current physical address rather than indicate the new physical address or location as the current physical address. As a result in at least one embodiment, the corresponding TT entry of the TT cache can be removed or invalidated. Alternatively, the corresponding TT entry of the TT cache can be updated to properly map the MD page logical address to the current new physical address or location of the MD page.

In at least one embodiment, the one or more TTs, metadata pages (including VLB pages and top, mid and leaf MD pages), and user data pages can be stored persistently on BE non-volatile storage. In at least one embodiment, the one or more TTs can be persistently stored in a first portion of BE non-volatile storage; the metadata pages (including VLB pages and top, mid and leaf MD pages) can be persistently stored in a second portion of BE non-volatile storage; and the user data pages can be persistently stored in other portions of BE non-volatile storage. Within the MD tier in at least one embodiment, pages of different types or categories can be stored in segregated storage areas. In at least one embodiment, a first category or type of metadata pages can include VLB pages, and a second category or type of metadata pages can include top, mid and leaf MD pages. VLB pages can be stored in a first storage area of the MD tier, where the first storage area can sometimes be referred to herein as a VLB storage area. In at least one embodiment, top, mid and leaf MD pages can be stored in a second storage area of the MD tier, where the second storage area can sometimes be referred to herein as a non-VLB or MD storage area. In at least one embodiment, groups of pages can be persistently stored in large chunks, portions or storage units such as PLBs discussed elsewhere herein. In at least one embodiment, each PLB can be 2 MB in size, and each page can be 4 KB in size such that a PLB can store 512 pages. In at least one embodiment, content can be written to BE non-volatile storage as a single PLB. In at least one embodiment, the size of a single PLB can be the size of a single stripe of storage across multiple storage devices of BE non-volatile storage.

Consistent with other discussion herein in at least one embodiment, the MD log can be flushed or destaged, where the MD log can include records or entries of updates to MD pages. In at least one embodiment, the MD pages can include top, mid and leaf MD pages and VLB pages such as included in the mapping information and hierarchical structure such as discussed above (e.g., in connection with FIGS. 2D, 3, 4, 5, and 6). In at least one embodiment, flushing or destaging entries from the MD log can include aggregating multiple updates made to the same metadata page; obtaining an existing persisted copy of the metadata page from a first storage location on BE non-volatile storage; generating an updated metadata page by applying the multiple updates to the existing copy of the metadata page (as read from BE non-volatile storage); and writing out or storing the updated metadata page at a second storage location on BE non-volatile storage. In at least one embodiment where the metadata is managed as an LSS, the foregoing first and second storage locations can be different physical storage locations on BE non-volatile storage.

In at least one embodiment, writing out or destaging the updated metadata page, generated as a result of flushing and applying corresponding updates from the MD log, can include storing the updated metadata page to a persistent buffer or staging area in order to accumulate a sufficient number of updated metadata pages to perform a large sequential write to the BE non-volatile storage. In at least one embodiment, the staging area can generally include multiple areas or partitions, where each area or partition of the staging area can be the size of a single PLB. When a single partition of the staging area is full, or otherwise sufficiently full (e.g., within a specified tolerance) in at least one embodiment, the single partition of updated MD pages can be written out or persistently stored on BE non-volatile storage (e.g., such as to the MD tier).

What will now be described are further details regarding various embodiments in accordance with the techniques of the present disclosure.

In the following paragraphs, examples illustrating use of the techniques of the present disclosure can be based on particular sizes. For example, a PLB can be 2 MB in size and the size of each uncompressed or decompressed MD page can be 4 KB in size. More generally the techniques of the present disclosure can be used in connection with PLBs and MD pages of any suitable size that can vary with embodiment.

In connection with examples and discussion in the following paragraphs, a single TT with TT entries can be illustrated for use with MD pages that generally denote any type of metadata page such as top, mid, leaf and VLB pages discussed elsewhere herein. Consistent with other discussion herein, the techniques of the present disclosure can also be used in other embodiments which implement a separate VLB TT for use with VLB pages and a separate MD TT for use with top, mid and leaf pages.

In at least one embodiment for a PLB of compressed MD pages of LSM, the number of compressed MD pages that can be written into a single PLB may not be fixed or deterministic since the compression ratio of each stored compressed MD page can vary.

With a PLB of uncompressed MD pages in at least one embodiment, the PLB can include a layout with a fixed size header followed by the uncompressed MD pages. The fixed size header can include back pointer information or a back pointer entry for each uncompressed MD page of the PLB, where the number of uncompressed MD pages stored in the PLB is fixed and known (e.g., not variable) and the number of corresponding back pointer entries of the header is similarly fixed. In at least one embodiment storing PLBs of uncompressed MD pages, the TT used to map logical addresses of MD pages to corresponding physical addresses or locations can identify a particular MD page's location within the PLB using a base address or pointer (e.g., denoting the first or starting address of the PLB) and an offset or index. In at least one embodiment, the address of the MD page in the PLB can be determined by adding the PLB base address and offset. In at least one embodiment, the index can identify the particular ordered position of the corresponding MD page in the PLB. Using the index and PLB base address, the address of the MD page in the PLB can be calculated mathematically and deterministically as each uncompressed MD page is the same fixed size. For example, the MD page can be the $2^{nd}$ MD page of a PLB with an index=2, where PA1 (denoting the physical address or location of the MD page within the PLB) can be calculated as: PA1=PLB base address+(2*fixed size of each uncompressed MD page). With a PLB=2 MB, each MD page=4 KB and a fixed size header of back pointer entries in at least one embodiment, the range of allowable indices of uncompressed MD pages of the PLB can be described using 9 bits. In such an embodiment, the location of an uncompressed MD page in the PLB can be identified, for example, in the TT (e.g., MD TT or VLB TT) by a corresponding index that is 9 bits (e.g., where the index value for an uncompressed MD page identifies the starting point of the MD page in a corresponding PLB).

For a PLB of compressed MD pages, one option can be to use a layout similar to that noted above for a PLB of uncompressed MD pages. For example, the PLB can include i) a collective header of consecutively or contiguously stored back pointer entries for all compressed MD pages of the PLB followed by ii) a section of all the compressed MD pages consecutively or contiguously stored within the PLB. However with a PLB of a variable number of compressed MD pages, a fixed header size (e.g., where the header collectively includes all fixed size back pointer entries for all compressed MD pages of the PLB) similar to that as noted above with the PLB of uncompressed MD pages may not be desirable. If a single fixed size PLB header including all back pointer entries were used with compressed MD pages in a PLB, only a fixed number of fixed size back pointer entries can be stored in the header thereby limiting the number of compressed MD pages capable of being stored in the PLB even though there may be remaining PLB storage available for storing more compressed MD pages. As an alternative, the single PLB header (collectively storing all back pointer entries of all compressed MD pages of the PLB) can be a variable size since the number of compressed MD pages stored in the PLB can vary. PLB header space for a PLB of compressed MD pages can vary and can be greater than the size of the fixed header of the PLB of uncompressed MD pages. Generally, additional header space or storage of the PLB can be consumed to accommodate the variable and larger number of compressed MD pages that can be stored in a single PLB (as compared to the number of uncompressed MD pages that can be stored in a single PLB). Whether considering a fixed size header or variable size header in such a layout with a PLB of compressed MD pages, since the number of compressed MD pages stored in the PLB and the size of each compressed MD page of the PLB can vary, the exact physical address or location, PA1, of each compressed MD page cannot be expressed and calculated using an index as noted above for a PLB of uncompressed MD pages. As such, the size of each entry of the TT can be expanded by 21 bits to allow for storing an offset or location (e.g., such as a byte offset) within the PLB that can be any value in the entire 2 MB size range of the PLB. Additionally, the TT entry can be further expanded to identify the exact size of the compressed MD page within the PLB where allowable sizes of a compressed MD page can be up to 4 KB and thus consume up to 12 bits in each TT entry.

Although the above-noted option for a PLB of compressed MD pages can be utilized, it may not be desirable for use with management and storage of compressed MD pages due to the increase in storage requirements of the TT both on disk and in memory.

Described below is an alternative layout, format or structure that can be used in connection with a PLB of compressed MD pages in at least one embodiment in accordance with the techniques of the present disclosure. In at least one embodiment for a PLB of compressed MD pages, the PLB can have a layout, format or structure where back pointer entries or information can be interleaved between corresponding compressed MD pages. In at least one embodiment for a PLB of compressed MD pages, each compressed MD page and its corresponding back pointer entry or information can be stored at consecutive or contiguous locations within the PLB. For example, a compressed MD page of the PLB can be stored immediately subsequent to or following a corresponding back pointer entry or information within the PLB. Put another way, the back pointer entry or information for a compressed MD page can be stored or encoded in an uncompressed form contiguously immediately prior to the corresponding compressed MD page within the PLB. Structuring the layout of the PLB of compressed MD pages in this manner allows for an optimal number of compressed pages to be stored per PLB.

Figure 12:
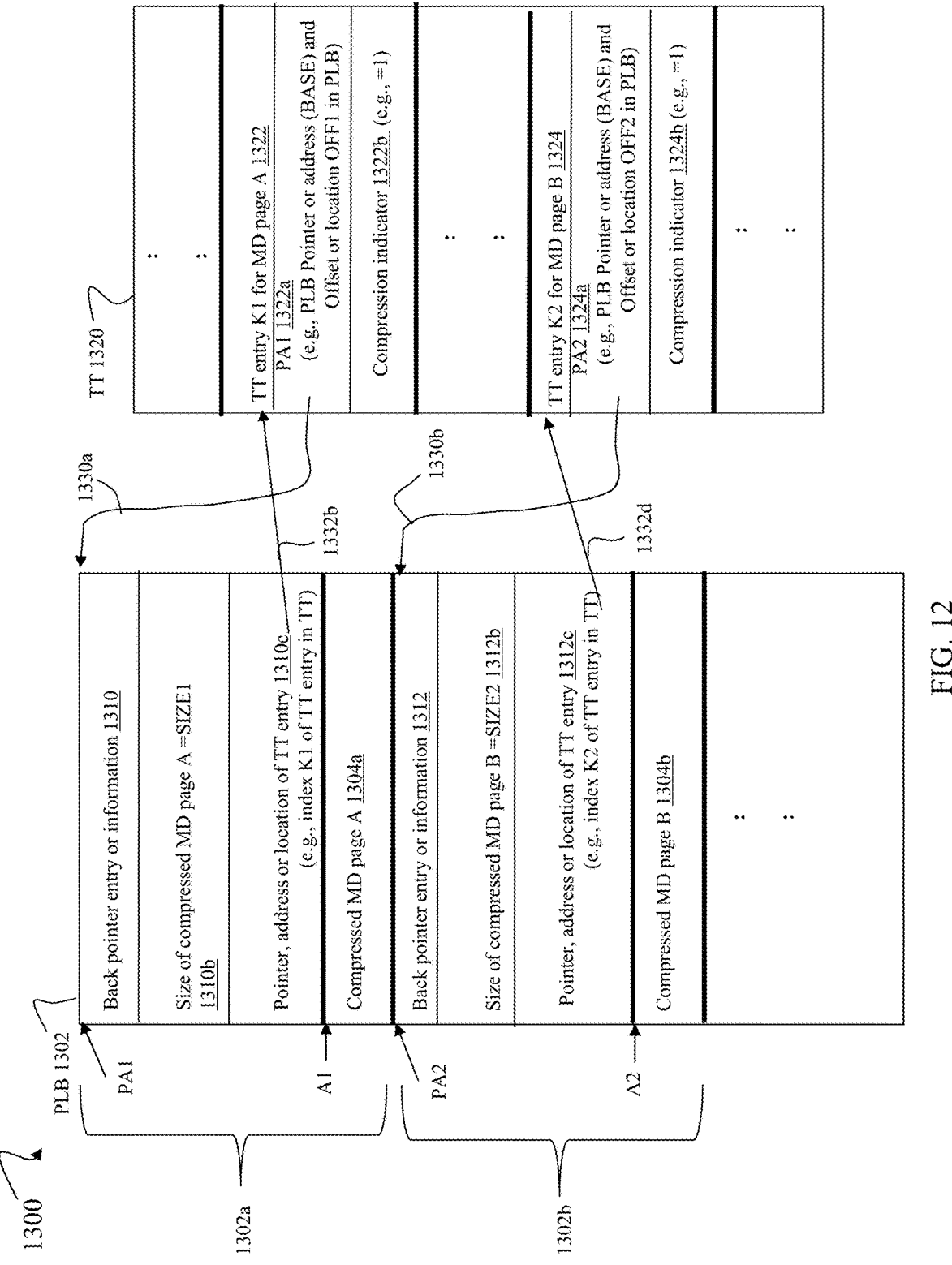

Referring to FIG. 12, shown is an example 1300 illustrating a PLB of compressed MD pages and corresponding TT entries of a TT in at least one embodiment in accordance with the techniques of the present disclosure.

The example 1300 includes a PLB 1302 including only compressed MD pages and corresponding back pointer entries. Generally, the PLB 1302 includes an interleaved arrangement of back pointer entries or information and corresponding compressed MD pages. The elements 1302a and 1302b denote consecutive contiguous storage areas of the PLB 1302 corresponding to two compressed MD pages A and B. In a similar manner, other storage areas of the PLB 1302 can also correspond to other compressed MD pages where such other storage areas denote consecutive contiguous storage areas of the PLB 1302. In at least one embodiment, the PLB 1302 can have the illustrated layout and may not include any uncompressed MD pages. Generally each storage area of the PLB 1302 for a corresponding MD page can include: i) a back pointer entry or information regarding the compressed MD page and ii) the compressed MD page. In at least one embodiment, each back pointer entry can include: i) the size of the corresponding compressed MD page, and ii) a pointer, address, location or reference of a corresponding TT entry for the compressed MD page.

The storage area 1302a includes a back pointer entry or information 1310 for a corresponding compressed MD page A 1304a. The back pointer entry 1310 can include: 1310b a size of the compressed MD page A (1304a); and 1310c a pointer to, address of, reference to, or location of, a corresponding TT entry (1322) for the MD page A (1304a). The element 1332b illustrates the pointer, address or location described in field 1310c pointing to or referencing a corresponding TT entry 1322 of the TT 1320, where the TT entry 1322 is used in performing logical to physical address translation for the corresponding MD page A 1304a. In at least one embodiment, 1310c can have a value denoting the TT index of a corresponding TT entry 1322 in the TT 1320. More generally, for a particular MD page having a logical address LA, LA can be mapped to a corresponding TT entry of the TT 1320 having a corresponding TT index. In at least one embodiment, the LA of a MD page can be the TT index of the MD page's corresponding TT entry. In at least one embodiment, the LA of a MD page can be mapped, such as by a mathematical function F, to a corresponding TT index of the MD page's corresponding TT entry (e.g., F(LA)=TT index).

In at least one embodiment, the TT 1320 can be organized as a list or an array of elements or entries each having a corresponding index denoting a relative location, offset or position within the TT 1320. In the example 1300, each TT entry of the TT 1320 can include: i) a pointer, address, reference or location of a corresponding back pointer entry and ii) a compression indicator.

In at least one embodiment, K1 can denote the index or element number of the TT entry 1322 corresponding to the MD page A 1304*a*. In at least one embodiment, the TT index K1 can be the value of field 1310*c* denoting the pointer, address or location of the TT entry (1322) corresponding to MD page A (1304*a*).

The TT entry 1322 includes information regarding the corresponding MD page A 1304*a*. In at least one embodiment, the TT entry 1322 can include the following fields: 1322*a* denoting the physical address or location, PA1, of the corresponding MD page A (1304*a*) of the PLB 1302; and the compression indicator 1322*b*. In at least one embodiment, the physical address or location, such as PA1, of a corresponding MD page, such as MD page A 1304*a* can be expressed using a PLB pointer or starting address, BASE, and an offset or location OFF1 in the PLB 1302. The element 1330*a* illustrates PA1 1322*a* pointing to or referencing the physical storage location of the back pointer entry 1310 of the corresponding MD page A 1304*a*.

In at least one embodiment, the TT entry 1322 can also include the compression indicator 1322*b* indicating whether the corresponding MD page A 1304*a* is stored in its compressed form or its uncompressed form in the PLB 1302. In at least one embodiment, the compression indicator 1322*b* can be a bit that is: i) set to 1 if the corresponding MD page is stored in its compressed form in a PLB, and ii) otherwise is set to 0 to denote the corresponding MD pages is stored in its uncompressed form in a PLB. For example, the indicator 1322*b* can set to 1 to denote that MD page A 1304*a* is stored in its compressed form in the PLB 1302.

The storage area 1302*b* includes a back pointer entry or information 1312 for a corresponding compressed MD page B 1304*b*. The back pointer entry 1312 can include: 1312*b* a size of the compressed MD page B (1304*b*); and 1310*c* a pointer, address or location of a corresponding TT entry (1324) for the MD page B (1304*b*). The element 1332*d* illustrates the pointer, address or location described in field 1312*c* pointing to or referencing a corresponding TT entry 1324 of the TT 1320, where the TT entry 1324 is used in performing logical to physical address translation for the corresponding MD page B 1304*b*. In at least one embodiment, 1312*c* can have a value denoting the index of a corresponding TT entry 1324 in the TT 1320.

In at least one embodiment, K2 can denote the index or element number of the TT entry 1324 corresponding to the MD page B 1304*b*. In at least one embodiment, the TT index K2 can be the value of field 1312*c* denoting the pointer, address or location of the TT entry (1324) corresponding to MD page B (1304*b*).

The TT entry 1324 includes information regarding the corresponding MD page B 1304*b*. In at least one embodiment, K2 can be the value of field 1312*c* denoting the pointer, address or location of the TT entry (1324) corresponding to MD page B (1304*b*). In at least one embodiment, the TT entry 1324 can include the following fields: 1324*a* denoting the physical address or location, PA2, of the corresponding MD page B (1304*b*) of the PLB 1302; and the compression indicator 1324*b*. In at least one embodiment, the physical address or location, such as PA2, of a corresponding MD page, such as MD page B 1304*b* can be expressed using a PLB pointer or starting address, BASE, and an offset or location OFF2 in the PLB 1302. The element 1330*b* illustrates PA2 1324*a* pointing to or referencing the physical storage location of the back pointer entry 1312 of the corresponding MD page B 1304*b*. In at least one embodiment, the TT entry 1324 can also include the compression indicator 1324*b* indicating whether the corresponding MD page B 1304*b* is stored in its compressed form or its uncompressed form in the PLB 1302. In at least one embodiment, the compression indicator 1324*b* can be a bit that is: i) set to 1 if the corresponding MD page is stored in its compressed form in a PLB, and ii) otherwise is set to 0 to denote the corresponding MD pages is stored in its uncompressed form in a PLB. For example, the indicator 1324*b* can set to 1 to denote that MD page B 1304*b* is stored in its compressed form in the PLB 1302.

In at least one embodiment of a TT, the PLB offset or location, such as OFF1 of field 1322*a* of TT entry 1322 and OFF2 of field 1324*a* of TT entry 13424, can be used to provide a direct location to directly locate, reference or point to the respective back pointer entry of information of a corresponding MD page. For example, in at least one embodiment, the PLB offset OFF1 of 1322*a* can provide an exact byte offset of where the compressed MD page A 1304*a* is stored within the PLB 1302; and the PLB offset OFF2 of 1324*a* can provide an exact byte offset of where the compressed MD page B 1304*b* is stored within the PLB 1302. In at least one such embodiment where the PLB 1302=2 MB, the PLB offsets such as OFF1 1322*a* and OFF2 1324*a* used to express a physical storage location of a corresponding compressed MD page of the PLB 1302 can be 21 bits to cover the entire potential 2 MB range of PLB offsets.

As a variation to the foregoing, rather than have the PLB offsets used in connection with TT entry physical addresses or locations PA1 1322*a* and PA2 1324*a* denote exact byte offsets within the PLB 1302, such PLB offsets can denote larger storage chunk sizes or segments, where the PLB offset thus denotes the direct location or physical address of a back pointer entry based on a larger storage granularity of multiple bytes. For example, rather than provide a PLB offset denoting a byte offset location from the PLB base or starting address BASE, the PLB offset included in TT entries can denote a multiple of a larger segment size such as 128 bytes. To further illustrate with a segment size of 128 bytes, an offset=4 denotes an actual PLB offset=4*128 bytes=512 bytes. In at least one embodiment with a 2 MB PLB using a 128 byte segment size and expressing an offset in connection with physical addresses PA1 1322*a*, PA2 1324*a*, the offset can be expressed using 14 bits rather than 21 bits (as noted above with an exact byte offset). In such an embodiment the offsets used in connection with physical address fields 1322*a* and 1322*b* respectively of TT entries 1322, 1324, denote a multiple of a 128 byte segment. Generally any suitable size segment can be used and is not limited to the illustrated segment size of 128 bytes. Thus in at least one embodiment using a multiple byte segment size, the physical address or location within the PLB can be expressed with a first offset denoting a number of multiple byte segments using fewer bits as compared to using a second offset expressed as a byte offset.

In at least one embodiment using a segment size, such as 128 bytes, that is larger than a byte, back pointer entries of information of compressed MD pages can be aligned on a segment size boundary. Put another way, each back pointer entry or information such as 1310, 1312 can be aligned to start on a segment boundary having an offset or location within the PLB 1302 that is a multiple of the segment size. In such an embodiment due to the larger segment size, there can be unused storage within a PLB following a compressed MD page. For example with a 128 byte segment size, there can be unused storage between the compressed MD page A 1304a and the back pointer entry or information 1312 so that element 1312 begins at a first offset or location in the PLB 1302 where the first offset or location is a multiple of 128 bytes.

In at least one embodiment for a PLB, the back pointer entries or information, such as 1310 and 1312, of the PLB can be stored in a corresponding uncompressed or decompressed form, while all MD pages, such as 1304a and 1304b, of the PLB can be stored in a corresponding compressed form. In at least one embodiment, each storage area corresponding to a particular MD page can include i) a back pointer entry of information that is a same fixed size, and ii) a corresponding compressed MD page that can vary in size. For example, within the PLB 1302, back pointer entries 1310 and 1312 have a same size and occupy the same amount of physical storage within the PLB 1302. In a similar manner, any other back pointer entries or information for other MD pages of the PLB can have the same fixed size as 1310 and 1312. Additionally, within the PLB 1302, the size of the compressed MD pages 1304a and 1304b can vary from one another depending on the achieved compression. In a similar manner, other compressed MD pages of the PLB can vary in size depending on achieved compression.

Using the layout of the PLB 1302 and TT 1320 in at least one embodiment, the physical address or location of a compressed MD page in the PLB can be determined. To illustrate, consider the compressed MD page A 1304a. A1, denoting the PLB location or address of the compressed MD page A 1304a within the PLB 1302 can be determined based, at least in part, on the fixed size Z1 of the back pointer entry 1310 and the PLB location or physical address PA1 of the corresponding back pointer entry 1310 for MD page A 1304. Processing can include: i) reading the corresponding TT entry 1322 for MD page A that includes PA1 1322a identifying the location of the corresponding back pointer entry 1310; and ii) determining A1 the starting PLB location of MD page A 1304a based on PA1 and the fixed size Z1 of field 1310. For example in at least one embodiment, A1 (the PLB starting address or location of the compressed MD page A 1304a) can be determined by adding Z1 to PA1 as obtained from the corresponding TT entry 1322.

In order to read the complete compressed MD page A 1304a, the size SIZE1 of 1304a is also needed. In at least one embodiment, the size, SIZE1, of the compressed MD page A 1304a can be obtained from the field 1310b of the back pointer entry 1310 for MD page A 1304a.

In summary, reading the compressed MD page 1304a in at least one embodiment can include: i) reading the corresponding TT entry 1322 for MD page A that includes PA1 1322a identifying the PLB address or location of the corresponding back pointer entry 1310; ii) using PA1 of 1322a to read the back pointer entry 1310a including the size 1310b of the compressed MD page A (where the back pointer entry is a fixed size Z1); iii) determining the starting PLB location or address A1 of MD page A 1304a based on PA1 and the fixed size Z1 of the back pointer entry 1310; and iv) reading the compressed MD page A 1304a using the calculated value of A1 and the size, SIZE1 of the compressed MD page A 1304a (where SIZE1 is obtained from the field 1310b of the back pointer entry 1310). The compressed MD page A 1304a can then be decompressed to obtain the original uncompressed form of the MD page A that can be used in any further processing.

In at least one embodiment, if processing is performed to scan the PLB such as in connection with recovery processing, using the above information and processing for MD page A 1304a, PA2 (denoting the beginning or start of the next back pointer entry 1312 for the next compressed MD page B 1304b of the PLB 1302) can also be determined based, at least in part, on: PA1 (e.g., PLB location or address of 1310), Z1 (the fixed size of each back pointer entry such as 1310), and SIZE1 (e.g., the size of the compressed MD page A 1304a). In at least one embodiment, PA2 can be determined by adding PA1, Z1 and SIZE1. In an embodiment where a multiple byte segment size is used to denote the PLB offset of TT entries, the next back pointer entry 1312 is aligned along a next segment boundary such that PA2 can be determined by also adding an additional number of bytes of padding that may be needed to determine an address PA2 that is aligned on a desired segment boundary. For example assume a 128 byte boundary, where PA1+Z1+SIZE1=1000 and where 1000 denotes a byte offset or address within the PLB 1302. In this case, PA2 denoting the PLB address or location of the next back pointer entry 1312, begins on a 128 byte boundary or offset that is a multiple of 128 bytes where 1000 can be rounded up to 1024, the next 128 byte increment, such that PA2=1024 (denoting a byte offset within the PLB 1302). In at least one such embodiment, the field 1324a of the corresponding TT entry 1324 can express PA2 using a PLB base address and PLB offset where the PLB offset is expressed based on the 128 byte segment size and thus can be an integer value denoting a multiple of 128 bytes.

In a similar manner to that as discussed above, subsequent physical addresses or locations in the PLB of other back pointer entries and compressed MD pages can also be determined.

Figure 13A:
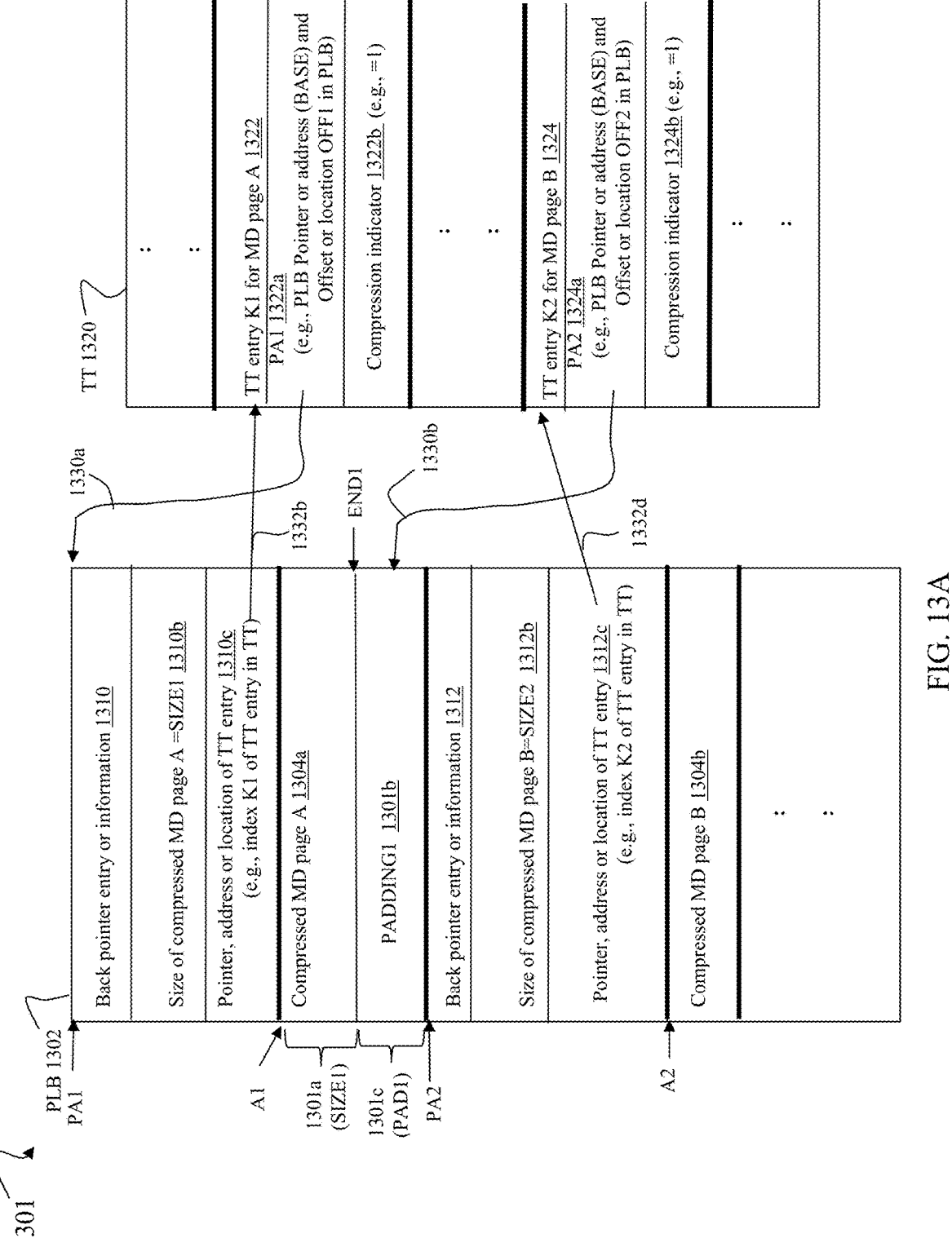

To further illustrate, reference is made to FIG. 13A which shows an arrangement similar to that of FIG. 12 with the difference that a multiple byte segment size, such as 128 bytes, is used to express the PLB offsets corresponding to physical addresses or locations of back pointer entries. Consistent with discussion above, each of the back pointer entries, such 1310 and 1312, for corresponding compressed MD pages stored in the PLB 1302 can be aligned to begin at a byte location or offset of the PLB 1302 that is a multiple of 128 bytes due to the 128 byte segment size used in expressing the PLB offsets of fields 1322a and 1324a. In the example 1301, assume that the compressed MD page A 1304a has a corresponding size of SIZE1 as denoted by 1301a such that the ending PLB location or offset END1 (of the compressed MD page 1304a) does not end on a 128 byte boundary. In this case, PADDING1 1301b can denote the extra unused storage of size PAD1 that occurs prior to the next 128 byte boundary denoted by PA2. Element 1301c denotes that PAD1 is the size of unused storage area PADDING1 1301b. So continuing with the above example, assume that END1=PA1+Z1+SIZE1, where END1=1000. In this case, processing can determine PA2, the PLB location of the next back pointer entry 1312, by rounding END1 up to the next 128 byte increment which is 1024, such that PA2=1024.

In a similar manner as may be needed, additional storage padding can exist between the end of a compressed MD page and the next consecutively stored back pointer entry such that the next back pointer entry begins (e.g., has a starting PLB location or address) on the next 128 byte or segment boundary.

Thus in at least one embodiment based on the above, the back pointer entries of a PLB of compressed MD pages can be used in connection with recovery processing such as when the system is rebooted or is otherwise restarted in response to an event. In at least one embodiment, such recovery processing can be performed, for example, to repopulate memory-related structures. As another example of recovery processing, assume that the in-memory and on-disk copies of TT 1320 are corrupted and need to be rebuilt. In at least one embodiment, the information stored in the PLB 1302 can be used to rebuild or reconstruct the TT 1320. For example, the PLB 1302 can be scanned consistent with discussion above to determine i) the starting location of each back pointer entry of the PLB and ii) the TT entry indices corresponding respectively to particular MD pages. For example as discussed above, PA2 denoting the PLB starting location of back pointer entry 1312 can be determined and the content of 1312 can be read, where the content of 1312 includes K2, the TT entry index of 1312$c$. PA2 and K2 (the TT entry index value of 1312$c$) can be used to populate the corresponding TT entry 1324 of TT 1320. Additionally, the compression indicator 1324$b$ value can be determined based on an attribute of the PLB 1302, where the attribute can indicate that PLB 1302 includes only compressed MD pages and corresponding back pointer entries but not uncompressed MD pages and any corresponding information. In at least one embodiment, the PLB attribute can be included in a corresponding PLB descriptor for the PLB 1302.

It should be noted that generally, the PLB and back pointer entries can include other information than as described herein for purposes of illustration. For example with reference to FIGS. 12 and 13A, the PLB 1302 of compressed MD pages can optionally include a PLB header that is a fixed size that occurs prior to the first back pointer entry 1310 such that the PLB header and the back pointer entry 1310 denote consecutive contiguous storage locations of the PLB 1302. In at least one such embodiment, the PLB header does not include the back pointer entries of compressed MD pages stored in the PLB but can rather optionally include other PLB specific information.

The embodiments described above in connection with FIGS. 12 and 13A utilizes a TT with TT entries that do not include and rather omit the size of the corresponding compressed MD page as a field in the corresponding TT entry. In such an embodiment as discussed above, the compressed MD page size such as used in processing to read a compressed MD page can be obtained from the corresponding back pointer entry of the PLB. As a variation in at least one embodiment, each TT entry corresponding to a compressed MD page can also include the size of the compressed MD page as a field in the corresponding TT entry. In such an embodiment, the compressed MD page size of the TT entry can be used rather than the compressed MD page size as included in the corresponding back pointer entry. For example, reading the compressed MD page 1304$a$ in at least one embodiment where the TT entries include compressed MD page sizes can include: i) reading the corresponding TT entry 1322 for MD page A 1304$a$ to obtain PA1 1322$a$ identifying the PLB address or location of the corresponding back pointer entry 1310; ii) reading the corresponding TT entry 1322 for MD page A 1304$a$ to obtain the size SIZE1 of the compressed MD page 1304$a$; iii) determining the starting PLB location or address A1 of MD page A 1304$a$ based on PA1 and the fixed size Z1 of field 1310; and iv) reading the compressed MD page A 1304$a$ using the calculated value of A1 and the size, SIZE1, read from the corresponding TT entry 1322. The compressed MD page A 1304$a$ can then be decompressed to obtain the original uncompressed form of the MD page A that can be used in any further processing. In at least one embodiment where the size of a compressed MD page is included as a field in the corresponding TT entry, the compressed size of the MD page can be encoded or represented using an integer value denoting the exact size based on a number of bytes, or alternatively based on a coarser storage granularity such as based on a segment size that is multiple bytes. For example in at least one embodiment where each uncompressed MD page has a size of 4 KB, expressing the compressed MD page size in terms of 128 byte segments can result in reducing the number of bits needed to describe the compressed MD page to 5 bits (reduced from 12 bits). Additionally in at least one such embodiment, the exact size of the compressed MD page can be encoded in the corresponding back pointer.

In at least one embodiment, each TT entry of the TT corresponding to a compressed MD page can include a size field that denotes the size of the compressed MD page where the size can be used in connection with storage space accounting to track the size of the holes of invalid content of a PLB. For example, a first MD page P1 can be stored at a first physical address PA1 in a first PLB at a first point in time T1. At a second point in time T2 subsequent to T1, the first MD page P1 can be updated where the updated version of the first MD page P1 is written to a second physical address PA2 of a second PLB. Part of related processing performed can include updating the first MD page P1's TT entry E1 to now map P1's logical address LA1 to PA2 rather than PAL. Additionally, processing of storage space accounting can be performed to track the amount of storage of the first PLB that contains invalid or stale content and/or valid content. When updating the TT entry E1 to map LA1 to PA2 (rather than PA1 of the first PLB), the storage space accounting can use the size X1 of the compressed first MD page P1 as denoted in E1. In particular in at least one embodiment, the space accounting can track the total amount or percentage of storage of the first PLB that contains valid content, where such total amount can be updated or decreased based on X1. Information of storage space accounting can be used in at least one embodiment in connection with GC processing such as to identify PLB candidates having holes of invalid content that can be reclaimed for reuse. Such information of storage space account can be used, for example, to identify two source PLBs whose collective amount of valid content can fit into a single target PLB. The target PLB can be 100% free. In at least one embodiment, the two source PLBs can have a large amount of invalid content and thus a small amount of valid content. In at least one embodiment, the two source PLBs can have the smallest amounts of valid content with respect to other PLB candidates. GC processing can, for example, copy the valid content of the two source PLBs to the single target PLB. As a result, the two source PLBs can be characterized as cleaned and can then be reclaimed for reuse in storing new content.

Referring to FIG. 13B, shown is a flowchart 1360 of processing steps that can be performed in at least one embodiment in accordance with the techniques of the present disclosure. FIG. 13B summarizes processing described above that can be performed in connection with reading a compressed MD page from a PLB in at least one embodiment.

At the step 1362, a request can be received to read a MD page P1 from BE non-volatile storage. The MD page P1 has a corresponding logical address LA1 that is mapped to a corresponding TT index J1 of a TT entry E1. From the step 1362, control proceeds to the step 1364.

At the step 1364, the TT entry E1 can be read that indicates the MD page P1 is stored in its compressed form and has a corresponding back pointer entry BP1 stored at the physical address or location PA1 in a PLB. From the step 1364, control proceeds to the step 1366.

At the step 1366, using PA1 of E1, the back pointer entry BP1 can be read. BP1 can be a fixed known size Z1. BP1 can include a size field with a value VAL1 denoting the size of the compressed MD page P1 as stored in the PLB. From the step 1366, control proceeds to the step 1368.

At the step 1368, ADD1, denoting a starting address or location of the compressed MD page P1 in the PLB, can be determined based on PA1, and Z1 such as by adding PA1 and Z1. From the step 1368 control proceeds to the step 1370.

At the step 1370, the compressed MD page P1 can be read from the PLB using ADD1 and VAL1, where ADD1 denotes the starting location of the compressed MD page as stored in the PLB and where ADD1+VAL1 denotes the ending location of the compressed MD page as stored in the PLB. The compressed MD page can then be decompressed and used as needed in its uncompressed form. For example, the uncompressed MD page P1 can be returned in response to the read request received in the step 1362.

In at least one embodiment in connection with performing processing of FIG. 13B and other processing to obtain a MD page stored in its compressed form in a PLB, a portion of storage, such as 4 KB, of the PLB can be read into a buffer. The portion can have the starting location of PA1, the corresponding back pointer entry BP1. The contents of the buffer can then be processed consistent with other discussion above in connection with FIG. 13B.

The foregoing description in connection with FIGS. 12, 13A and 13B illustrates a TT 1320 that includes physical addresses or locations (e.g., such as PLB pointer or address information 1322a, 1324a) corresponding to a direct location or address of a back pointer entry of a compressed MD page.

What will now be described is another technique of the present disclosure that can be used with TT entries of a TT to alternatively locate corresponding back pointer entries of compressed MD pages of a PLB. In at least one embodiment in accordance with this latter technique, each TT entry can point to or reference a region of PLB storage that can include multiple back pointer entries and corresponding compressed MD pages. The region can then be scanned to locate a desired particular TT entry such as based on matching TT entry indices or logical addresses of corresponding MD pages. In at least one embodiment, the region pointed to or referenced by a TT entry region pointer or address can start with a back pointer entry. Beginning with the first back pointer entry of the region, the region can be scanned to discover or locate a back pointer entry corresponding to a particular TT entry that includes the region's corresponding region pointer or address.

In at least one embodiment, the region pointer or address can be expressed in any suitable manner such as using a PLB base address and offset as discussed elsewhere herein.

The region size can vary with embodiment. In at least one embodiment, the smallest allowable region size can correspond to that of a single uncompressed MD page such as 4 KB. In at least one embodiment, the region size can be larger than the size of a single uncompressed MD page. More generally, the region size can be any suitable size. In some instances in at least one embodiment the full contents of the compressed MD page can span across multiple contiguous or consecutive regions such that is may be necessary to read the next subsequent consecutive contiguous region to read the full contents of the desired compressed MD page.

Figure 14:
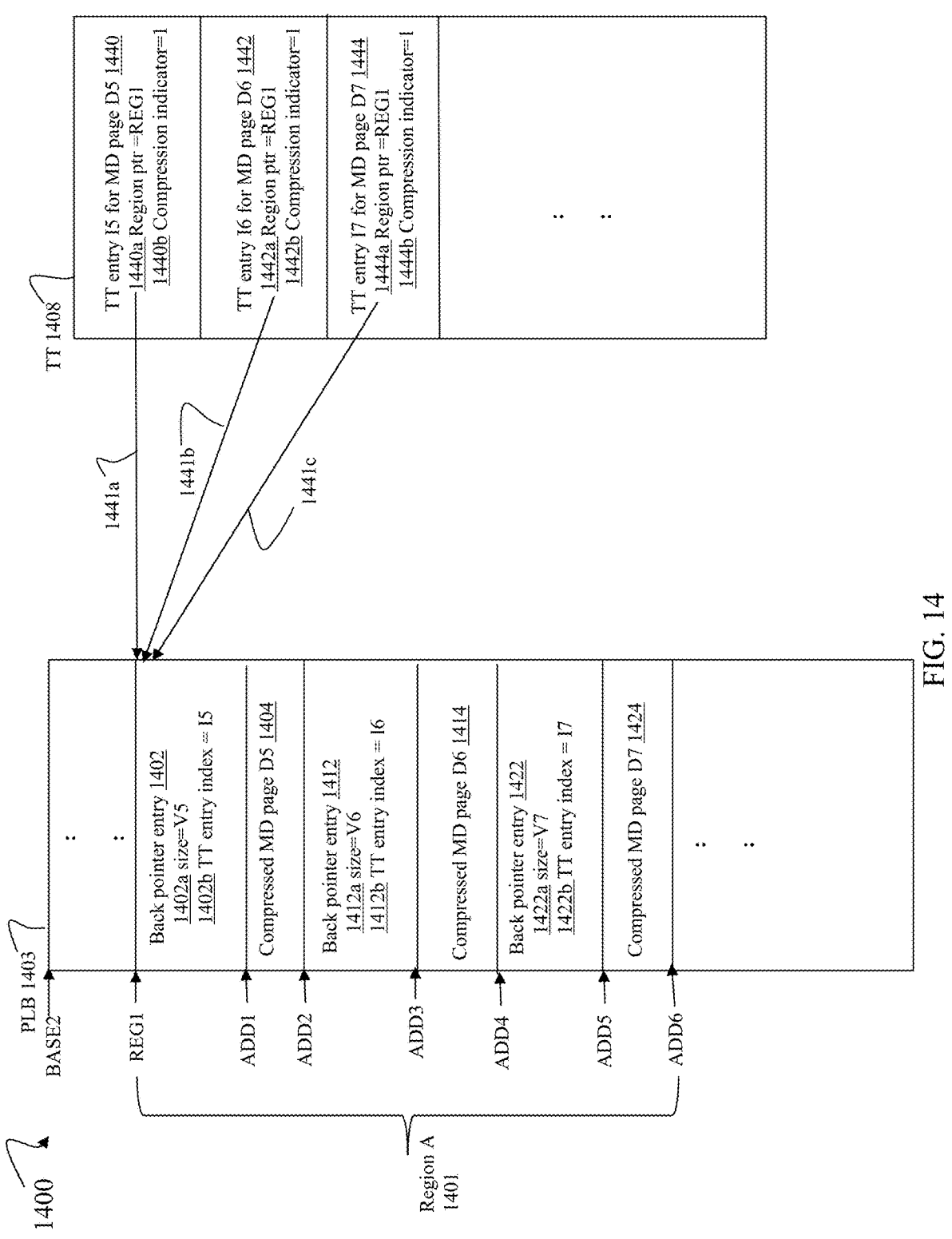

To further illustrate use of regions in at least one embodiment in accordance with the techniques of the present disclosure, reference is made to FIG. 14. Assume for purposes of illustration in connection with the example 1400 of FIG. 14 that the size of a region is 4 KB, the size of a single uncompressed MD page in at least one embodiment.

The example 1400 includes PLB 1403 and TT 1408. In the example 1400, only compressed MD pages and corresponding back pointer entries are stored in the PLB 1403.

The PLB 1403 can include region A 1401 with information for 3 MD pages. In particular, the region 1401 includes 3 back pointer entries 1402, 1412 and 1422 and the corresponding 3 compressed MD pages 1404, 1414 and 1424. Each of the back pointer entries 1402, 1412 and 1422 can include information similar to that as described above (e.g., in connection with FIGS. 12 and 13A).

The back pointer entry 1402 can correspond to the compressed MD page D5 1404 where 1402 includes the following fields: 1402a size=V5 denoting that V5 is the size of the compressed MD page 1404; and 1402b TT entry index or logical address=I5 denoting that I5 is the index of the corresponding TT entry 1440 for the compressed MD page D5 1404. In at least one embodiment, I5 can also be the logical address of the MD page D5 1404, where I5 can generally be mapped to the corresponding TT entry 1440. More generally in at least one embodiment where the value of 1402b is the logical address LA5 of the MD page 1404, LA5 can be mapped, such as by a mathematical function F, to a corresponding TT index, I5, corresponding to the TT entry 1440 (e.g., F(LA5)=TT index of I5), where the TT entry 1440 can be used to perform logical to physical address translation for MD page 1404. Thus generally in at least one embodiment in connection with the foregoing, the logical address LA5 can be equal to the TT entry index I5, or otherwise LA5 can be mapped to its corresponding TT entry index I5. More generally in at least one embodiment, the TT entry index 1402b can be expressed as LA5 that is mapped to the corresponding TT entry index I5.

The back pointer entry 1412 can correspond to the compressed MD page D6 1414 where 1412 includes the following fields: 1412a size=V6 denoting that V6 is the size of the compressed MD page 1414; and 1412b TT entry index=I6 denoting that I6 is the index of the corresponding TT entry 1442 for the compressed MD page D6 1414. In at least one embodiment, I6 can also be the logical address of the MD page D6 1414, where I6 can generally be mapped to the corresponding TT entry 1442. More generally in at least one embodiment where the value of 1412b is the logical address LA6 of the MD page 1414, LA6 can be mapped, such as by a mathematical function F, to a corresponding TT index, I6, corresponding to the TT entry 1442 (e.g., F(LA6)=TT index of I6), where the TT entry 1442 can be used to perform logical to physical address translation for MD page 1414. Thus generally in at least one embodiment in connection with the foregoing, the logical address LA6 can be equal to the TT entry index I6, or otherwise LA6 can be mapped to its corresponding TT entry index I6. More generally in at least one embodiment, the TT entry index 1412b can be expressed as LA6 that is mapped to the corresponding TT entry index I6.

The back pointer entry 1422 can correspond to the compressed MD page D7 1424 where 1422 includes the following fields: 1422a size=V7 denoting that V7 is the size of the compressed MD page 1424; and 1422b TT entry index=I7 denoting that I7 is the index of the corresponding TT entry 1444 for the compressed MD page D7 1424. In at least one embodiment, I7 can also be the logical address of the MD page D7 1424, where I7 can generally be mapped to the corresponding TT entry 1444. More generally in at least one embodiment where the value of 1422b is the logical address LA7 of the MD page 1424, LA7 can be mapped, such as by a mathematical function F, to a corresponding TT index, I7, corresponding to the TT entry 1444 (e.g., F(LA7)=TT index of I7), where the TT entry 1444 can be used to perform logical to physical address translation for MD page 1424. Thus generally in at least one embodiment in connection with the foregoing, the logical address LA7 can be equal to the TT entry index I7, or otherwise LA7 can be mapped to its corresponding TT entry index I7. More generally in at least one embodiment, the TT entry index 1422b can be expressed as LA7 that is mapped to the corresponding TT entry index I7.

In the PLB 1403: REG1 can denote the starting location or physical address of the region 1401 and can also denote the starting location or physical address of the back pointer entry 1402; ADD1 can denote the starting location or physical address of the compressed MD page 1404; ADD2 can denote the starting location or physical address of the back pointer entry 1412; ADD3 can denote the starting location or physical address of the MD page 1414; ADD4 can denote the starting location or physical address of the back pointer entry 1422; and ADD5 can denote the starting location or physical address of the MD page 1424.

The TT 1408 can include TT entries used for mapping logical addresses of MD pages to corresponding physical addresses or locations where such compressed MD pages are stored. In the example 1400, each TT entry of the TT 1408 can include: a region pointer (ptr) or address and a compression indicator. The compression indicator is as discussed above (e.g., in connection with FIGS. 12 and 13A). The region pointer of a TT entry can denote the address or location in a PLB of a region of storage that can be searched to locate a back pointer entry for a compressed MD page corresponding to the TT entry.

The element 1440 represents the TT entry I5 for MD page D5 1404, where the TT entry 1440 includes: i) 1440a region ptr=REG1 denoting that REG1 is the region pointer or address of a region of storage to be searched for locating a back pointer entry of a corresponding MD page 1404, and ii) 1440b compression indicator=1 denoting that the corresponding MD page 1404 of TT entry 1440 is stored in a compressed form in the region.

The element 1442 represents the TT entry I6 for MD page D6 1414, where the TT entry 1442 includes: i) 1442a region ptr=REG1 denoting that REG1 is the region pointer or address of a region of storage to be searched for locating a back pointer entry of a corresponding MD page 1414, and ii) 1442b compression indicator=1 denoting that the corresponding MD page 1414 of TT entry 1442 is stored in a compressed form in the region.

The element 1444 represents the TT entry I7 for MD page D7 1424, where the TT entry 1444 includes: i) 1444a region ptr=REG1 denoting that REG1 is the region pointer or address of a region of storage to be searched for locating a back pointer entry of a corresponding MD page 1424, and ii) 1444b compression indicator=1 denoting that the corresponding MD page 1424 of TT entry 1444 is stored in a compressed form in the region.

Consistent with other discussion herein in at least one embodiment, the region pointer or address such as REG1 of 1440a, 1442a and 1444a can be expressed in any suitable form such as a PLB base address or starting location, BASE2, of the PLB 1403 and an offset within the PLB 1403.

For illustrative purposes, assume that MD page D7 1424 needs to be read or retrieved from PLB 1403 of BE non-volatile storage such as responsive to a read miss for the MD page 1424. In at least one embodiment, the current version of the MD page 1424 can be read from BE non-volatile storage of the LSM in connection with generating an updated version of the MD page 1424 by applying updates corresponding to flushed entries of the MD log. In response processing can be performed using the TT 1408 to read the MD page 1424 from the PLB 1403. Assume that Z1 denotes the fixed size of each back pointer entry.

The logical address LA7 of the MD page 1424 can be mapped to TT index I7 corresponding to the TT entry 1444, where the TT entry 1444 can be used to determine the physical address or location of MD page 1424. The region ptr REG1 can be read from the field 1444a of the TT entry 1444 and used to read the contents of region A 1401 from the PLB 1403. The compression indicator 1444b indicates that the desired MD page 1424 is stored in its compressed form on BE non-volatile storage. Processing can be performed to traverse and search the region A 1401 to locate the compressed MD page D7 1424. Generally, processing can be performed to locate in the region 1401 a back pointer entry with a TT entry index that matches I7, the index of the TT entry corresponding to the desired MD page D7 1424. Once this matching back pointer entry is located, the physical location of desired MD page 1424 in the PLB 1403 can be determined based on the fixed size Z1 of the back pointer entry and the corresponding starting physical address or PLB location of the matching back pointer entry.

The region 1401 begins with back pointer entry 1402 that is the fixed size Z1. The format or layout of the back pointer entries is known and fixed.

Processing includes a first step S1 that compares the value I5 of the TT entry index 1402b of the back pointer entry 1402 to the desired index I7 and determines that I5 (1402b) does not match I7. From the step S1, control proceeds to the step S2.

At the step S2, ADD2, the address of the next consecutively located back pointer entry 1412, can be calculated using REG1, Z1 and V5 (as obtained from 1402a of the back pointer entry 1402. In at least one embodiment, ADD2=REG1+Z1+V5. From the step S2, control proceeds to the step S3.

At the step S3, the value I6 of the TT entry index 1412b of the back pointer entry 1412 is compared to the desired index I7 where it is determined that I6 (1412b) does not match I7. From the step S3, control proceeds to the step S4.

At the step S4, ADD4, the address of the next consecutively located back pointer entry 1422, can be calculated such as using ADD2, Z1 and V6 (as obtained from 1412a of the back pointer entry 1412. In at least one embodiment, ADD4=ADD2+Z1+V6. From the step S4, control proceeds to the step S5.

At the step S5, the value I7 of the TT entry index 1422b of the back pointer entry 1422 is compared to the desired index I7, where it is determined the current TT entry index 1422b=I7 matches the desired index I7 of the corresponding MD page 1424. From the step S5, control proceeds to the step S6.

At the step S6, ADD5, the starting physical location or address of the desired compressed MD page 1424, is calculated such as using ADD4 and Z1. In at least one embodiment, ADD5=ADD4+Z1. V7 denoting the size of the compressed MD page 1424 is located in 1422*a* of the matching back pointer entry 1422.

At the step S7, the compressed MD page 1424 is extracted from the region 1401 where the compressed MD page 1424 has i) a starting address or location ADD5 (as determined in the step S6) and ii) a corresponding size of V7, where V7 can be used to determine the ending PLB offset or location of the corresponding compressed MD page 1424 (e.g., V7 can be used in determining how much of the region 1401 to read when extracting the compressed MD page 1424). In at least one embodiment, the extracted compressed MD page 1424 can be stored in a temporary buffer (e.g., in memory). From the step S7 control proceeds to the step S8.

In the step S8, the extracted compressed MD page 1424 is decompressed to generate an uncompressed form of the MD page 1424. The uncompressed form of the MD page 1424 can be returned to the requester and used in connection with desired processing.

It should be noted that in some cases, i) a compressed MD page can span across multiple consecutive contiguous regions, or ii) the matching back pointer can be located in a first region and the desired compressed MD page can be located a second region that is the next consecutive contiguously located region with respect to the first region. In such cases, the next consecutive contiguously located region can also be read in order to obtain the complete compressed MD page.

It should be noted that FIG. 14 illustrates an example where back pointer entries and compressed MD pages are all stored at consecutive contiguous locations of the PLB without any padding or unused storage. In this manner in at least one embodiment, the example of FIG. 14 can denote a PLB where the region pointer or ptr of TT entries of the TT 1408 can denote exact byte offset locations in the PLB 1403. As yet another variation in at least one embodiment, the region ptr of the TT entries of the TT 1408 can be expressed using a PLB base address and offset, where the offset is based on a larger storage granularity such as segment size that is greater than a single byte. In this latter embodiment, the PLB 1403 can be partitioned into regions based on the region size, where each region can begin on a boundary alignment that is a multiple of the storage granularity of the PLB pointer offset. In this latter embodiment, each region ptr can be expressed using i) a region index denoting a consecutive position of a region; and ii) an offset, where the offset can denote a number of segments. The PLB offset of a region ptr can be calculated as: (region index*region size)+ (offset*segment size).

Figure 15:
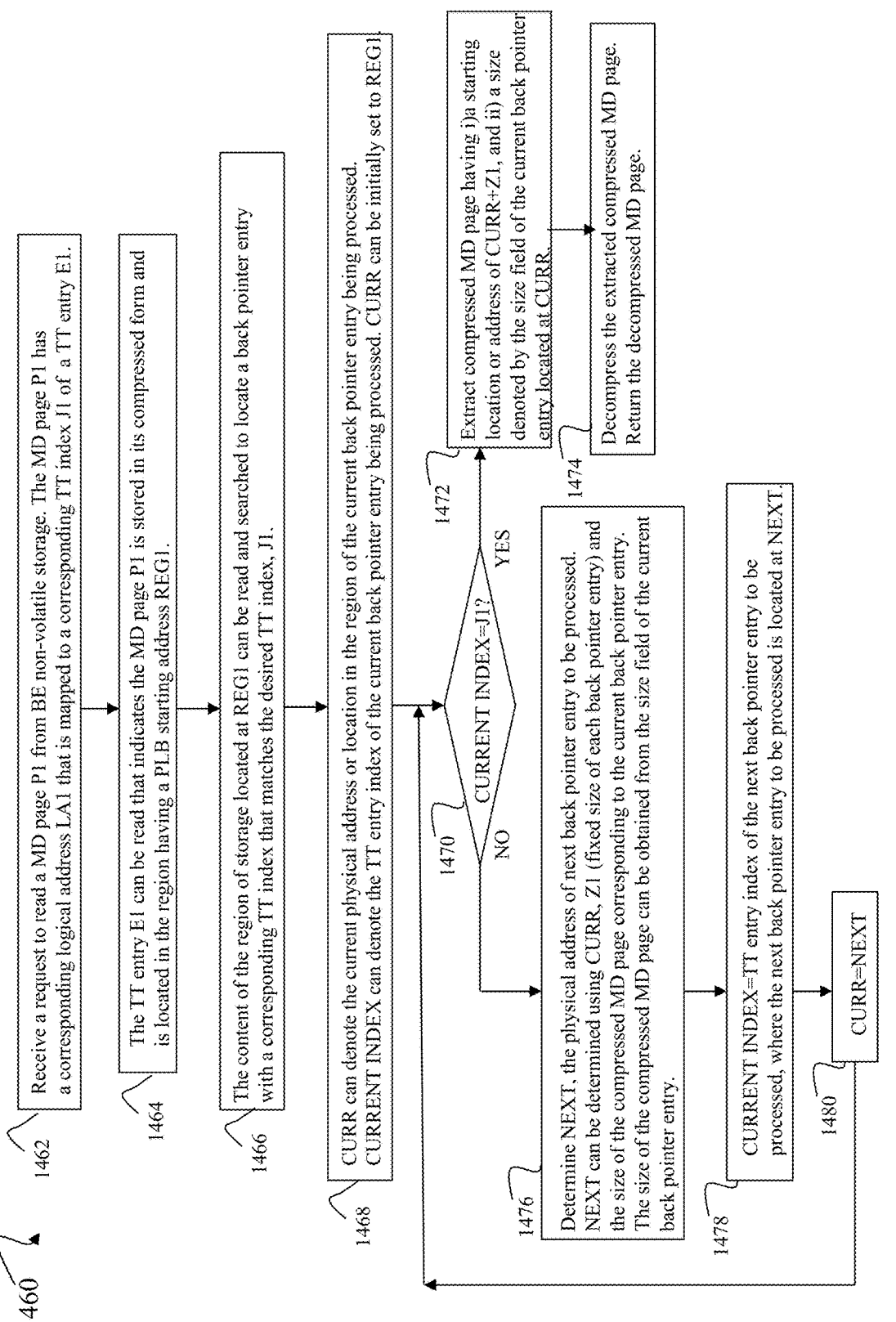

Referring to FIG. 15, shown is a flowchart 1460 of processing steps that can be performed in at least one embodiment in accordance with the techniques of the present disclosure. The steps of 1460 summarize processing as described above in connection with using region pointers in the TT in at least one embodiment. The steps of 1460 summarize and generalize processing such as described above in connection with FIG. 14.

It should be noted that the flowchart 1460 assumes that the region being searched includes the matching back pointer entry.

At the step 1462, a request can be received to read a MD page P1 from BE non-volatile storage. The MD page P1 has a corresponding logical address LA1 that is mapped to a corresponding TT index J1 of a TT entry E1. From the step 1462, control proceeds to the step 1464.

At the step 1464, the TT entry E1 can be read that indicates the MD page P1 is stored in its compressed form and is located in the region having a PLB starting address REG1. From the step 1464, control proceeds to the step 1466.

At the step 1466, the content of the region of storage located at REG1 can be read and searched to locate a back pointer entry with a corresponding TT index that matches the desired TT index, J1. From the step 1466, control proceeds to the step 1468.

At the step 1468, CURR can denote the current physical address or location in the region of the current back pointer entry being processed. CURRENT INDEX can denote the TT entry index of the current back pointer entry being processed. CURR can be initially set to REG1. From the step 1468, control proceeds to the step 1470.

At the step 1470, a determination is made as to whether CURRENT INDEX=J1. If the step 1470 evaluates to yes, control proceeds to the step 1472.

At the step 1472, processing can be performed to extract the desired compressed MD page having i) a starting location or address of CURR+Z1, and ii) a size denoted by the size field of the current back pointer entry located at CURR. In a scenario where the entire compressed MD page is not included in the current region, the next consecutive region can be read and the remaining portion of the compressed MD page can be obtained from the next region. In at least one embodiment, processing can determine that the entire compressed MD page is not located in the current region (having starting address REG1) if (CURR+Z1+the size of the desired compressed MD page)>(REG1+region size), where region size denotes the size of each region. From the step 1472, control proceeds to the step 1474.

At the step 1474, processing can be performed to decompress the extracted compressed MD page, and return the decompressed MD page.

If the step 1470 evaluates to no control proceeds to the step 1476. At the step 1476, processing can determine NEXT, the physical address of next back pointer entry to be processed. NEXT can be determined using CURR, Z1 (fixed size of each back pointer entry) and the size of the compressed MD page corresponding to the current back pointer entry. In at least one embodiment, the size of the compressed MD page can be obtained from the size field of the current back pointer entry. From the step 1476, control proceeds to the step 1478.

At the step 1478, CURRENT INDEX is assigned the TT entry index of the next back pointer entry to be processed, where the next back pointer entry to be processed is located at NEXT. From the step 1478, control proceeds to the step 1480.

At the step 1480, CURR is assigned to NEXT. From the step 1480, control proceeds to the step 1470.

To support compression in at least one embodiment where an entire MD PLB can be written out to the MD tier of BE non-volatile storage in a single write, a MD page stored in the MD PLB can first be compressed and then evaluated as to whether the entire compressed MD page can fit into the MD PLB. If not in at least one embodiment, the compressed MD page can span across multiple PLBs such that a first portion of the compressed MD page can be stored in one PLB and a remaining portion of the compressed MD page can be stored in a different PLB. When determining whether compressed MD pages fit into a PLB, the size of the uncompressed corresponding back pointer entries is also considered as well as any padding, if needed to ensure segment alignment.

In at least one embodiment, the types of MD PLBs supported can include two types of MD PLBs. A first type can be "compressed" denoting a MD PLB used for storing only compressed MD pages and corresponding uncompressed back pointer entries. A second type can be an "uncompressed" denoting a MD PLB used for storing only uncompressed MD pages along with any corresponding information needed or desired.

In at least one embodiment, the compressed type of MD PLB can have a format and layout as discussed above (e.g., FIGS. 12, 13A, 14) and also represented below in connection with FIG. 16.

In at least one embodiment, the uncompressed type of MD PLB can have a format and layout as mentioned above and also represented in more detail below in connection with FIG. 16.

In at least one embodiment, each MD PLB can have a corresponding PLB descriptor that describes or includes characteristics about the corresponding MD PLB.

Figure 16:
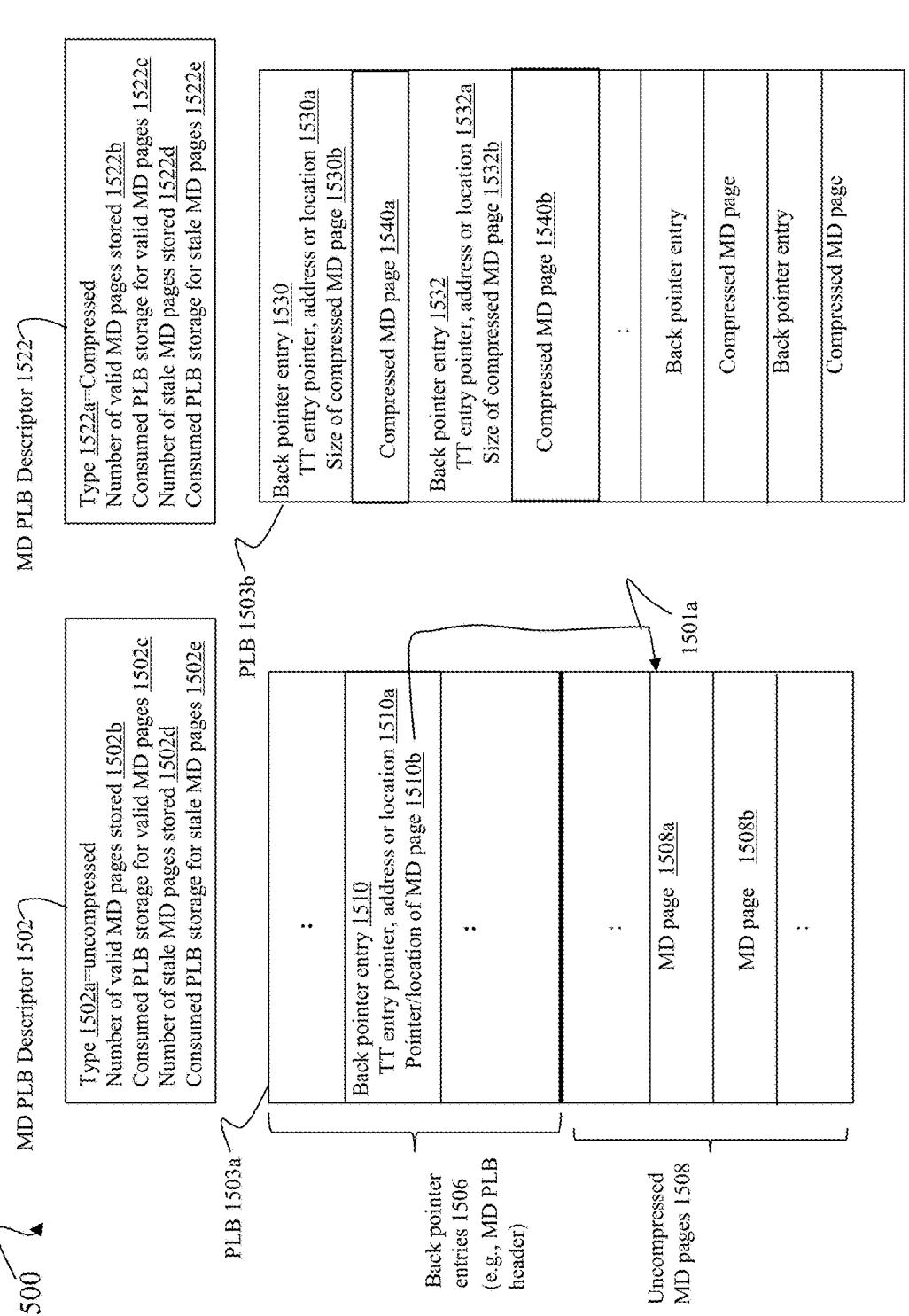

Referring to FIG. 16, shown is an example of corresponding layouts of MD PLBs and corresponding PLB descriptors in at least one embodiment in accordance with the techniques of the present disclosure.

The example 1500 includes MD PLB descriptors 1502, 1522 and MD PLBs 1503a-b. The MD PLB descriptor 1502 includes information about MD PLB 1503a. The MD PLB descriptor 1522 includes information about MD PLB 1503b.

In at least one embodiment, each MD PLB descriptor can include the following fields of information: type (denoting the type of the corresponding MD PLB), number of valid MD pages stored in the PLB, number of stale or invalid MD pages stored in the PLB, consumed PLB storage for storing the valid MD pages and consumed PLB storage for storing the stale or invalid MD pages.

The MD PLB descriptor 1502 includes information regarding the uncompressed MD PLB 1503a. The MD PLB descriptor 1502 includes: type 1502a identifying the uncompressed MD PLB type, 1502b identifying the number of valid MD pages stored in the PLB 1503a, 1502c identifying the amount of storage of PLB 1503a consumed for storing valid MD pages, 1502d identifying the number of invalid or stale MD pages stored in the PLB 1503a, and 1502e identifying the amount of storage of PLB 1503a consumed for storing stale or invalid MD pages. Consistent with other discussion herein, values of 1502b-e can be accordingly updated as new MD pages are stored in the PLB 1503a; and as existing versions of MD pages stored in PLB 1503a are updated where the updated version is stored in another PLB such that the existing version in the PLB 1503a now denotes invalid or stale content. In particular, as each new MD page is written to PLB 1503a, values of 1502b-c can be accordingly updated; and as each existing MD page of 1503a is updated so that the existing version stored in PLB 1503a denotes invalid or stale content, values of 1502c-d can be accordingly updated.

The format or layout of the elements of the uncompressed MD PLB 1503a can denote consecutive contiguous storage areas of the PLB 1503a. The PLB 1503a can include back pointer entries 1506 and uncompressed MD pages 1508. The entries 1506 can more generally be included in the fixed PLB header discussed elsewhere herein. Each back pointer entry of 1506 can correspond to a single uncompressed MD page stored in area 1508. The content of 1506 and 1508 can be uncompressed. The size of each back pointer entry of 1506 can be fixed such that each such back pointer entry of 1506 is the same size. The size of each uncompressed MD page of 1508 can be fixed such that each such MD page of 1508 is the same size (e.g., such as 4 KB). To further illustrate, back pointer entry 1510 for an uncompressed MD page of 1508 can include a TT entry pointer, address or location 1510a and a pointer, location or address of the corresponding MD pages 1508a as stored in the PLB 1503a. Other entries of 1506 can include information similar to entry 1510. The field 1510a, TT entry pointer, address or location, can identify a corresponding TT entry used to map the logical address of the associated MD pages 1508a to its current physical address or location in a PLB. In at least one embodiment, the field 1510a can include the TT entry index or logical address of the corresponding MD page used to perform the foregoing mapping. The field 1510a is similar to fields other back pointer entries described herein such as in connection with compressed type MD PLBs. For example, field 1510a is similar to 1310c, 1312c of FIGS. 12 and 1402b, 1412b and 1422b of FIG. 14.

The MD PLB descriptor 1522 includes information regarding the uncompressed MD PLB 1503b. The MD PLB descriptor 1522 includes: type 1522a identifying the compressed MD PLB type, 1522b identifying the number of valid MD pages stored in the PLB 1503b, 1522c identifying the amount of storage of PLB 1503b consumed for storing valid MD pages, 1522d identifying the number of invalid or stale MD pages stored in the PLB 1503b, and 1522e identifying the amount of storage of PLB 1503b consumed for storing stale or invalid MD pages. Consistent with other discussion herein, values of 1522b-e can be accordingly updated as new MD pages are stored in the PLB 1503b; and as existing versions of MD pages stored in PLB 1503b are updated where the updated version is stored in another PLB such that the existing version in the PLB 1503b now denotes invalid or stale content. In particular, as each new MD page is written to PLB 1503b, values of 1522b-c can be accordingly updated; and as each existing MD page of 1503b is updated so that the existing version stored in PLB 1503b denotes invalid or stale content, values of 1522c-d can be accordingly updated.

The format or layout of the elements of the compressed MD PLB 1503b is similar to that described above, for example, in connection with FIGS. 12 and 14. More generally, compressed type MD PLBs can also have any of the other formats or layouts described herein such as also described in connection with FIG. 13A. In at least one embodiment consistent with FIGS. 12 and 14, the format or layout of the elements of the MD PLB 1503b can denote consecutive contiguous storage areas. The PLB 1503b can include an interleaved arrangement of back pointer entries and corresponding MD pages. In particular, the back pointer entry for a compressed MD page can immediately precede its corresponding compressed MD page in the PLB. For example, the back pointer entry 1530 describes the associated compressed MD page 1540a; and the back pointer entry 1532 describes the associated compressed MD page 1540b. In at least one embodiment, the interleaved back pointer entries and compressed MD pages of the PLB 1503b can be contiguously stored in the PLB 1503b. Although not explicitly illustrated in FIG. 16, as a variation in at least one embodiment such as described above with FIG. 13A, there can be padding of unused storage between a compressed MD page and the next consecutive back pointer entry of another compressed MD page if needed to align the next back pointer entry on a particular storage boundary based on the particular storage granularity used in connection with pointers or addresses of TT entries.

Each back pointer entry of the compressed type PLB 1503b can be stored uncompressed and can be a fixed size. The size of each compressed MD page of the PLB 1503b can vary with achieved compression.

Each back pointer entry of the PLB 1503b can include information as described, for example, in connection with FIGS. 12, 13A and 14. Each back pointer entry of the PLB 1503b can include: a TT entry, pointer or location and a size of the corresponding compressed MD page. For example, the back pointer entry 1530 can include: i) a TT entry, address or pointer 1530a identifying the corresponding TT entry for the associated MD page 1540a; and ii) the size of the corresponding compressed MD page 1540a; and the back pointer entry 1532 can include: i) a TT entry, address or pointer 1532a identifying the corresponding TT entry for the associated MD page 1540b; and ii) the size of the corresponding compressed MD page 1540b. The field 1532a can be similar, for example, to field 1510a.

In at least one embodiment, a MD page can be characterized as uncompressible if compressing the page does not achieve, or is not expected to achieve, at least a threshold amount of reduction or at least a threshold compression ratio as a result of compression. In at least one embodiment, any MD page characterized as uncompressible can be stored in a MD PLB of type uncompressed rather than compressed. In at least one embodiment, such a determination of whether a MD page is compressible or uncompressible can be performed, for example, when writing out an updated MD page to BE non-volatile storage as result of flushing MD log entries and applying one or more corresponding updates to the MD page. As a result of the foregoing determination, a decision can be made as to whether to store the MD page in the compressed type MD PLB 1503a or the uncompressed type MD PLB 1503b.

Throughout the lifecycle of each MD page where updated versions of the MD page are continually stored over time and written out to new or various PLB locations, processing can be performed to decide whether to persist an updated version of the MD page in a compressed type of MD PLB or an uncompressed type of MD PLB.

In at least one embodiment, updated versions of MD pages can be initially written as uncompressed into a temporary staging area. Subsequently, the MD pages of the staging area can be further evaluated to determine which of the MD pages should be compressed and stored in a compressed type of MD PLB such as the PLB 1503b, and which of the MD pages should remain uncompressed and stored in an uncompressed type of MD PLB such as the PLB 1503a.

As a variation in at least one embodiment, updated versions of MD pages can be initially written as into a temporary staging area as noted above. In this variation, the MD page can be evaluated for potential compression as part of processing when rewriting to the staging area. If it is determined that a MD page should be compressed, the MD page is compressed and stored in its compressed from in the staging area. Subsequently, the compressed MD page can be written from the staging area to a compressed type MD PLB such as 1503b. Otherwise, if it is determined the MD should not be compressed, the uncompressed form of the MD page can be written to a staging area and then written from the staging area to an uncompressed type MD PLB such as 1503a. In at least one embodiment the MD page can be written into a staging area used a temporary location to accumulate a sufficient number of MD pages to be stored in a PLB Once the sufficient number is accumulated in the staging area, the content of the staging area can be written to a PLB of BE non-volatile storage.

Figure 17A:
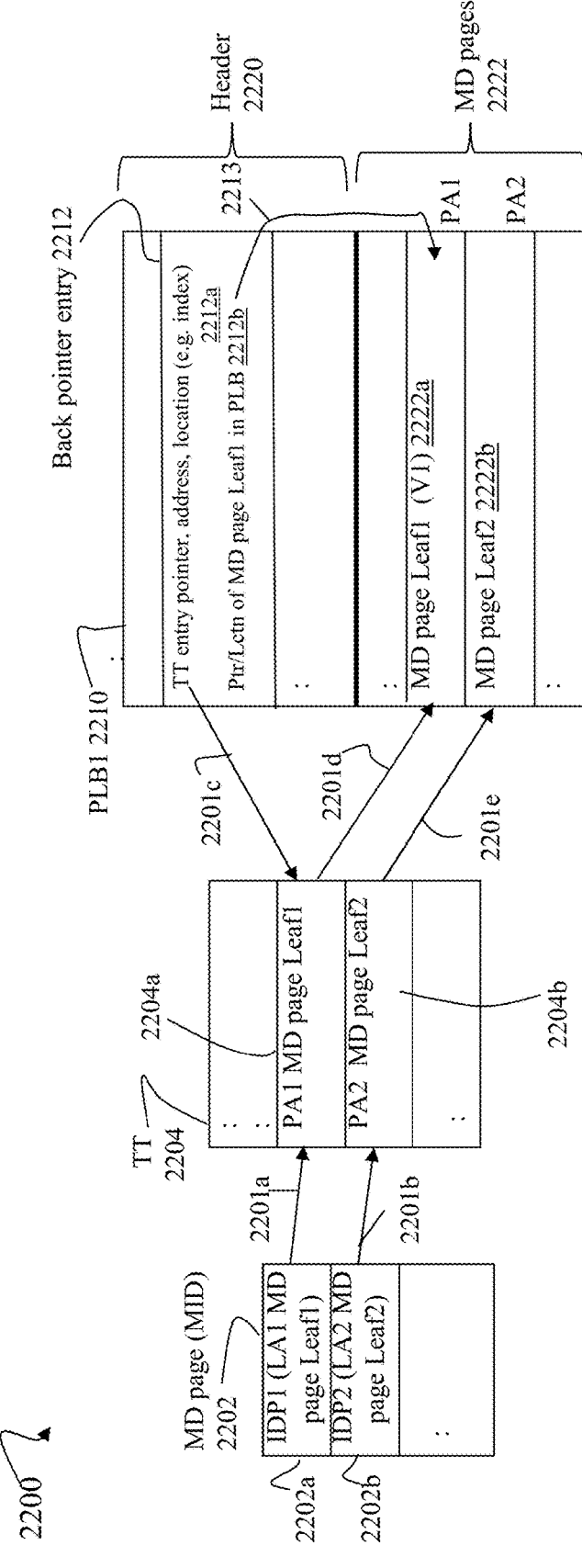
Figure 17B:
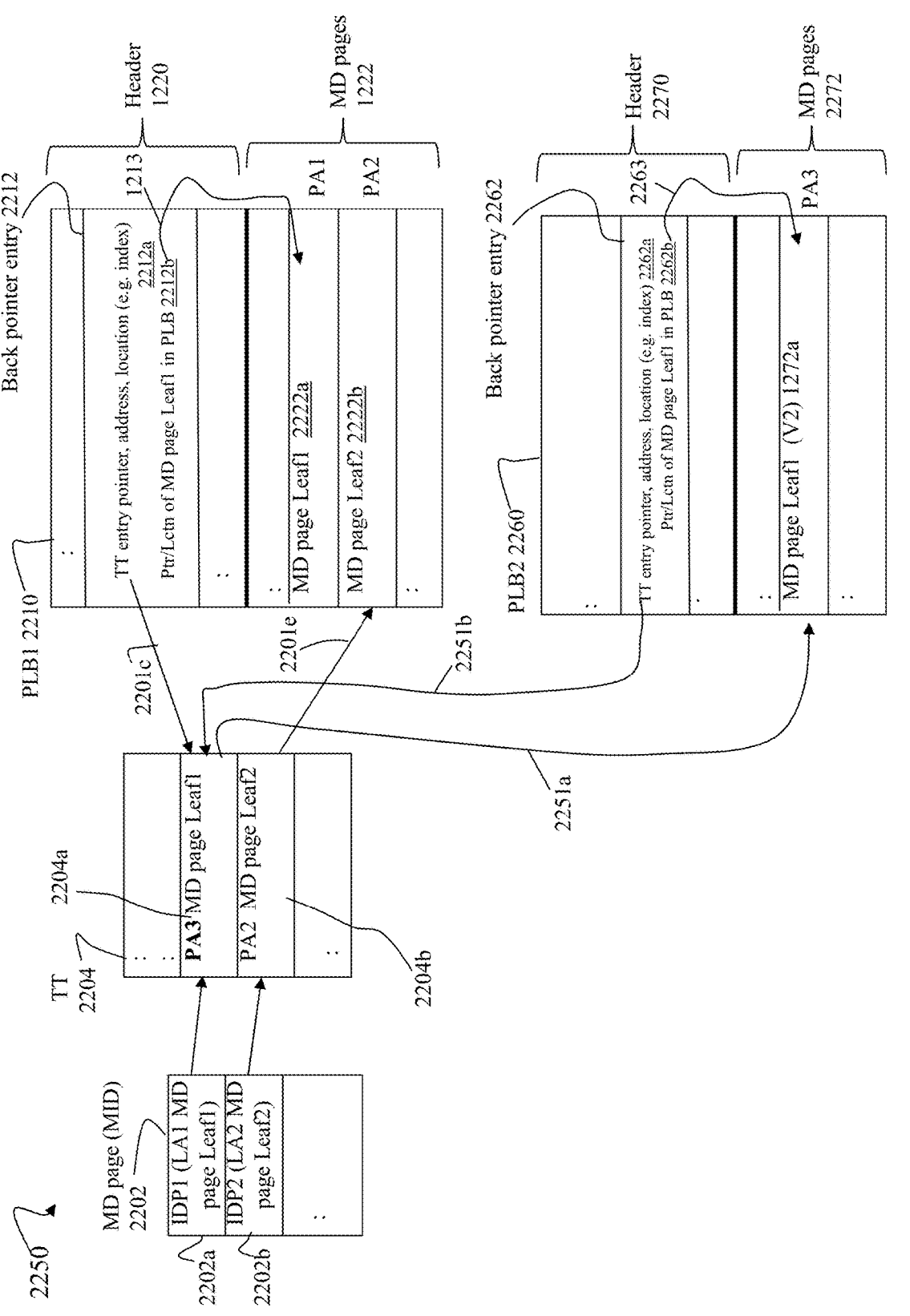

Referring to FIGS. 17A and 17B, shown is an example illustrating TT entries used in connection with an uncompressed type PLB in at least one embodiment in accordance with the techniques of the present disclosure.

Referring to FIG. 17A, shown is an example 2200 providing further detail regarding a TT (translation table) in at least one embodiment in accordance with the techniques of the present disclosure. The example 2200 illustrates use of a TT that, as noted elsewhere herein in at least one embodiment, can be used to map or translate logical addresses of MD pages to their corresponding physical storage locations or addresses where the MD pages are stored in an uncompressed form in an uncompressed type PLB.

In at least one embodiment, logical addresses of MD pages including top, mid and leaf MD pages and VLB pages can map to a mapping entry or index in the TT. Each mapping entry of the TT can specify the current physical address or location of an uncompressed MD page within an uncompressed type of PLB in the LSM of the MD tier included in BE non-volatile storage.

As described elsewhere herein, for example, such as in connection with FIGS. 3, 4, and 5, a first MD page, such as a MD MID page, can include multiple entries where each such entry can include a pointer, address, reference, offset, or index to a MD leaf page. In at least one embodiment in accordance with the techniques of the present disclosure, the entry of the MD MID page can generally include a logical address LA of a MD leaf page that is mapped or translated by the TT 2204 to the physical storage location or address PA of the MD leaf page as stored in a PLB.

The example 2200 includes the MD MID page 2202, TT 2204, and PLB 1 2210. The PLB 1 2210 can be included in the MD log structure or LSM of the MD tier included in BE non-volatile storage. The MD MID page 2202 can include entries each storing a logical address LA of a MD leaf page. In at least one embodiment, the LA of the MD leaf page can be mapped to a corresponding entry E1 in the TT 1204, where E1 further maps the LA of the MD leaf page to the physical storage location or address PA of the MD leaf page in the PLB 2210. In at least one embodiment, the LA of the MD leaf page can be used as an IDP or indirect pointer or address to the physical location or address PA of the MD leaf page. In at least one embodiment, the LA of the MD leaf page can be an index, offset or location of the mapping entry E1 of the TT 2204 that maps LA to its corresponding PA storing the MD leaf page.

In the example 2200, the MD MID page 2202 includes entry 2202a with IDP1 that can denote the logical address LA1 of MD page Leaf1; and includes entry 2202b with IDP2 that can denote the logical address LA2 of MD page Leaf2. IDP1 or LA1 of entry 2202a can point, reference or map (2201a) to the entry 2204a of the TT 1204, and IDP2 or LA2 of entry 2202b can point, reference or map (2201b) to the entry 2204b of the TT 1204. In at least one embodiment, the IDP1 or LA1 of entry 2202a can be the index or offset I1 of the mapping entry 2204a of the TT 2204; and the IDP2 or LA2 of the entry 2202b can be index or offset 12 of the mapping entry 2204b of the TT 1204.

In at least one embodiment, each TT entry of the TT 2204 corresponding to an uncompressed MD page can include the current physical location or address of the uncompressed MD page as stored in a PLB. Other information can be included in the TT entries of 2204 such as discussed elsewhere herein but is omitted for simplicity. In the example 2200, the entry 2204a of TT 1204 includes the physical address or location PA1 of the MD page Leaf1 as stored in the PLB 2210. The entry 2204*b* of the TT 1204 includes the physical address or location PA2 of the MD page Leaf2 as stored in the PLB 2210.

It should be noted that the example 2200 includes back pointer entry 2212 illustrated for MD page Leaf1 2222*a*. In this example although not specifically illustrated, the header 2220 also includes a second back pointer entry for MD page leaf2 2222*b* similar to element 2212. For example, the foregoing second back pointer entry of 2220 corresponding to the MD page leaf2 2222*b* includes a second TT entry pointer or address to 1204*b*, and also a second pointer to the MD page leaf2 2222*b* within the MD pages 2222.

The TT entry 1204*a* includes PA1 that can be the physical address or location in the PLB 2210 of MD page leaf 1 2222*a*. Generally, PA1 of the entry 2204*a* can directly point to or reference (2201*d*) the physical storage location of MD page leaf1 2222*a*.

The TT entry 1204*b* includes PA2 that can be the physical address or location in the PLB 2210 of MD page leaf 2 2222*b*. Generally, PA2 of the entry 2204*b* can directly point to or reference (2201*e*) the physical storage location of MD page leaf2 2222*b*.

It should be noted that although in at least one embodiment, the logical address LA of a MD page can directly point to its corresponding mapping entry of the TT 2204, more generally the LA of a MD page can be mapped to its corresponding TT entry of the TT 2204.

The PLB 2210 can be included in the MD tier of LSM or log structured MD persistent storage. The PLB 2210 can be an uncompressed type PLB such as PLB 1503*a* of FIG. 16. The PLB 2210 can include a header 2220 and MD pages 2222. The header 2220 can include back pointer entries for each uncompressed MD page stored in PLB 2210. The header 2220 and MD pages 2222 can be respectively similar to elements 1506 and 1508 of FIG. 16. The header 2220 can similarly include a back pointer entry similar to 2212 for each of the MD pages, such as MD page leaf2 2222*b*, stored in the PLB 2210. The back pointer entry 2212 for the MD leaf page 1 2222*a* can include fields 2212*a-b*. The field 2212*a* can be a TT entry pointer 1212*a* that denotes a pointer, address or location of the mapping TT entry 2204*a* of the TT 1204 corresponding to the MD leaf page 1 2222*a*. The TT entry pointer 2212*a* can point to (2201*c*) the mapping entry 2204*a* of the TT 2204, where the entry 2204*a* is used in mapping the logical address IDP1/LA1 of MD leaf page 1 to its current physical address or location PAL. The field 2212*b* can point to or reference (2213) the physical storage location PA1 of the current version V1 of the MD page leaf1 2222*a* as stored in the PLB 2210. The field 2212*b* can be a pointer, address or location of the MD page leaf1 2222*a* as stored at PA1 in the PLB 2210.

When updates to a MD page are flushed from the MD log, such updates can be applied to a current version V1 of the MD page as persistently stored in the MD log structure to generate an updated version V2 of the MD page. In accordance with an LSS, the updated version V2 of the MD page can then be persistently stored as the most recent copy of the MD page of the MD log structure, where the updated version V2 of the MD page can be stored at a new physical storage location or address that is different from the existing physical storage location or address of V1 of the MD page. Thus, as a MD page is updated and then persistently stored as part of flushing or destaging the MD log, the physical storage location or address of the MD page will change and the changed physical storage location or address can be noted in the appropriate TT entry. In at least one embodiment, the logical addresses of the MD pages (e.g., top, mid leaf and VLB MD pages) can remain the same even though the physical storage locations or addresses of such pages as stored in on BE non-volatile storage can change each time an updated version of the page is written.

The example 2200 illustrates a state of the various structures at a first point in time T1 when MD page leaf 1 is denoted as having a current version V1 stored in the PLB 2210. At a second point in time T2 subsequent to T1, MD page leaf 1 V1 can be updated to subsequent current version V2, where the updated version V2 of MD page leaf1 can be written to a new physical address or location, PA3, of another PLB, PLB2 as illustrated in the example 2250 of FIG. 17B. MD page leaf 1 V1 can be updated to the current version V2 as a result of flushing or destaging a set of MD updates from the MD log and applying those aggregated updates to V1 of MD page leaf1. Thus the example 2250 can illustrate the state of the system at time T2 after such updates are applied to MD page leaf1 V1 to generate MD page leaf1 V2 that is stored at a new physical address or location PA3.

The example 2250 includes structures similarly numbered as in the example 2200 with differences discussed in more detail below. As noted above, the MD page leaf1 can be updated to V2 that is stored at PA3 of PLB2 2260. In response to storing the most current version V2 of MD page leaf1 at the new location PA3, the corresponding mapping entry 2204*a* of the MD TT 2204 can be updated to point to (2251*a*) or reference the new location PA3 rather than the prior location PA1 storing the prior version V1 of MD page leaf1.

The PLB2 2260 can include a header 2270 and MD pages 2272. The header 2270 can include back pointer entries for each MD page stored in the PLB 2260. In this example 2250, the header 2270 can include back pointer entry 2262 for the MD page leaf 1 (V2) 2272*a* stored at PA3 of the PLB 2260. The back pointer entry 2262 can include fields 2262*a-b*. The field 2262*a* can include a TT entry pointer that denotes a pointer, address or location of the mapping entry 2204*a* of the TT corresponding to the MD leaf page 1 2272*a*. The TT entry pointer 2262*a* can point to (2251*b*) the mapping entry 2204*a* of the TT 1204, where the entry 2204*a* is used in mapping the logical address IDP1/LA1 of MD leaf page 1 to its current physical address or location PA3. The field 2262*b* can point to or reference (2263) the physical storage location PA3 of the current version V2 of the MD page leaf1 2272*a* as stored in the PLB 2260. The field 2262*b* can be a pointer, address or location of the current version V1 of the MD page leaf1 2272*a* as stored at PA3 in the PLB Referring back to the examples 2200 and 2250, the TT 2204 can denote a current version of the MD TT 2204 as stored in memory, such as volatile memory of a cache. Consistent with other discussion herein, flushing updates from the MD log that update MD page leaf1 from V1 to V2 and result in storing MD page leaf1 V2 at the new current physical address or location PA3 also trigger a corresponding update to the MD TT.

In at least one embodiment supporting multiple types of PLBs including any of the above-noted uncompressed and compressed PLB types and/or the hybrid type discussed below, the one or more TTs used can include TT entries used to access both compressed MD pages and uncompressed MD pages.

In at least one embodiment, the term location information can more generally be used to collectively refer to i) region pointers or addresses (e.g., as used in FIG. 14) of TT entries and ii) direct location pointers or addresses (e.g., as used in FIGS. 12 and 13A) of TT entries.

In at least one embodiment, each TT entry mapping a logical address LA of a corresponding MD page PG to the physical address or location PA where the current version of the MD page PG is stored on BE non-volatile storage can include i) location information used to read PG from PA1 and ii) a compression indicator such as described elsewhere herein in connection with TT entries (e.g., FIGS. 12, 13A, 14) that indicates whether the corresponding MD page PG is compressed or uncompressed.

In at least one embodiment, direct location pointers or addresses of TT entries can be used in connection with both compressed and uncompressed type PLBs. In such an embodiment, the TT entry associated with the MD page can include a compression indicator denoting whether the MD page is compressed or uncompressed. In at least one embodiment, if the compression indicator indicates the MD is compressed, i) the MD page can be stored in its compressed form in a compressed type PLB having one of the layouts or formats as discussed elsewhere herein and ii) the TT entry associated with the MD page can include a direct location that references or points to the corresponding back pointer entry of the MD page. Generally, the back pointer entry can be read and used to determine the physical address or location of the compressed MD page as stored in the PLB and obtain the MD page such as described in connection with FIGS. 12, 13A and/or 13B. In at least one embodiment, if the compression indicator indicates the MD is uncompressed, i) the MD page can be stored in its uncompressed form in an uncompressed type PLB having a layout or format as discussed elsewhere herein and ii) the TT entry associated with the MD page can include a direct location that references or points to the physical address or location of the uncompressed MD page of the PLB. If the TT entry indicates the MD page is uncompressed and thus stored in an uncompressed type PLB such as 1503a of FIG. 16, the direct location of the TT entry can denote the starting address or offset of the MD page. Since each uncompressed MD page in at least one embodiment is a same fixed size such as 4 KB, the ending offset or location of the MD page can be determined by adding 4 KB to the starting address or offset. Processing can then read the uncompressed MD page from the PLB based on the starting address and ending address.

In at least one embodiment, region pointers or addresses of TT entries can be used in connection with both compressed and uncompressed type PLBs. In such an embodiment, the TT entry associated with a MD page can include a region pointer or address to a defined region of PLB storage. In such an embodiment, the TT entry associated with the MD page can include a compression indicator denoting whether the MD page is compressed or uncompressed. In at least one embodiment, if the compression indicator indicates the MD is compressed, i) the MD page can be stored in its compressed form in a compressed type PLB having one of the layouts or formats as discussed elsewhere herein; and ii) the region pointer can point to a region of storage that includes the corresponding back pointer entry of the MD page. Generally for compressed MD pages in at least one embodiment, the region of PLB storage can be searched to locate a corresponding back pointer entry with a first logical address or first TT entry index matching the particular logical address or index of the TT entry of the desired MD page where the matching back pointer entry can then be used to determine the physical address or location of the compressed MD page as stored in the PLB and obtain the MD page such as described in connection with FIGS. 14 and 15. In at least one embodiment using region pointers, it may be needed to read more than one region to obtain the entire compressed MD page depending on the size of the region and, such as with compressed MD pages, whether the entire compressed MD page is included in a single region or spans across more than a single region.

In at least one embodiment using region pointers, if the compression indicator indicates the MD is uncompressed, i) the MD page can be stored in its uncompressed form in an uncompressed type PLB having a layout or format as discussed elsewhere herein; and ii) the region pointer can point to a region of storage that includes the corresponding uncompressed MD page. Generally for uncompressed MD pages in at least one embodiment, the region of PLB storage can be searched to locate the corresponding MD page. The region pointer can point to the start of an uncompressed MD page where each uncompressed MD page of the region. In at least one embodiment, the region size can equal to the size of a single uncompressed MD page such that the region pointer when used with an uncompressed MD page actually denotes the direct location of the uncompressed MD page so that no searching is actually performed. As a variation in at least one embodiment, the region size can be equal to the size of multiple uncompressed MD pages such that the region can be searched to locate the desired MD page, where each such MD page is the same fixed size. In this latter embodiment, each uncompressed MD page as stored in the PLB can include a self identifier (ID) encoded in the persisted MD page of the PLB. In at least one embodiment, the self identifier can generally be any suitable information that can be used to uniquely identify each particular MD page. In at least one embodiment, the self identifier of the MD page can be the logical address LA of the MD page or the TT index of the MD page. In at least one embodiment, the self identifier can be included as a value in a field of the uncompressed MD page as stored in the PLB. In this latter embodiment, the region can be searched to locate a stored MD page having a self identifier that matches the corresponding LA or index of the desired MD page. Since each uncompressed MD page in at least one embodiment is a same fixed size such as 4 KB, the ending offset or location of the MD page can be determined by adding 4 KB to the starting address or offset. Processing can then read the MD page from the PLB based on the starting address and ending address. As yet another variation in connection with uncompressed MD pages of uncompressed type PLBs, the region pointer can point to a region that includes back pointer entries of uncompressed MD pages. In this yet further variation, the region pointer can point to the start of a back pointer entry. The region can be searched to locate a corresponding back pointer entry (e.g., 1510) including a first logical address or first TT entry index (e.g., as in field 1510a) matching the particular logical address or index of the TT entry of the desired MD page, where the MD page pointer or location field (e.g., 1510b of FIG. 16) of matching back pointer entry can then be used to determine the physical address or location of the uncompressed MD page as stored in the PLB and obtain the uncompressed MD page.

In at least one embodiment, i) region pointers or addresses of TT entries can be used in connection with compressed type PLBs and ii) direct locations of TT entries can be used in connection with uncompressed type PLBs. In such an embodiment, the compression indicator of the TT entry can be examined to determine whether the location information (e.g., PLB pointer, address or location referenced or denoted by the location information) of the TT entry denotes a region pointer or direct location. If the compression indicator of the TT entry indicates the corresponding MD page is compressed, then the location information of the TT entry can denote a region pointer where processing can be performed, for example, such as described in connection with FIGS. 14 and 15. If the compression indicator of the TT entry indicates the corresponding MD page is uncompressed, then the location information of the TT entry can denote a direct location of where the uncompressed MD page is stored in the PLB, where the direct location denotes the starting address or location of the uncompressed MD page.

What will now be described is an additional PLB type of hybrid that can be supported and used in at least one embodiment in accordance with the techniques of the present disclosure.

Generally, hybrid can be an additional PLB type in addition to any one or more other supported PLB types such as uncompressed and compressed as discussed above, for example, in connection with FIG. 16. In at least one embodiment, a hybrid PLB can have a corresponding PLB descriptor similar to 1502 and 1522 of FIG. 16 with the difference that the type field (1502a, 1522a) denotes the PLB type is hybrid.

In at least one embodiment, each MD page when in its uncompressed form can include or have embedded as a first field a corresponding page type identifier or ID having a value denoting the particular page type of the MD page. In at least one embodiment, there can be a defined set of page types including metadata page types. For example in at least one embodiment, the defined set of page types can include 4 types for 4 different metadata page types allowable and supported including: top, mid, leaf and VLB. In such an embodiment, each uncompressed MD page can include or encode its corresponding page type in the page type ID field of the MD page.

Figure 18:
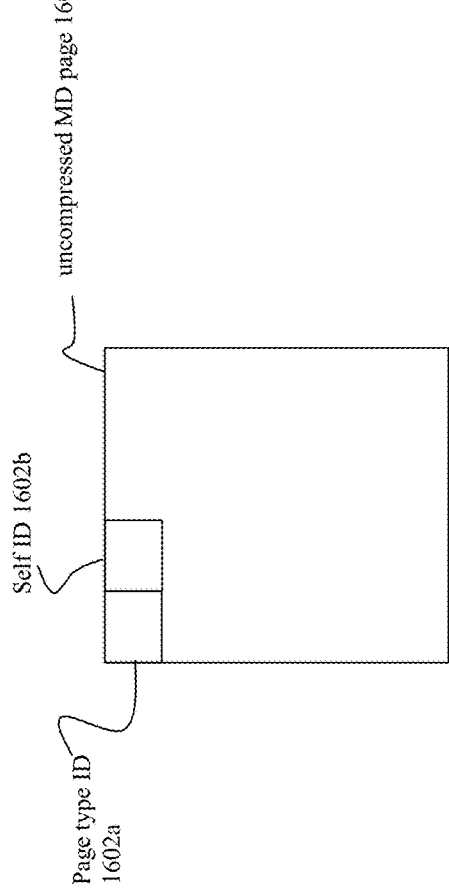
Figure 18:
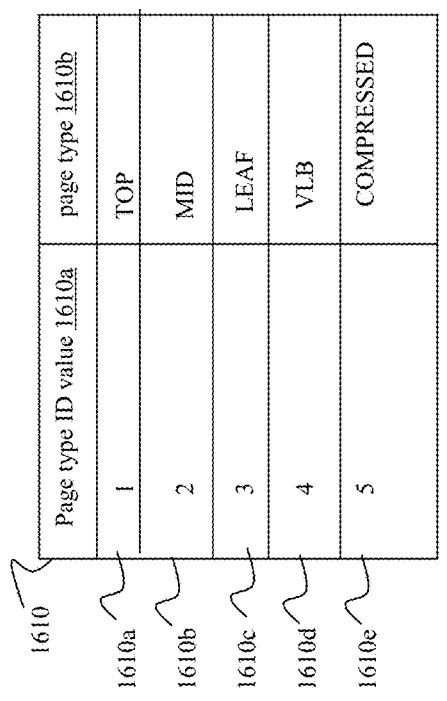

For example with reference to FIG. 18, shown is an example 1600 illustrating a format or layout of an uncompressed MD page 1602 and corresponding page types in at least one embodiment in accordance with the techniques of the present disclosure.

Element 1602 can denote the layout of an uncompressed MD page that includes a page type ID field 1602a. In at least one embodiment, the MD page 1602 can also include a self ID field 1602b.

In at least one embodiment, the self ID field 1602b can include the self identifier or ID of the MD page 1602. As discussed elsewhere, the self ID of a MD page can be, for example, the logical address of the MD page or the TT entry index uniquely identifying the MD page 1602's corresponding TT entry used to map the logical address of the MD page to its corresponding physical address or location on BE non-volatile storage. As discussed below in at least one embodiment, the field 1602a can be located as the first or initial field position of each MD page 1602. In at least one embodiment, the field 1602b can generally be located at any suitable known or fixed position in each MD page 1602.

Assume for illustration purposes that a page type ID of 1 denotes a MD top page. In this case, all uncompressed MD top pages can include a value of 1 in field 1602a of the pages. Assume for illustration purposes that a page type ID of 2 denotes a MD mid page. In this case, all uncompressed MD mid pages can include a value of 2 in field 1602a of the pages.

In at least one embodiment, the page type ID field 1602a can be located at the initial starting first position of the MD page 1602 when 1602 is uncompressed. For example if the page type ID field 1602a is 3 bits in size, then the initial first 3 bits of each uncompressed MD page can encode a value denoting the particular page type ID of the uncompressed MD page 1602.

In at least one embodiment, the set of page types can also include an additional page type corresponding to a compressed MD page. For example, assuming there are 4 types of metadata pages as noted above then the set of page types includes 4 page type IDs, where each of the 4 types of metadata pages is uniquely identified by a corresponding one of the 4 page type ID values. Additionally, the set of page types can include the compressed page type identified by a corresponding fifth page type ID value.

To further illustrate, reference is made to the table 1610 of page type ID values 1610a and corresponding denoted page types 1610b. The row 1612a indicates that the page type ID value=1 (1610a) identifies a top MD page such that all uncompressed top MD pages can include 1 in the page type ID field 1602a.The row 1612b indicates that the page type ID value=2 (1610a) identifies a mid MD page such that all uncompressed mid MD pages can include 2 in the page type ID field 1602a. The row 1612c indicates that the page type ID value=3 (1610a) identifies a leaf MD page such that all uncompressed leaf MD pages can include 3 in the page type ID field 1602a. The row 1612d indicates that the page type ID value=4 (1610a) identifies a VLB page such that all uncompressed VLB pages can include 4 in the page type ID field 1602a.

The row 1612d indicates that the page type ID value=5 (1610a) identifies a compressed MD page.

In at least one embodiment, the page type ID value for the compressed page type can be a special page type in that it may not be encoded or included as a value in the field 1602a of a MD page. With a hybrid PLB, the compressed page type ID value can be included or encoded in a back pointer entry corresponding to a compressed MD page to denote that the corresponding MD page is stored in its compressed form in the hybrid PLB. In at least one embodiment, the page type ID value for a compressed MD page can be included as the first field of the corresponding back pointer entry in the hybrid PLB. For example, if the page type ID field 1602 of each uncompressed MD page is the first 3 bit positions of the page, then each back pointer entry for a compressed MD page of the hybrid type PLB can also be 3 bits in size and can also be the first 3 bit positions of the back pointer entry. In at least one embodiment, the hybrid PLB can omit or not include a back pointer entry for any uncompressed MD page stored in the hybrid PLB. In at least one embodiment for a compressed MD page of a hybrid PLB, when the MD page is uncompressed the uncompressed form of the MD page can have a format or layout such as 1602 with a page type ID field that includes a page type corresponding to a valid uncompressed page type. This is discussed in more detail below.

Figure 19:
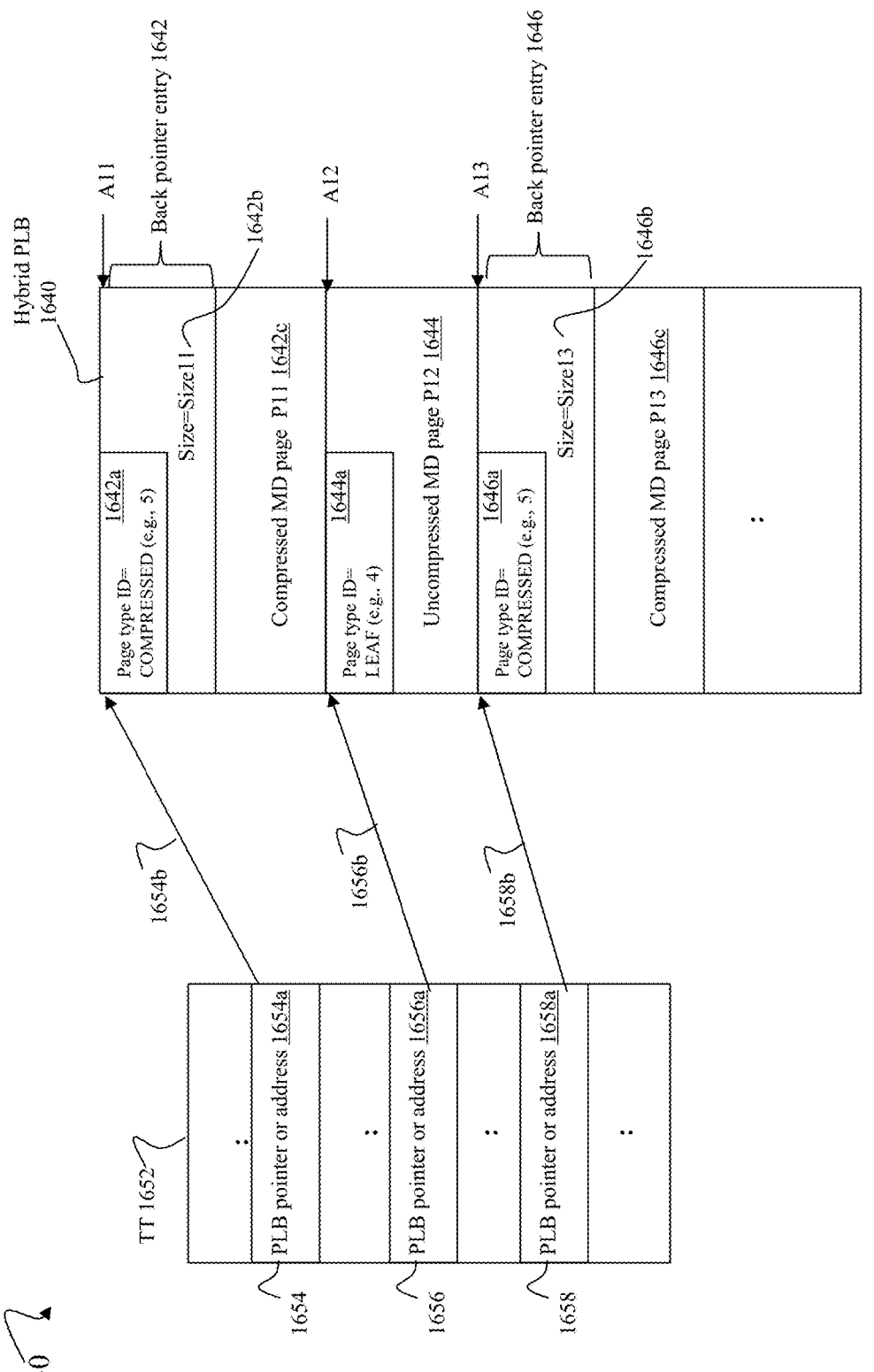

Referring to FIG. 19, shown is an example 1630 illustrated a layout or formation of a hybrid type PLB in at least one embodiment in accordance with the techniques herein.

The example 1630 includes the TT 1652 and the hybrid type PLB 1640. The TT 1652 includes TT entries 1654, 1656 and 1658. TT entry 1654 is used for mapping the logical address LA11 of MD page P11 to its corresponding physical address or location in PLB 1640. TT entry 1656 is used for mapping the logical address LA12 of MD page P12 to its corresponding physical address or location in PLB 1640. TT entry 1658 is used for mapping the logical address LA13 of MD page P13 to its corresponding physical address or location in PLB 1640.

Each TT entry of TT 1652 includes a PLB pointer to or address of content of the PLB, where the content is either a back pointer entry for a compressed MD page, or an uncompressed MD page. In at least one embodiment, each PLB pointer or address of a TT entry of TT 1652 can denote a direct location that is an exact byte location within the PLB 1640. Alternatively in at least one embodiment, each PLB pointer or address of a TT entry of TT 1652 can denote a direct location that denotes a larger storage granularity based on a segment size of multiple bytes as also discussed herein. In the latter case, the PLB address or pointer can denote an address or location of the PLB 1640 that is aligned on the segment size boundary. Thus although no padding is illustrated, such padding can be added, if needed, between back pointer entries and/or uncompressed MD pages to ensure all PLB pointers or addresses of TT entries of TT 1652 align on a segment boundary.

In at least one embodiment, each back pointer entry of the hybrid PLB 1640 can be uncompressed and can be the same fixed size.

In at least one embodiment, back pointer entries can be included in the hybrid PLB 1640 for corresponding compressed MD pages but not uncompressed MD pages as stored in the PLB 1640.

In this example 1630, the PLB 1640 can include back pointer entry 1642 including information for associated compressed MD page P11 1642*c*. In at least one embodiment, back pointer entry 1642 can include at least the size 1642*b* of the corresponding compressed MD page P11 1642*c*. Generally, 1642 can include information as described elsewhere in connection with other back pointer entries for compressed MD pages.

The PLB 1640 can also include uncompressed MD page P12 1644; back pointer entry 1646, and compressed MD page P13 1646*c*. The back pointer entry 1646 can include information fields similar to 1642. The back pointer entry 1646 can include information for associated compressed MD page 1646*c*.

To read uncompressed form of MD page P11, processing can map LA11 of P11 to its corresponding TT entry 1654 that includes PLB pointer or address 1654*a* that points (1654*b*) to PLB address A11. Processing can include reading an amount of data that is the size of an uncompressed MD page with a starting address or location of A11 into a buffer for evaluation. In at least one embodiment the size of an uncompressed MD page can be 4 KB but more generally can be any suitable size. The page type ID field 1642*a* of the 4 KB block just read can be examined to determine whether the page type ID field 1642*a* has a value denoting a COMPRESSED page type ID or another valid page type ID. If the value of 1642*a* denotes a COMPRESSED page type ID, then it is assumed that field 1642*a* is included as a first field of a back pointer entry for a corresponding compressed MD page where the back pointer entry can be accordingly processed and used to retrieve or extract the corresponding compressed MD page. Otherwise, if the value of 1642*a* denotes a valid page type ID for any other type of MD page, then it is assumed that the field 1642*a* is included as the first field of an uncompressed MD page that is accordingly processed.

In this example, processing determines that field 1642*a* includes 5 denoting a COMPRESSED page type ID. In response to the foregoing, the back pointer entry 1642 can be used to extract the compressed MD page P11 1642*c* from the 4K block of content read from PLB 1640. In particular, the back pointer entry 1642 can include a size field (1654*b*) with SIZE11 denoting the size of the compressed MD page P11 1642*c*. Consistent with other discussion herein (e.g., FIGS. 12, 13A and 13B), i) the starting address or location of the compressed MD page 1642*c* can be determined based on A11 and the fixed size of the back pointer entry 1642*b*, and ii) the ending address or location of the compressed MD page 1642*c* can be determined based on the starting offset and the size SIZE11 (1654*b*). The extracted compressed MD page P11 1642*c* can be decompressed and returned in response to the request to read uncompressed MD page P11.

It should be noted that once the compressed MD page P11 1642*c* has been decompressed, it can be expected to include a valid page type ID other than 5 or COMPRESSED. In at least one embodiment, the decompressed form of 1642*c* can be expected to include a valid MD page type of an uncompressed MD page such as denoting any of the MD page types corresponding to lines 1610*a-d* of the table 1610 of FIG. 18.

To read an uncompressed form of MD page P12, processing can map LA12 of P12 to its corresponding TT entry 1656 that includes PLB pointer or address 1656*a* that points (1656*b*) to PLB address A12. Processing can include reading an amount of data that is the size of an uncompressed MD page with a starting address or location of A12 into a buffer for evaluation. In at least one embodiment the size of an uncompressed MD page can be 4 KB but more generally can be any suitable size. The page type ID field 1644*a* of the 4 KB block just read can be examined to determine whether the page type ID field 1644*a* has a value denoting a COMPRESSED page type ID or another valid page type ID. If the value of 1644*a* denotes a COMPRESSED page type ID, then it is assumed that field 1644*a* is included as a first field of a back pointer entry for a corresponding compressed MD page where the back pointer entry can be accordingly processed and used to retrieve or extract the corresponding compressed MD page. Otherwise, if the value of 1644*a* denotes a valid page type ID for any other type of MD page, then it is assumed that the field 1644*a* is included as the first field of an uncompressed MD page that is accordingly processed.

In this example, processing determines that field 1644*a* includes 4 denoting an uncompressed MD leaf page type ID. In response to the foregoing, processing can determine that the 4K block of content just read beginning at A12 is the desired uncompressed MD page P12 1644 and can be returned from the buffer in response to the request to read uncompressed MD page P12.

To read uncompressed form of MD page P13, processing can map LA13 of P13 to its corresponding TT entry 1658 that includes PLB pointer or address 1658*a* that points (1658*b*) to PLB address A13. Processing can include reading an amount of data that is the size of an uncompressed MD page with a starting address or location of A13 into a buffer for evaluation. In at least one embodiment the size of an uncompressed MD page can be 4 KB but more generally can be any suitable size. The page type ID field 1646*a* of the 4 KB block just read can be examined to determine whether the page type ID field 1646*a* has a value denoting a COMPRESSED page type ID or another valid page type ID. If the value of 1646*a* denotes a COMPRESSED page type ID, then it is assumed that field 1646*a* is included as a first field of a back pointer entry for a corresponding compressed MD page where the back pointer entry can be accordingly processed and used to retrieve or extract the corresponding compressed MD page. Otherwise, if the value of 1646*a* denotes a valid page type ID for any other type of MD page, then it is assumed that the field 1646*a* is included as the first field of an uncompressed MD page that is accordingly processed.

In this example, processing determines that field 1646*a* includes 5 denoting a COMPRESSED page type ID. In response to the foregoing, the back pointer entry 1646 can be used to extract the compressed MD page P13 1646*c* from the 4K block of content read from PLB 1640. In particular, the back pointer entry 1646 can include a size field (1656*b*) with SIZE13 denoting the size of the compressed MD page P13 1646*c*. Consistent with other discussion herein (e.g., FIGS. 12, 13A and 13B), i) the starting address or location of the compressed MD page 1646*c* can be determined based on A13 and the fixed size of each back pointer entry and ii) the ending address or location of the compressed MD page 1646*c* can be determined based on the starting offset and the size SIZE13 (1656*b*). The extracted compressed MD page P13 1646*c* can be decompressed and returned in response to the request to read uncompressed MD page P13.

It should be noted that once the compressed MD page P13 1646*c* has been decompressed, it can be expected to include a valid page type ID other than 5 or COMPRESSED. In at least one embodiment, the decompressed form of 1646*c* can be expected to include a valid MD page type of an uncompressed MD page such as denoting any of the MD page types corresponding to lines 1610*a-d* of the table 1610 of FIG. 18.

Figure 20:
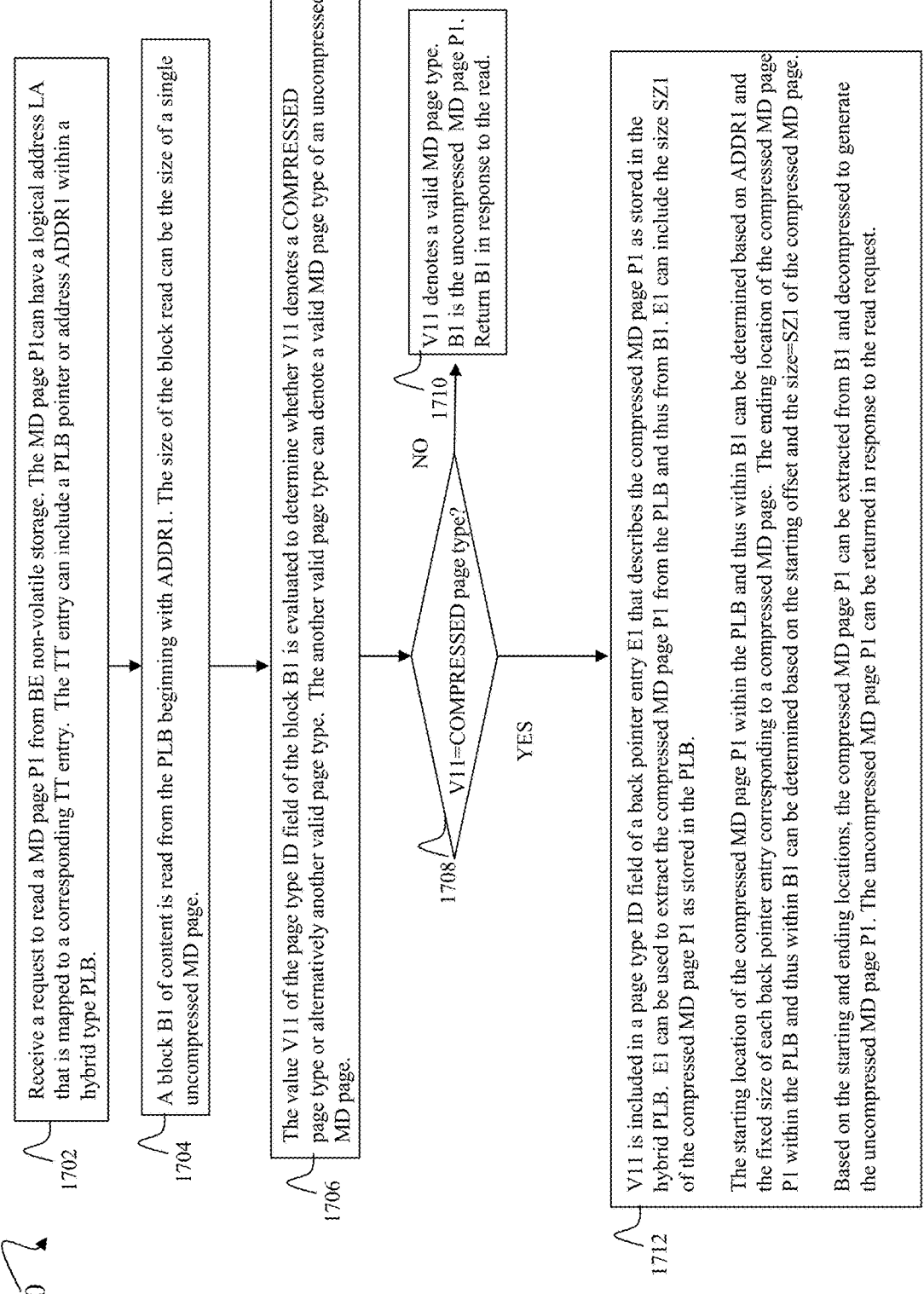

Referring to FIG. 20, shown is a flowchart 1700 of processing steps that can be performed in at least one embodiment in accordance with the techniques of the present disclosure connection with read a requested MD page stored in a hybrid type PLB. FIG. 20 summarizes processing described above.

At the step 1702, a request can be received to read a MD page P1 from BE non-volatile storage. The MD page P1 can have a logical address LA that is mapped to a corresponding TT entry. The TT entry can include a PLB pointer or address ADDR1 within a hybrid type PLB. From the step 1702, control proceeds to the step 1704.

At the step 1704, a block B1 of content is read from the hybrid PLB beginning with ADDR1. The size of the block read can be the size of a single uncompressed MD page. From the step 1704, control proceeds to the step 1706.

At the step 1706, the value V11 of the page type ID field of the block B1 is evaluated to determine whether V11 denotes a COMPRESSED page type or alternatively another valid page type. The another valid page type can denote a valid MD page type of an uncompressed MD page. From the step 1706, control proceeds to the step 1708.

At the step 1708, a determination is made as to whether V11 denotes the COMPRESSED page type. If the step 1708 evaluates to yes, control proceeds to the step 1712, otherwise (e.g., step 708 evaluates to no) control proceeds to the step 1710.

At the step 1710, as a result of the step 1708 evaluating to no, processing can determine that V11 denotes a valid MD page type other than COMPRESSED. For example with reference to FIG. 18, if the step 1708 determines that V11 does not equal 5 denoting the COMPRESSED page type, control proceeds to the step 1710. At the step 1710 processing can determine that V11 otherwise denotes one of the valid MD page types 1-4 corresponding to respective MD page types. Additionally, the step 1710 can determine that, since V11 does not denote the COMPRESSED page type, then B1 is the requested uncompressed MD page P1. As a result, processing can return B1 in response to the read.

At the step 1712, as a result of step 1708 evaluating to yes, processing can determine that V11 is included in a page type ID field of a back pointer entry E1 that describes the compressed MD page P1 as stored in the hybrid PLB. E1 can be used to extract the compressed MD page P1 from the PLB and thus from B1. E1 can include the size SZ1 of the compressed MD page P1 as stored in the PLB. The starting location of the compressed MD page P1 within the PLB and thus within B1 can be determined based on ADDR1 and the fixed size of each back pointer entry corresponding to a compressed MD page. The ending location of the compressed MD page P1 within the PLB and thus within B1 can be determined based on the starting offset and the size=SZ1 of the compressed MD page. Based on the starting and ending locations, the compressed MD page P1 can be extracted from B1 and then decompressed to generate the uncompressed MD page P1. The uncompressed MD page P1 can be returned in response to the read request.

Generally, if a TT entry includes a PLB pointer or address that describes a portion of a PLB as every so many bytes of a segment size, for example every 128 Bytes, then padding needs to be added to the PLB to align the next block that will be read to the next one of these segment boundaries.

In at least one embodiment with LSM, a MD page can be evaluated as to whether to store the MD page in its compressed form or uncompressed form in a PLB of the LSM of BE non-volatile storage. In at least one embodiment, such an evaluation can be made when an updated version of a MD page is written out or destaged to BE non-volatile storage as a result of flushing updates from the MD log. In at least one embodiment, such an evaluation can be made in connection with GC processing when GC processing moves or relocates a MD page from a source PLB location of a source PLB to a target PLB location of a target PLB. Depending on GC processing, the source and target PLB locations can denote different PLB offsets or locations in the same PLB (e.g., source PLB and target PLB are the same PLB), or can otherwise denote PLB offsets or locations in two different PLBs (e.g., source PLB and target PLB denote different PLBs).

In at least one embodiment, one or more criteria can be used to determine whether to store a MD page in its compressed form or uncompressed form. In at least one embodiment, the one or more criteria can include frequency of use or reference. The frequency of use or reference can include one or more metrics denoting a frequency of reads and/or writes with respect to a particular MD page. In at least one embodiment, if a MD page has a frequency, rate or access or number of accesses within a defined period of time exceeding a threshold. If the frequency of access of the MD page exceeds the threshold, then processing can determine to store the MD page in its uncompressed form in a suitable PLB. Otherwise processing can determine to store the MD page in its compressed form.

In at least one embodiment, the one or more criteria can include an evaluation as to whether a MD page is characterized or classified as one of: compressible or uncompressible. As discussed elsewhere herein in at least one embodiment, a MD page can be characterized or classified as uncompressible or incompressible based on an amount of compression achieved or expected to be achieved as a result of compression. In at least one embodiment, a MD page can be characterized as compressible if at least a threshold amount of compression is achieved or expected to be achieved, otherwise the MD page can be characterized as uncompressible. For example, a MD page can be characterized as uncompressible if compressing the page does not achieve, or is not expected to achieve, at least a threshold amount of size reduction such as, for example, at least a threshold amount or percentage. To further illustrate, a threshold reduction of N % can be specified such that if compression of the MD page does not achieve or is not excepted to achieve at least the N % reduction in size, then the MD page can be characterized as incompressible and otherwise the MD page can be characterized as compressible. To further illustrate using a compression ratio, a threshold compression ratio such as 2:1 can be specified denoting a 50% size reduction, where if compression of a MD page achieves or is expected to achieve a compression ratio that is equal to or greater than the threshold compression ratio, then the MD page can be characterized as compressible and otherwise the MD page can be characterized as uncompressible. Generally, the particular comparison performed can vary with the particular one or more metrics used to classify a MD page as compressible or incompressible.

In at least one embodiment using criteria including both i) frequency of access of a MD page and ii) classification of the MD page as compressible or incompressible, processing of the above-noted evaluation can determine to store the compressed form of the MD page in a PLB of LSM if i) the MD page is infrequently accessed (e.g., frequency below a specified threshold) and ii) the MD page is characterized as compressible. Otherwise in such an embodiment, processing can determine to store the MD page in its uncompressed form.

In at least one embodiment, the one or more criteria can include workload of the storage system. In at least one embodiment, if the storage system is determined to have a heavy workload above a specified maximum, then processing can determine to store a MD page in its uncompressed form. In at least one embodiment where the criteria includes i) frequency of access of a MD page, ii) classification of the MD page as compressible, and iii) storage system workload, processing of the above-noted evaluation can determine to store the compressed form of the MD page in a PLB of LSM if i) the MD page is infrequently accessed (e.g., frequency below a specified threshold); ii) the MD page is characterized as compressible; and iii) the storage system workload is below a specified threshold. Otherwise in such an embodiment, processing can determine to store the MD page in its uncompressed form. More generally, an embodiment can use any suitable one or more criteria to determine when the store a MD page in its compressed form or uncompressed form.

Referring to FIG. 21, shown is flowchart 1800 of processing steps that can be performed in at least one embodiment in accordance with the techniques of the present disclosure. FIG. 21 summarizes processing described above.

At the step 1802, updates can be made to a MD page PL. The updates can be recorded in corresponding MD log entries of the MD log. At a later point in time, the MD log entries can be flushed from the MD log and applied to an existing version V1 of the MD page P1 to generate an updated version V2 of the MD page P1. V1 of P1 can be stored at a first physical address or location PA1 and V2 can be stored at a different second physical address or location PA2. From the step 1802, control proceeds to the step 1804

At the step 1804, when storing V2 of P1, P1 can be evaluated to determine whether to store P1 in its compressed or uncompressed form. Such evaluation can be based on one or more of the above-noted criteria and/or other suitable one or more criteria. For example, such evaluation can be based, at least in part, on the frequency of use or access of P1. If P1 has a frequency or use or reference exceeding a threshold, P1 can be stored in its uncompressed form, and otherwise P1 can be stored in its compressed form. From the step 1804, control proceeds to the step 1806.

At the step 1806, V2 of P1 can be stored in its uncompressed form or compressed form in a suitable PLB depending on the one or more PLB types supported, where PA2 is located in the suitable PLB. If V2 of P1 is to be stored in its uncompressed form, V2 of P1 can be stored at PA2 in a hybrid type PLB or an uncompressed type PLB. If V2 of P1 is to be stored in its compressed form, V2 of P1 can be stored at PA2 in a hybrid type PLB or a compressed type PLB. From the step 1806, control proceeds to the step 1807.

At the step 1807, processing can update a corresponding TT entry E1 used to map the logical address LA of P1 to its new physical location PA2 rather than PAL. From the step 1807, control proceeds to the step 1808.

At the step 1808, PA1 now references a location in a PLB that includes invalid or stale content (e.g., a stale version V1 of P1) such that PLB storage associated with PA1 can be reclaimed for reuse. PA2 references a location in a PLB that includes current valid content of the MD page P1. GC processing can be performed that includes moving or copying V2 of the MD page P1 from a source PLB location to a target PLB location. In connection with moving or copying V2 of MD page P1 as part of GC processing, P1 can be evaluated to determine whether to store P1 in its compressed or uncompressed form. Such evaluation can be based on the one or more criteria used in the step 1804. For example, such evaluation can be based, at least in part, on the frequency of use or access of PL. If P1 has a frequency or use or reference exceeding a threshold, P1 can be stored in its uncompressed form, and otherwise P1 can be stored in its compressed form.

In the step 1808, GC processing can move or relocate V2 of P1 where V2 of P1 can be stored at the target PLB location in its uncompressed form or compressed form in a suitable PLB depending on the PLB types supported. If P1 is to be stored in its uncompressed form, P1 can be stored at the target PLB location in a hybrid type PLB or an uncompressed type PLB. If P1 is to be stored in its compressed form, P1 can be stored at the target PLB location in a hybrid type PLB or a compressed type PLB. TT entry E1 can be updated to now map LA of P1 to the target location.

The techniques herein can be performed by any suitable hardware and/or software. For example, techniques herein can be performed by executing code which is stored on any one or more different forms of computer-readable media, where the code can be executed by one or more processors, for example, such as processors of a computer or other system, an ASIC (application specific integrated circuit), and the like. Computer-readable media can include different forms of volatile (e.g., RAM) and non-volatile (e.g., ROM, flash memory, magnetic or optical disks, or tape) storage which can be removable or non-removable.

While the techniques of the present disclosure have been presented in connection with embodiments shown and described in detail herein, their modifications and improvements thereon will become readily apparent to those skilled in the art.

Accordingly, the spirit and scope of the techniques of the present disclosure should be limited only by the following claims.

What is claimed is:

1. A computer-implemented method comprising:

updating a metadata (MD) page, wherein said updating includes recording first updates in first MD log entries of a MD log; and flushing the first MD log entries from the MD log, wherein said flushing includes:

applying the first updates to a first version V1 of the MD page to generate an updated second version V2 of the MD page, where V1 of the MD page is stored at a first physical address or location PA1;

evaluating V2 of the MD page to determine, in accordance with one or more criteria, whether to store V2 of the MD page in a selected one of i) a compressed form of the MD page or ii) an uncompressed form of the MD page; and storing, in accordance with said evaluating, V2 of the MD page at a second physical address or location PA2 in the selected one of the compressed form of the MD page or the uncompressed form of the MD page, wherein PA2 denotes a physical address or location that is different from PA1, and wherein PA2 is included in a first physical large block (PLB) of non-volatile storage having a first PLB type attribute that allows storing MD pages in the selected one of the compressed form of the MD page or the uncompressed form of the MD page;

wherein a translation table (TT) is used in mapping logical addresses of MD pages to corresponding physical storage addresses or locations of MD pages as stored on non-volatile storage, and wherein a first TT entry of the TT is used in mapping a first logical address LA1 of the MD page to a current physical address or location of a current version of the MD page, and wherein prior to said flushing, the first TT entry maps LA1 to PA1, and wherein said flushing includes:

updating the first TT entry to map LA1 to PA2 rather than PA1;

wherein the first PLB includes a first back pointer entry for the MD page, wherein the first back pointer entry includes: i) a TT entry pointer identifying the first TT entry corresponding to the MD page, and ii) a first size denoting a size of the compressed form of the MD page as stored at PA2 in the first PLB, and wherein the first TT entry includes a first PLB pointer referencing the first back pointer entry;

wherein the first PLB pointer specifies a direct location of the first back pointer entry; and wherein the first PLB pointer denoting the direct location of the first back pointer entry identifies a first offset in the first PLB based on a first segment size, wherein the first segment size denotes multiple bytes, and wherein the first back pointer entry is stored in the first PLB at the first offset, and wherein the first offset is a multiple of the first segment size so that the first back pointer is storage aligned based on the first segment size.

2. The computer-implemented method of claim 1, wherein said evaluating determines that said selected one of the compressed form of the MD page or the uncompressed form of the MD page is the compressed form of the MD page, and wherein said storing stores V2 of the MD page in the compressed form at PA2 of the first PLB.

3. The computer-implemented method of claim 2, wherein the first PLB type attribute of the first PLB is one of: i) a compressed type denoting that the first PLB includes compressed MD pages and does not include uncompressed MD pages, or ii) a hybrid type denoting that the first PLB includes both compressed MD pages and uncompressed MD pages.

4. The computer-implemented method of claim 3, wherein the first PLB type attribute of the first PLB is the compressed type.

5. The computer-implemented method of claim 4, wherein the first back pointer entry is used to read the MD page, and wherein the method includes:

subsequent to said flushing, receiving a read request to read the MD page; and responsive to the read request, performing read processing including:

mapping LA1 to the first back pointer entry using the first TT entry;

obtaining, using the first back pointer entry, the compressed form of the MD page from PA2;

decompressing the compressed form of the MD page, as obtained from PA2, to generate the uncompressed form of the MD page; and returning the uncompressed form of the MD page in response to the read request.

6. The computer-implemented method of claim 3, wherein the first PLB type attribute of the first PLB is the hybrid type.

7. The computer-implemented method of claim 6, wherein the first back pointer entry is used to read the MD page, and wherein the method includes:

subsequent to said flushing, receiving a read request to read the MD page; and responsive to receiving the read request, performing read processing including:

mapping LA1 to the first back pointer entry using the first TT entry;

obtaining, using the first back pointer entry, the compressed form of the MD page from PA2;

decompressing the compressed form of the MD page, as obtained from PA2, to generate the uncompressed form of the MD page; and returning the uncompressed form of the MD page in response to the read request.

8. The computer-implemented method of claim 7, wherein the first PLB only includes back pointer entries for compressed MD pages of the first PLB and wherein the first PLB does not include back pointer entries for uncompressed MD page of the first PLB, wherein a first set includes page type identifier (ID) values each identifying a different allowable page type, wherein each uncompressed MD page stored in the first PLB includes a page type identifier (ID) field with a page type ID value of the first set denoting a valid MD page type of said each uncompressed MD page, wherein each compressed MD page stored in the first PLB includes a corresponding back pointer entry that includes a first field with a first page type ID value of the first set, wherein the first page type ID value denotes a compressed page type, and wherein when each compressed MD page stored in the first PLB is decompressed into its corresponding uncompressed form, the corresponding uncompressed form includes the first page type ID field with a respective page type ID value corresponding to a valid MD page type of the uncompressed form of said each compressed MD page.

9. The computer-implemented method of claim 8, wherein the page type ID field of each uncompressed MD page of the first PLB is located at a first position in said each uncompressed MD page, and wherein the first field of each back pointer entry is located at the first position in said each back pointer entry.

10. The computer-implemented method of claim 9, wherein said read processing includes:

reading a first portion of the first PLB, wherein the first portion has a starting address corresponding to the first PLB pointer of the first TT entry associated with the MD page;

determining whether the first position of the first portion of the PLB includes the first page type ID value denoting a compressed page type; and responsive to determining that the first position of the first portion includes the first page type ID denoting a compressed page type, performing first processing including:

determining that the first portion includes the first back pointer entry;

using the first back pointer entry to obtain the compressed form of the MD page from the first PLB;

decompressing the compressed form of the MD page to generate the uncompressed form of the MD page; and returning the uncompressed form of the MD page in response to the read request.

11. The computer-implemented method of claim 9, further comprising:

receiving a second read request to read a second MD page having a second logical address LA2; and responsive to receiving the second read request, performing second read processing including:

mapping, using a second TT entry of the TT, LA2 to a third physical address PA3 of the first PLB;

reading a second portion of the first PLB, wherein the second portion has a starting address corresponding to PA3 of the second TT entry;

determining whether the first position of the second portion of the PLB includes the first page type ID value denoting a compressed page type; and responsive to determining that the first position of the first portion does not include the first page type ID denoting a compressed page type, performing other processing including:

determining that the second portion includes the uncompressed form of the second MD page; and returning the uncompressed form of the MD page, as obtained from the second portion, in response to the second read request.

12. The computer-implemented method of claim 1, wherein said evaluating determines that said selected one of the compressed form of the MD page or the uncompressed form of the MD page is the uncompressed form of the MD page, wherein said storing stores V2 of the MD page in the uncompressed form at PA2 of the first PLB, wherein the first PLB type attribute of the first PLB is one of: i) an uncompressed type denoting that the first PLB includes uncompressed MD pages and does not include compressed MD pages, or ii) a hybrid type denoting that the first PLB includes both compressed MD pages and uncompressed MD pages.

13. The computer-implemented method of claim 1, wherein said criteria includes any one or more of: a frequency of access of the MD page, a characterization of the MD page as either compressible or uncompressible, and a workload of the system in which the method is performed.

14. One or more non-transitory computer readable media comprising code stored thereon that, when executed, perform a method comprising:

updating a metadata (MD) page, wherein said updating includes recording first updates in first MD log entries of a MD log; and flushing the first MD log entries from the MD log, wherein said flushing includes:

applying the first updates to a first version V1 of the MD page to generate an updated second version V2 of the MD page, where V1 of the MD page is stored at a first physical address or location PA1;

evaluating V2 of the MD page to determine, in accordance with one or more criteria, whether to store V2 of the MD page in a selected one of i) a compressed form of the MD page or ii) an uncompressed form of the MD page; and storing, in accordance with said evaluating, V2 of the MD page at a second physical address or location PA2 in the selected one of the compressed form of the MD page or the uncompressed form of the MD page, wherein PA2 denotes a physical address or location that is different from PA1, and wherein PA2 is included in a first physical large block (PLB) of non-volatile storage having a first PLB type attribute that allows storing MD pages in the selected one of the compressed form of the MD page or the uncompressed form of the MD page;

wherein a translation table (TT) is used in mapping logical addresses of MD pages to corresponding physical storage addresses or locations of MD pages as stored on non-volatile storage, and wherein a first TT entry of the TT is used in mapping a first logical address LA1 of the MD page to a current physical address or location of a current version of the MD page, and wherein prior to said flushing, the first TT entry maps LA1 to PA1, and wherein said flushing includes:

updating the first TT entry to map LA1 to PA2 rather than PA1;

wherein the first PLB includes a first back pointer entry for the MD page, wherein the first back pointer entry includes: i) a TT entry pointer identifying the first TT entry corresponding to the MD page, and ii) a first size denoting a size of the compressed form of the MD page as stored at PA2 in the first PLB, and wherein the first TT entry includes a first PLB pointer referencing the first back pointer entry;

wherein the first PLB pointer specifies a direct location of the first back pointer entry; and wherein the first PLB pointer denoting the direct location of the first back pointer entry identifies a first offset in the first PLB based on a first segment size, wherein the first segment size denotes multiple bytes, and wherein the first back pointer entry is stored in the first PLB at the first offset, and wherein the first offset is a multiple of the first segment size so that the first back pointer is storage aligned based on the first segment size.

15. A system comprising:

one or more processors; and a memory comprising code stored thereon that, when executed, performs a method comprising:

updating a metadata (MD) page, wherein said updating includes recording first updates in first MD log entries of a MD log; and flushing the first MD log entries from the MD log, wherein said flushing includes:

applying the first updates to a first version V1 of the MD page to generate an updated second version V2 of the MD page, where V1 of the MD page is stored at a first physical address or location PA1;

evaluating V2 of the MD page to determine, in accordance with one or more criteria, whether to store V2 of the MD page in a selected one of i) a compressed form of the MD page or ii) an uncompressed form of the MD page; and storing, in accordance with said evaluating, V2 of the MD page at a second physical address or location PA2 in the selected one of the compressed form of the MD page or the uncompressed form of the MD page, wherein PA2 denotes a physical address or location that is different from PA1, and wherein PA2 is included in a first physical large block (PLB) of non-volatile storage having a first PLB type attribute that allows storing MD pages in the selected one of the compressed form of the MD page or the uncompressed form of the MD page:

wherein a translation table (TT) is used in mapping logical addresses of MD pages to corresponding physical storage addresses or locations of MD pages as stored on non-volatile storage, and wherein a first TT entry of the TT is used in mapping a first logical address LA1 of the MD page to a current physical address or location of a current version of the MD page, and wherein prior to said flushing, the first TT entry maps LA1 to PA1, and wherein said flushing includes:

updating the first TT entry to map LA1 to PA2 rather than PA1;

wherein the first PLB includes a first back pointer entry for the MD page, wherein the first back pointer entry includes: i) a TT entry pointer identifying the first TT entry corresponding to the MD page, and ii) a first size denoting a size of the compressed form of the MD page as stored at PA2 in the first PLB, and wherein the first TT entry includes a first PLB pointer referencing the first back pointer entry;

wherein the first PLB pointer specifies a direct location of the first back pointer entry; and wherein the first PLB pointer denoting the direct location of the first back pointer entry identifies a first offset in the first PLB based on a first segment size, wherein the first segment size denotes multiple bytes, and wherein the first back pointer entry is stored in the first PLB at the first offset, and wherein the first offset is a multiple of the first segment size so that the first back pointer is storage aligned based on the first segment size.

16. The system of claim 15, wherein said evaluating determines that said selected one of the compressed form of the MD page or the uncompressed form of the MD page is the compressed form of the MD page, and wherein said storing stores V2 of the MD page in the compressed form at PA2 of the first PLB.

17. The system of claim 16, wherein the first PLB type attribute of the first PLB is one of: i) a compressed type denoting that the first PLB includes compressed MD pages and does not include uncompressed MD pages, or ii) a hybrid type denoting that the first PLB includes both compressed MD pages and uncompressed MD pages.

18. The system of claim 17, wherein the first PLB type attribute of the first PLB is the hybrid type.

19. The system of claim 18, wherein the first back pointer entry is used to read the MD page, and wherein the method includes:

subsequent to said flushing, receiving a read request to read the MD page; and responsive to receiving the read request, performing read processing including:

mapping LA1 to the first back pointer entry using the first TT entry;

obtaining, using the first back pointer entry, the compressed form of the MD page from PA2;

decompressing the compressed form of the MD page, as obtained from PA2, to generate the uncompressed form of the MD page; and returning the uncompressed form of the MD page in response to the read request.

20. The system of claim 19, wherein the first PLB only includes back pointer entries for compressed MD pages of the first PLB and wherein the first PLB does not include back pointer entries for uncompressed MD page of the first PLB, wherein a first set includes page type identifier (ID) values each identifying a different allowable page type, wherein each uncompressed MD page stored in the first PLB includes a page type identifier (ID) field with a page type ID value of the first set denoting a valid MD page type of said each uncompressed MD page, wherein each compressed MD page stored in the first PLB includes a corresponding back pointer entry that includes a first field with a first page type ID value of the first set, wherein the first page type ID value denotes a compressed page type, and wherein when each compressed MD page stored in the first PLB is decompressed into its corresponding uncompressed form, the corresponding uncompressed form includes the first page type ID field with a respective page type ID value corresponding to a valid MD page type of the uncompressed form of said each compressed MD page.

* * * * *